(12) United States Patent
Nomoto et al.

(10) Patent No.: US 7,855,803 B2
(45) Date of Patent: Dec. 21, 2010

(54) PRINTING CONTROL APPARATUS, INFORMATION PROCESSING APPARATUS, CONTROL METHOD THEREFOR, COMPUTER PROGRAM, AND COMPUTER-READABLE STORAGE MEDIUM

(75) Inventors: Masakazu Nomoto, Yokohama (JP); Yasushi Mochizuki, Zushi (JP); Keisuke Nagao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1223 days.

(21) Appl. No.: 11/454,049

(22) Filed: Jun. 16, 2006

(65) Prior Publication Data

US 2006/0288304 A1 Dec. 21, 2006

(30) Foreign Application Priority Data

Jun. 20, 2005 (JP) ............................. 2005-179646
Jun. 20, 2005 (JP) ............................. 2005-179647

(51) Int. Cl.
*G06K 15/00* (2006.01)
*G06F 3/00* (2006.01)

(52) U.S. Cl. ...................... 358/1.16; 358/403; 715/781; 715/783

(58) Field of Classification Search ................. 358/1.1, 358/1.16, 403; 707/1, 100, 101, 102, 200; 715/764, 781, 783
See application file for complete search history.

(56) References Cited

U.S. PATENT DOCUMENTS

| | | | |
|---|---|---|---|
| 5,550,969 A | | 8/1996 | Torres et al. |
| 6,370,549 B1 * | | 4/2002 | Saxton ............................... 1/1 |
| 6,782,387 B1 * | | 8/2004 | Kumashio ........................... 1/1 |
| 7,162,488 B2 * | | 1/2007 | DeVorchik et al. ................. 1/1 |
| 7,424,490 B2 * | | 9/2008 | Matsuishi ........................... 1/1 |
| 2002/0032696 A1 | | 3/2002 | Takiguchi et al. ......... 707/500.1 |
| 2003/0147097 A1 | | 8/2003 | Kotani et al. ............... 358/1.18 |
| 2005/0278331 A1 * | | 12/2005 | Hatori ............................ 707/7 |
| 2006/0085474 A1 * | | 4/2006 | Tsubono ..................... 707/102 |

FOREIGN PATENT DOCUMENTS

JP        4267426 A       9/1992

(Continued)

*Primary Examiner*—Thomas D Lee
(74) *Attorney, Agent, or Firm*—Fitzpatrick, Cella, Harper & Scinto

(57) ABSTRACT

This invention allows the user to select files to be printed from arbitrary folders, easily designate a folder selected in the past, and confirm data files in the folder, thereby improving the operability of selecting a file to be printed. For this purpose, the display window has a folder view display area for displaying the tree structure of folders, and a file view display area for displaying a list of image data files stored in a folder selected in the folder view display area. When a new folder is selected in the folder view display area, a path representing the location position of the folder is added to the folder list. When a file having a print count of "1" or more exists in the file view display area, the file name and print count of the file are added to a file list associated with a folder list. When a selected-folder view display button is clicked, a list of folders registered in the folder list is displayed. If one of the registered folders is selected, a corresponding folder in the folder view display area is selected, and the file view display area is also updated.

23 Claims, 39 Drawing Sheets

FOREIGN PATENT DOCUMENTS

| | | |
|---|---|---|
| JP | 6342361 A | 12/1994 |
| JP | 8-095740 | 4/1996 |
| JP | 8-263255 | 10/1996 |
| JP | 10-162010 | 6/1998 |
| JP | 2000066787 A | 3/2000 |
| JP | 2002-209073 | 7/2002 |
| JP | 2002-215286 | 7/2002 |
| JP | 2003-231323 | 8/2003 |

* cited by examiner

FIG. 4

FOLDER LIST 3000 3001 3002

| FOLDER NAME | LINK TO FILE LIST |
|---|---|
| C:\User1\Pictures\CCC | (ADDRESS OF FILE LIST 1) |
| C:\User1\Pictures\AAA | (ADDRESS OF FILE LIST 2) |
| C:\User1\Pictures\BBB | 0 |
| C:\User1\Documents\EEE | (ADDRESS OF FILE LIST 3) |
| C:\User1\Documents\DDD | 0 |

FILE LIST 1  4000  4001  4002

| FILE NAME | PRINT COUNT |
|---|---|
| IMG_0001.JPG | 3 |
| IMG_0004.JPG | 1 |
| IMG_0007.JPG | 2 |
| IMG_0009.JPG | 1 |
| IMG_0012.JPG | 1 |
| IMG_0015.JPG | 1 |

FILE LIST 2  4010  4011  4012

| FILE NAME | PRINT COUNT |
|---|---|
| IMG_0102.JPG | 2 |
| IMG_0104.JPG | 1 |
| IMG_0105.JPG | 1 |

FILE LIST 3  4020  4021  4022

| FILE NAME | PRINT COUNT |
|---|---|
| IMG_1001.JPG | 1 |
| IMG_1002.JPG | 1 |
| IMG_1003.JPG | 1 |

FIG. 17

EASY-PHOTO PRINT
FILE (F)

1. IMAGE SELECTION — 2001
2. PAPER SELECTION — 2002
3. LAYOUT / PRINT — 2003

PRINTER: Canon XXXXX  8001 8002

PAPER SIZE:
- L SIZE
- 2L SIZE
- PANORAMA
- POSTCARD
- A4

8003

PAPER TYPE:
- HIGH-QUALITY GLOSSY PAPER
- GLOSSY PAPER
- COATED PAPER
- PLAIN PAPER

8004

2004

2005

NUMBER OF SELECTED IMAGES : 18 — 2023

F I G. 28
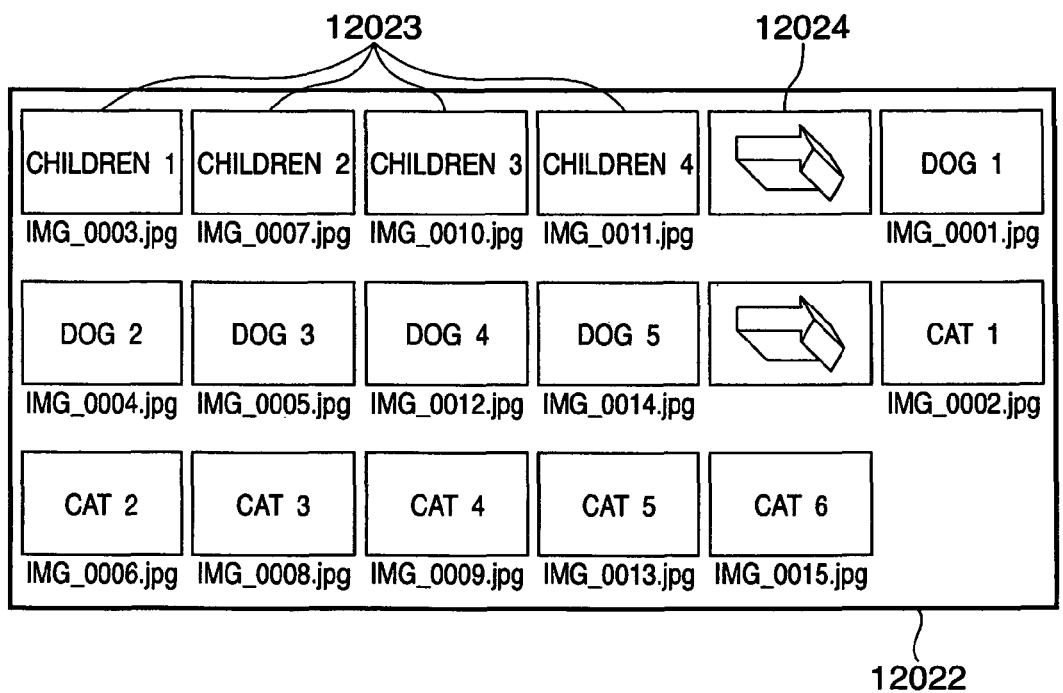

FIG. 29

| DOG 1 | CAT 1 | CHILDREN 1 | DOG 2 | DOG 3 | CAT 2 |
|---|---|---|---|---|---|
| IMG_0001.jpg | IMG_0002.jpg | IMG_0003.jpg | IMG_0004.jpg | IMG_0005.jpg | IMG_0006.jpg |
| CHILDREN 2 | CAT 3 | CAT 4 | CHILDREN 3 | CHILDREN 4 | DOG 4 |
| IMG_0007.jpg | IMG_0008.jpg | IMG_0009.jpg | IMG_0010.jpg | IMG_0011.jpg | IMG_0012.jpg |
| CAT 5 | DOG 5 | CAT 6 | | | |
| IMG_0013.jpg | IMG_0014.jpg | IMG_0015.jpg | | | |

| DIRECTORY INFORMATION |
| --- |
| PROGRAM CODES ASSOCIATED WITH WINDOW DISPLAY MODULE |
| PROGRAM CODES ASSOCIATED WITH FIRST STORAGE MODULE |
| PROGRAM CODES ASSOCIATED WITH SECOND STORAGE MODULE |
| PROGRAM CODES ASSOCIATED WITH PRINTOUT PROCESSING MODULE |
| PROGRAM CODES ASSOCIATED WITH FOLDER LIST DISPLAY MODULE |
| PROGRAM CODES ASSOCIATED WITH UPDATE MODULE |
| PROGRAM CODES ASSOCIATED WITH SWITCHING MODULE |
| PROGRAM CODES ASSOCIATED WITH DELETION MODULE |
| PROGRAM CODES ASSOCIATED WITH ANOTHER PROCESSING |
| ⋮ |

| | ACCESS COUNT |
|---|---|
| FOLDER A | 1 |
| FOLDER B | 2 |
| FOLDER C | 3 |

PRINTING CONTROL APPARATUS, INFORMATION PROCESSING APPARATUS, CONTROL METHOD THEREFOR, COMPUTER PROGRAM, AND COMPUTER-READABLE STORAGE MEDIUM

FIELD OF THE INVENTION

The present invention relates to a printing control apparatus, information processing apparatus, control method therefor, computer program, and computer-readable storage medium and, more particularly, to a printing control apparatus, information processing apparatus, printing control method therefor, printing control program, and storage medium for selecting image data to be printed on a user interface and printing the selected image data. The present invention also relates to a technique of processing a data file which is stored and managed in a folder.

BACKGROUND OF THE INVENTION

An information processing apparatus such as a personal computer creates a folder (also called a directory) and stores files in the folder in order to classify and arrange files in a storage medium (storage device) such as a hard disk or flexible disk. In displaying a folder, the icon of a selected folder is changed, or the font of the folder name of the selected folder or the background color of the text is changed to represent that the folder is selected when the user selects the folder icon.

The folder has a function of further creating a folder (subfolder or subdirectory) in the folder and classifying files by the hierarchy structure. FIG. 36 shows an example of a folder viewer window 14000 corresponding to folders of the hierarchy structure. In FIG. 36, folders of names "DDD", "CCC", "BBB", and "AAA" exist at the same layer position. A mark "+" added before a folder name represents that the folder contains another folder. In FIG. 36, folders "CCC" and "DDD" correspond to such a folder. When these folders are designated with a pointing device, the hierarchy structures of folders in them are recursively displayed.

There is known a technique of counting the reference count of a document file and changing the color of each file icon (picture character) in accordance with the counting result in listing and displaying document files, as shown in FIG. 37, in a document search system using a computer (e.g., Japanese Patent Laid-Open No. 10-162010).

In general, the number of files in a folder cannot be known until the folder is opened. In order to grasp the number of files stored in a folder without opening the folder icon, there is known a technique of reflecting the number of files contained in a folder in an internal figure 14002a of a folder icon 14002, as shown in FIG. 38 (Japanese Patent Laid-Open No. 8-95740).

According to another technique, access information is stored as shown in FIG. 39A upon access to a folder and a file icon stored in the folder. In displaying a list, the color and size of the folder icon are changed on the basis of the access information, as shown in FIG. 39B (Japanese Patent Laid-Open No. 2002-215286).

There is also known an application which selects one or more data files to be printed from a folder and prints them at once.

This application creates several logical folders having the hierarchy structure in a storage device such as a hard disk or memory card, and stores image data files in the folders. For example, an image selection window as illustrated in FIG. 30 is displayed on a display device which provides a user interface. The hierarchy structure of the folders is displayed in a folder tree window 20001, and image files in folders selected from the folder tree window 20001 are listed and displayed in a thumbnail display window 20002. Each thumbnail (reduced image) is displayed together with the print count of a corresponding image, a "+" button to increment the print count, and a "−" button to decrement the print count. The print count of each image can be set by an easy user operation. The image selection window also comprises an "all" button to set the print counts of all images in a selected folder to 1, a "clear" button to reset them to 0, and a "zoom" button to enlarge and display an image selected by the user from the thumbnail display window 20002.

In such a printing control apparatus, images to be printed and their print counts are set in the image selection window, and the paper and layout used for printing are set in another window. Then, the images are printed by the printing apparatus (Japanese Patent Laid-Open No. 2003-231323).

As described above, an application program which performs batch processing has a function capable of selecting a folder from the folder tree view, previewing images in the selected folder as thumbnails, and selecting an image from the previewed images.

As the method of selecting an image in a storage device, another image selection window as shown in FIG. 31 is also proposed. This image selection window visualizes the hierarchy structure of folders together with thumbnails contained in the folders. In the example of FIG. 31, a thumbnail display window 21001 displays the contents of a folder "Pictures". The folder "Pictures" directly contains three image files 21002, and also contains three folders "AAA", "BBB", and "CCC", each of which also stores image files. The folder "CCC" further contains a folder "CCC2" which stores image files. At the thumbnail display portion 21001, image files are displayed as thumbnails. At this time, for easy understanding of the hierarchical relationship between folders, the thumbnails of images stored in an upper folder are displayed larger, and those of images stored in a lower folder are displayed smaller (e.g., Japanese Patent Laid-Open No. 8-263255).

As another print image selection method, the thumbnails of image files contained in a folder selected at a folder tree display portion 22001 are listed and displayed at a thumbnail display portion 22002, as shown in FIG. 32. A thumbnail is selected (a check mark is added in FIG. 32), and an "add" button 22003 is clicked. Then, an image corresponding to the selected thumbnail is registered in a "selected file list" 22004. According to this method, the print count of each image is set in a window different from the image selection window in FIG. 32.

As another output file selection method, the contents of a folder selected by the user from a folder structure display field 23001 are displayed in a folder content display field 23002, as shown in FIG. 33. One or more folders or files selected by the user from those in the folder content display field 23002 are processed. In the folder content display field 23002, both files and folders can be designated. At this time, when a folder in the folder content display field 23002 is selected, all files contained in the folder are processed (e.g., Japanese Patent Laid-Open No. 2002-209073).

However, the prior art of FIG. 30 does not consider management of the print count set for an image file in a previously selected folder when the selected folder is changed in the folder tree window 20001. In order to print images distributed in a plurality of folders, the user must repetitively perform for each folder an operation of selecting and printing images. To make images distributed in a plurality of folders fall within one paper sheet in printing with a layout of images on one paper sheet, the target images must be temporarily copied to one folder before execution of printing control software.

Even if images can be selected from a plurality of folders and printed at once, the following problems still remain unsolved.

An application having a function of selecting images from a plurality of folders and printing the selected images at once is expected to have a preview function of previewing which images are selected when images are selected from a plurality of folders.

However, even if selected images can be confirmed, it is difficult to confirm which folder stores each image.

These days, digital cameras have prevailed, and a folder having the name of a date or event is inevitably created to store an image file in the folder. As the chance to take a picture increases, the number of folders increases, which makes it more difficult to search for a folder which contains a selected image.

Some applications have a function of displaying a character string which forms the path of the folder of a selected image and allowing the user to know from which folder an image has been selected. However, it is difficult to intuitively know a selected image file from the character string of the path of a folder.

According to the prior art in FIG. 31, image files in a plurality of folders are simultaneously displayed and can be selected by the user, so an image file to be printed can be selected from a plurality of folders. However, if an image file contained in a folder of a lower layer is selected, the thumbnail of the image file is displayed small, and the user hardly identifies or selects the image file. If a plurality of folders at positions distant from each other in the folder hierarchy, e.g., image files in folders contained in different folders are selected, the folders are displayed at distant positions, and it becomes difficult to find them out by the user.

According to the prior art in FIG. 32, images are registered while switching and selecting a plurality of folders at the folder tree display portion 22001. Thus, images can be collected from a plurality of folders without displaying small the thumbnails of image files contained in a folder of a lower layer. However, registration of an image file to the "selected file list" and designation of the print count of the image file are performed at different portions, making the operation cumbersome. Since a folder from which an image file is registered cannot be known later, the user must search for the folder in referring to and additionally registering another image file stored in the same folder as that of the previously registered image. This problem is serious because digital cameras are popular recently, sensed image files are stored in folders having the names of dates, events, or the like, and the number of folders increases.

According to the prior art in FIG. 33, a plurality of folders contained in the folder content display field 23002 can be selected to process files contained in the folders at once. However, all files contained in a plurality of folders are processed, and it is impossible to arbitrarily select files from the folders and process the selected files. No files to be processed can be selected from a plurality of folders at positions distant from each other in the folder hierarchy.

SUMMARY OF THE INVENTION

The present invention has been made to overcome the conventional drawbacks, and has as its object to provide a technique of allowing the user to select files to be printed from arbitrary folders and easily designate a folder selected in the past, thereby improving the operability of selecting a file to be printed.

It is another object of the present invention to provide a technique capable of easily finding out a folder which stores data files subjected to batch processing for printing or the like.

In order to solve the conventional drawbacks, for example, a printing control apparatus according to the present invention comprises the following arrangement.

More specifically, a printing control apparatus which prints desired data files stored in a plurality of folders stored in a storage medium comprises window display means for displaying a window having a folder view display area for displaying a list of folders, and a file view display area for displaying a list of files stored in a selected folder, first storage means for, when a new folder in the folder view display area is designated by predetermined designation means, setting the designated folder as a selected folder, and additionally storing location information of the selected folder in a predetermined folder list, second storage means for, when a new data file to be printed in the file view display area is designated by the predetermined designation means, storing information for specifying a file of the designated data file in a predetermined file list, printout processing means for, when printing is designated, performing printout processing for a selected data file on the basis of the information stored in the second storage means, folder list display means for displaying the folder list stored in the first storage means, and update means for, when location information of a desired folder in the displayed folder list is designated by the predetermined designation means, setting a folder specified by the location information designated by the designation means as a selected folder, and designating the window display means to update display.

An information processing apparatus according to the present invention comprises the following arrangement.

More specifically, an information processing apparatus which executes predetermined processing at once for desired data files stored in a plurality of folders stored in a storage medium is characterized by comprising window display means for displaying a window having a folder view display area for displaying a list of folders, and a file view display area for displaying a list of files stored in a selected folder, update means for, when a new folder in the folder view display area is designated by predetermined designation means, setting the designated folder as a selected folder, and updating the file view display area of the window, storage means for, when a new data file to be processed in the file list display area is designated by the predetermined designation means, storing, in association with each other, information for specifying the designated data file and location information of a folder which stores the data file, and processing means for, when processing start designation is input, sequentially processing selected data files on the basis of the information stored in the storage means, wherein the window display means displays a folder which stores a data file to be processed and a folder which does not store a data file to be processed, in different forms in the folder view display area on the basis of folder location information stored in the storage means.

Other features and advantages of the present invention will be apparent from the following description taken in conjunc-

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of a folder list;

FIG. 5 is a table showing an example of a file list;

FIG. 17 is a view showing a display example on the display device in the second tab processing by the printing control application in the first embodiment;

FIG. 28 is a view showing an output example when an image is inserted as a folder break;

FIG. 29 is a view showing a print result of printing by an "ignore folder" method;

FIG. 34 is a table showing the memory map of a storage medium according to the second embodiment of the present invention;

DETAILED DESCRIPTION OF THE PREFERRED EMBODIMENTS

Preferred embodiments of the present invention will be described in detail below with reference to the accompanying drawings.

Figure 1:
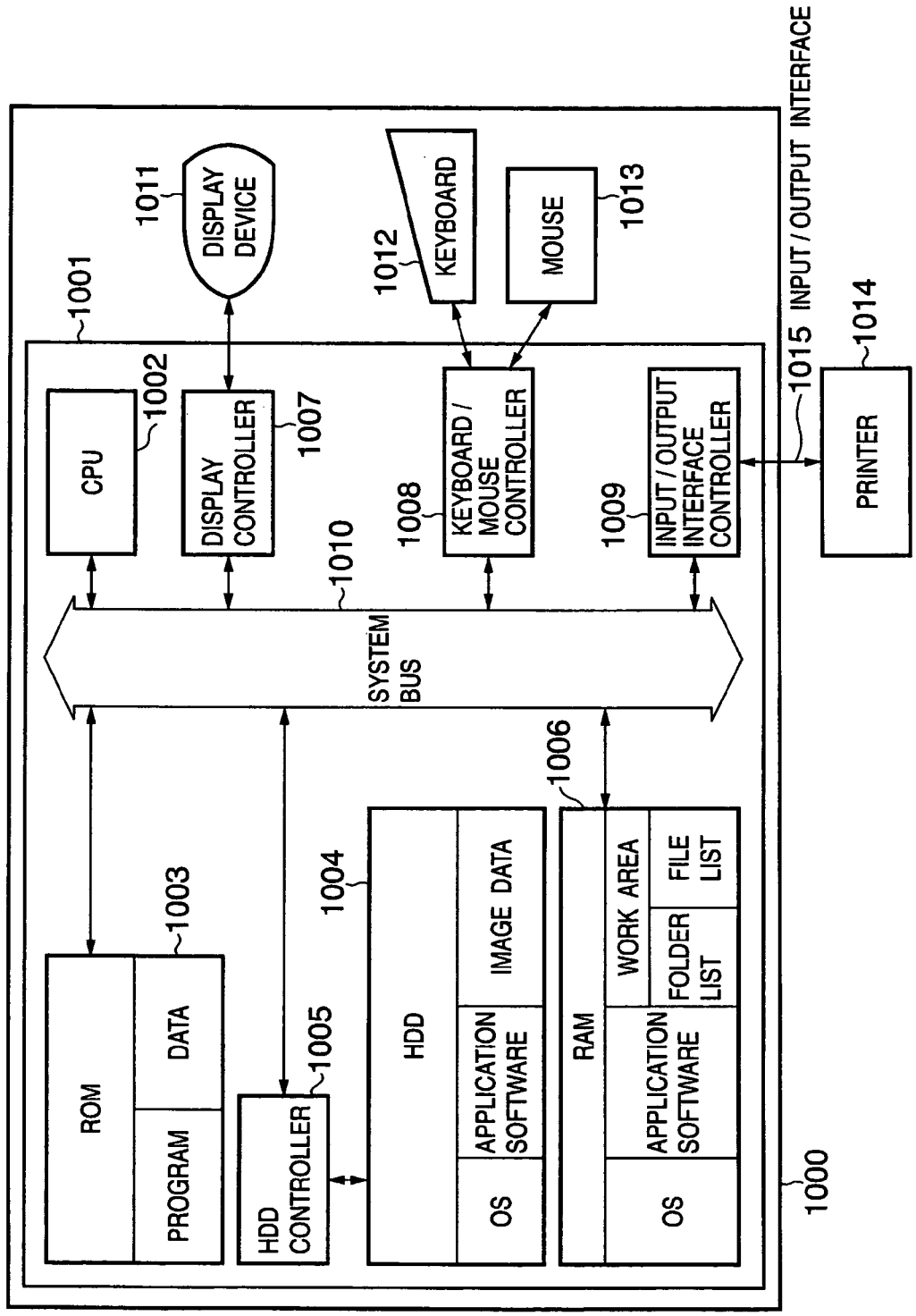
FIG. 1 is a block diagram schematically showing the hardware configuration of a printing control apparatus according to the first embodiment of the present invention.

FIG. 1 is a block diagram schematically showing the hardware configuration of a printing control apparatus according to the first embodiment of the present invention.

In FIG. 1, an information processing apparatus 1000 serving as a printing control apparatus according to the first embodiment comprises an information processing apparatus main body 1001, CPU 1002, ROM 1003, hard disk drive (HDD) 1004, HDD controller 1005, RAM 1006, display controller 1007, keyboard/mouse controller 1008, input/output interface controller 1009, system bus 1010, display device 1011, keyboard 1012, and mouse 1013.

Of these components, the CPU 1002, ROM 1003, hard disk drive (HDD) 1004, HDD controller 1005, RAM 1006, display controller 1007, keyboard/mouse controller 1008, input/output interface controller 1009, and system bus 1010 are incorporated in the information processing apparatus main body 1001.

The CPU 1002 reads out a program which is stored in the ROM 1003 or loaded into the RAM 1006, and executes the program to control the respective units in the information processing apparatus main body 1001.

The ROM 1003 stores programs for controlling the controllers 1005, 1007, 1008, and 1009, programs for loading an OS (Operating System) from the HDD 1004 to the RAM 1006 and activating the OS, and data used to execute these programs.

The HDD 1004 stores an OS for operating the information processing apparatus 1000, printing control application software for causing the information processing apparatus 1000 to function as a printing control apparatus, and image data corresponding to an image to be printed by the application software.

Software and data in the HDD 1004 are stored as files, respectively. A folder can be created in the HDD 1004, and can contain the above-mentioned files and other folders. With this configuration, the hierarchy structure of folders is formed in the HDD 1004, and files are arranged in the folder hierarchy.

The HDD controller 1005 controls access to the HDD 1004.

The OS and printing control application software stored in the HDD 1004 are loaded into the RAM 1006 via the HDD controller 1005. A work area used to execute each software program by the CPU 1002 is also allocated in the RAM 1006. A folder list and file list (both of which will be described later) are created in the work area.

Under the control of the CPU 1002, the display controller 1007 controls the display device 1011 which displays texts and images to the user of the information processing apparatus 1000. Under the control of the CPU 1002, the keyboard/mouse controller 1008 accepts an input from the user of the information processing apparatus 1000 via the keyboard 1012 and the mouse 1013 serving as appointing device (designation means). Since the information processing apparatus 1000 comprises the display device 1011, keyboard 1012, and mouse 1013, the user of the information processing apparatus 1000 can interactively operate the information processing apparatus 1000.

The system bus 1010 connects the respective units to each other in the information processing apparatus main body 1001, and transmits various data.

A printer 1014 prints a text and image in accordance with data of a specific format that is input via an input/output interface 1015. The printer 1014 is connected to the input/output interface controller 1009 of the information processing apparatus 1000 via the input/output interface 1015. In the first embodiment, the printer 1014 is assumed to be a color inkjet printer. However, the printer is not limited to this as far as it can print an image, and may be one using another printing technique, such as a laser beam printer, thermal transfer printer, or impact printer. In the first embodiment, the input/output interface is assumed to be a USB (Universal Serial Bus). However, the interface is not limited to this as far as it can transmit/receive data of the specific format between the information processing apparatus 1000 and the printer 1014, and may be one using another communication technique, such as IEEE (Institute of Electrical and Electronics Engineers) 1284, IEEE1394, IrDA (Infrared Data Association), IEEE802.11, or 100 Base TX.

In order to cause the information processing apparatus 1000 to function as a printing control apparatus in the above configuration, the printing control application must be installed in the HDD 1004 of the information processing apparatus 1000. This installation suffices to be done once except for any special reason.

Figure 2:
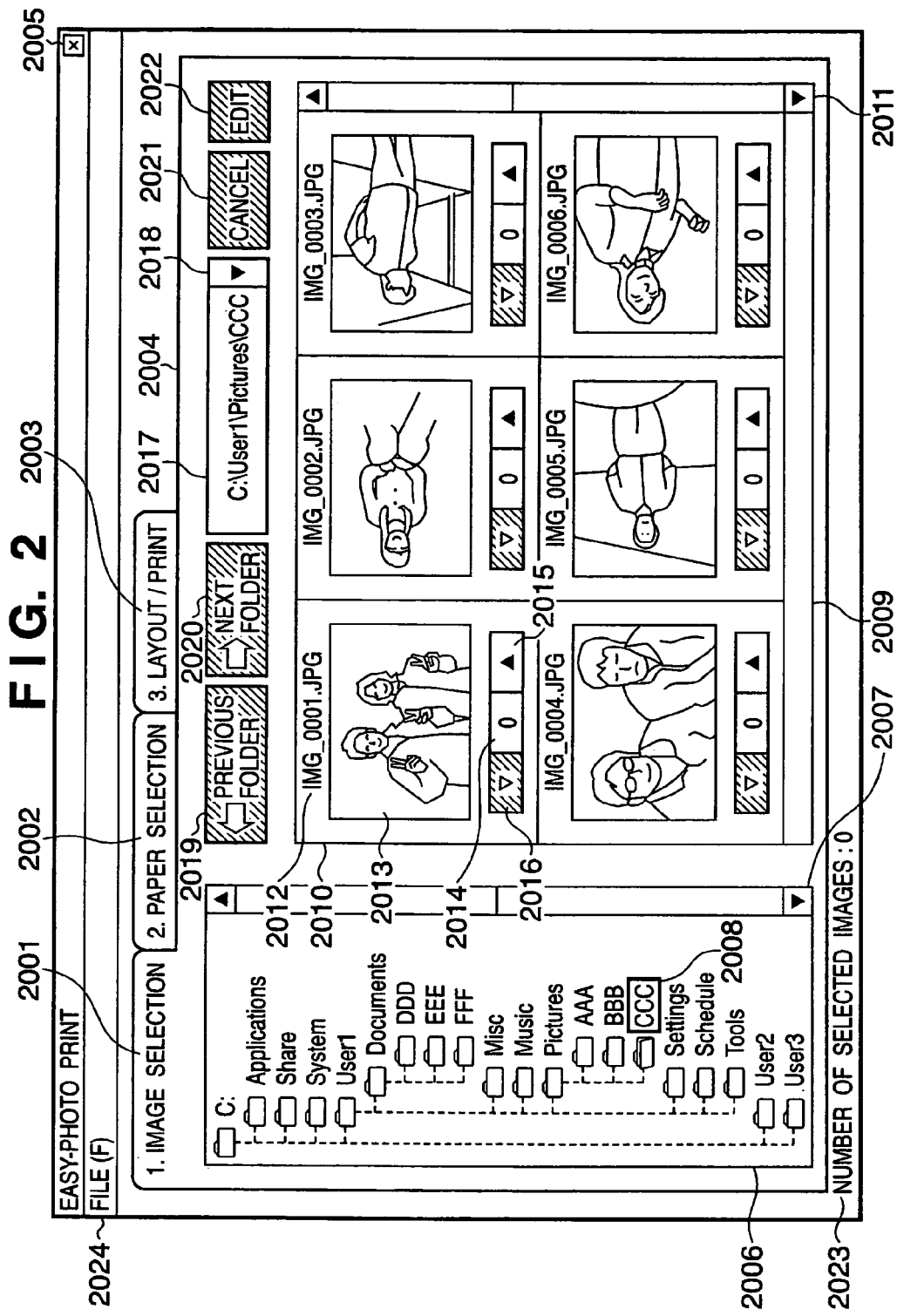
FIG. 2 is a view showing a display example on a display device in a "multiple folder mode" by a printing control application in the first embodiment.

FIG. 2 is a view showing a display example on the display device 1011 in a "multiple folder mode" by the printing control application in the first embodiment.

Reference numerals 2001, 2002, and 2003 denote tab areas. When the user designates a position in each tab and clicks the button of the mouse 1013, corresponding processing is activated. Reference numeral 2004 denotes a work area whose display is switched to contents corresponding to a designated work by selecting a tab. In FIG. 2, the first tab 2001 is selected, and the work area 2004 displays a work window for selecting an image to be printed by the printing control apparatus according to the first embodiment.

Reference numeral 2005 denotes an end button. When the user designates the position of this button and clicks the button of the mouse 1013, the printing control application ends.

Reference numeral 2023 denotes a selected-image count display portion. The selected-image count display portion 2023 displays the total print count of all images designated by a user operation in a thumbnail frame 2010 to be described later.

Reference numeral 2024 denotes a "file" menu. When the user designates the "file" menu 2024 and clicks the button of the mouse 1013, a drop-down menu having two choices "setup" and "end" is displayed. When the user designates "end" in the menu and clicks the button of the mouse 1013, the printing control application ends similarly to a case wherein the end button 2005 is selected. When the user designates "setup" in the menu and clicks the button of the mouse 1013, a "setup" dialog is opened to provide the user with a function of setting the overall printing control application.

Figure 19:
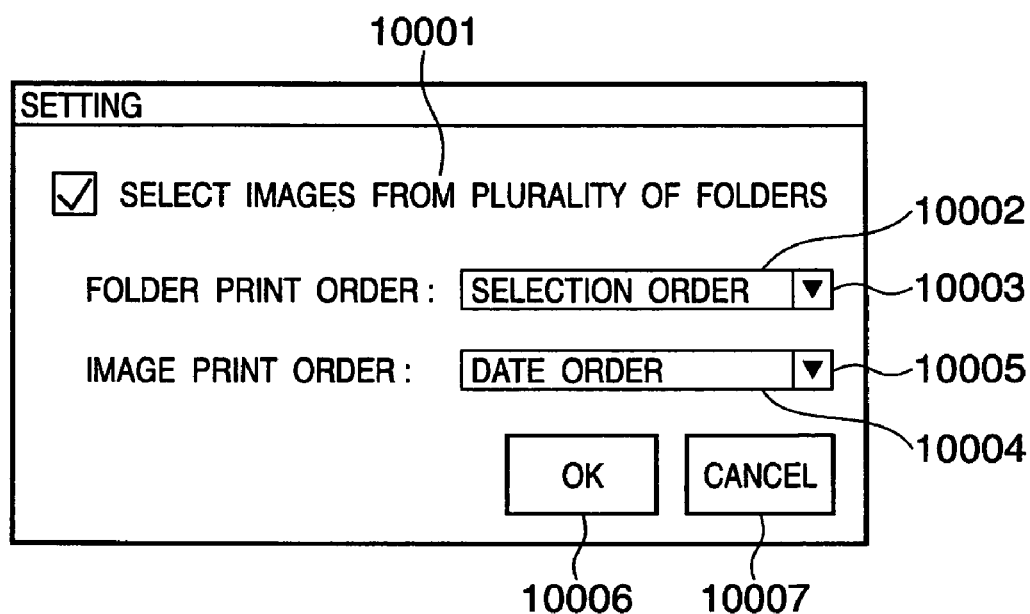
FIG. 19 is a view showing a display example of a "setup" dialog.

FIG. 19 is a view showing a display example of the "setup" dialog.

The printing control application in the first embodiment has a "single folder mode" in which images are selected from only a single folder, and a "multiple folder mode" in which images can be simultaneously selected from a plurality of folders. The user operates a mode setting check box 10001 to designate which of the modes is used to operate the printing control application.

When the user designates the mode setting check box 10001 and clicks the button of the mouse 1013, the mode setting check box 10001 is switched between a checked state and an unchecked state. The default setting is "unchecked" representing that the "single folder mode" is set. A processing operation of the printing control application in the "single folder mode" is basically the same as the prior art shown in FIG. 30, and a detailed description thereof will be omitted.

When the printing control application runs in the "multiple folder mode", it processes image files designated as print targets by each of folders containing the image files. More specifically, folders are sorted in accordance with a predetermined rule, and image files contained in each folder are sorted in accordance with another predetermined rule. Image files are printed in the order of the sorting results.

Reference numeral 10002 denotes a folder print order display field which displays the predetermined rule to sort folders. When the user designates a drop-down button 10003 and clicks the button of the mouse 1013, choices are displayed on a drop-down menu. The user designates one of the choices and clicks the button of the mouse 1013 again, and then the folder print order display field 10002 is updated to the designated choice.

At this time, three choices "date order", "name order", and "selection order" are displayed. The "date order" means to acquire the generation dates of folders each containing print images, and sort the folders in descending order of the dates. The "name order" means to sort the character strings of the full pathnames of folders in character code order. The "selection order" means to directly adopt, as the print order of folders, an order in which image files in folders are selected as print targets. The default value of the folder print order display field 10002 is the "selection order". A setting value in the folder print order display field 10002 is not used in the "single folder mode".

Reference numeral 10004 denotes an image print order display field which displays the predetermined rule to sort image files in each folder. When the user designates a drop-down button 10005 and clicks the button of the mouse 1013, choices are displayed on a drop-down menu. The user designates one of the choices and clicks the button of the mouse 1013 again, and then the image print order display field 10004 is updated to the designated choice.

Also at this time, the three choices "date order", "name order", and "selection order" are displayed. The "date order" means to acquire the photographing dates of images recorded as Exif (Exchangeable image file format) information in each print image file, and sort the image files in descending order of the dates. The "name order" means to sort the character strings of the file names of image files in character code order. The "selection order" means to adopt an order in which the user sets image files as print targets. The default value of the image print order display field 10004 is the "date order". The image print order in the "single folder mode" complies with a setting value in the image print order display field 10004.

Reference numeral 10006 denotes an "OK" button. When the user designates the "OK" button 10006 and clicks the button of the mouse 1013, the display contents of the mode setting check box 10001, folder print order display field 10002, and image print order display field 10004 at this time are finalized as current settings, the "setup" dialog in FIG. 19 is closed, and the window returns to one in FIG. 2.

Reference numeral 10007 denotes a "cancel" button. When the user designates the "cancel" button 10007 and clicks the button of the mouse 1013, a setting change in the "setup" dialog in FIG. 19 is canceled, the "setup" dialog in FIG. 19 is closed, and the window returns to one in FIG. 2.

Note that when the user does not open any "setup" dialog, settings used to previously execute the printing control application are applied. If neither the printing control application has been executed even once in the past nor the "setup" dialog has been opened, the default setting values are applied.

The processing procedures of the overall operation of the printing control application will be explained with reference to FIG. 3.

Figure 3:
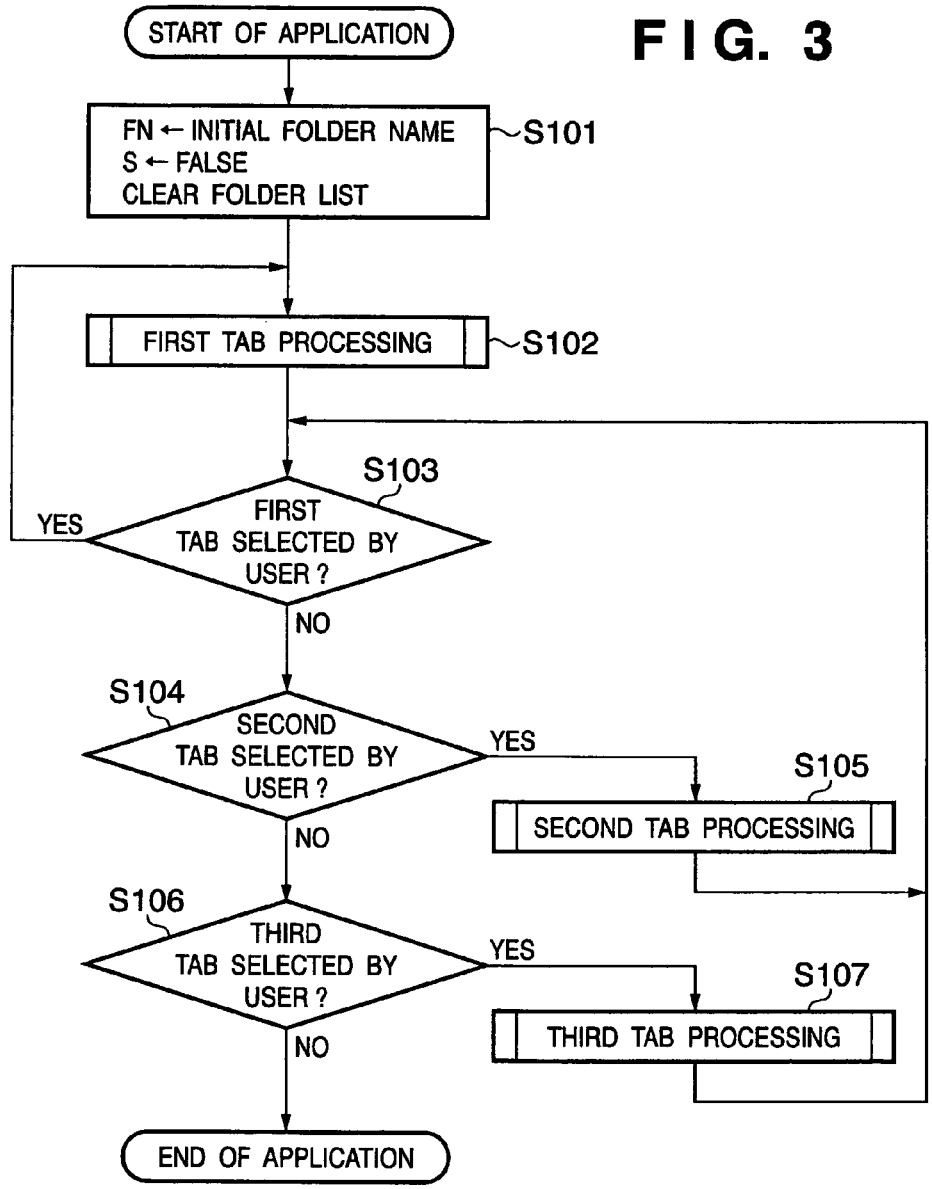
FIG. 3 is a flowchart showing the processing operation of the printing control application in the first embodiment.

FIG. 3 is a flowchart showing the processing operation of the printing control application. When the printing control application in the HDD 1004 is loaded into the RAM 1006 and executed by the CPU 1002, the processing starts from step S101.

In step S101, the printing control application is initialized. In step S101, an initial folder name is stored in a character string variable FN. The initial folder name is the character string of the full pathname of a folder in the HDD 1004, and is the name of a folder to be referred to in activating the printing control application. More specifically, the folder name is one referred to when the printing control application is previously executed. If no record of previous execution exists, for example, the name of a folder at the top of the folder hierarchy in the HDD 1004 is set. FALSE is stored in a flag variable S. The flag variable S is stored in the HDD 1004, and represents whether the setting is to print one or more image files in a folder of the name stored in the character string variable FN. Immediately after the printing control application is activated, it is set not to print any image, and the FALSE value is set.

Further in step S101, a folder list internally held in the application is cleared.

FIG. 4 is a table showing an example of the folder list. A folder list 3000 is a list of the table form that pairs a folder name 3001 and a link 3002 to a file list, as shown in FIG. 4. The folder list 3000 is created in the work area of the RAM 1006. The folder list 3000 records data of a folder in the HDD 1004 that contains an image file designated as a print target by the user of the printing control application. The folder list 3000 records data of 100 folders at maximum.

The folder name 3001 is the character string of the full path of a folder in the HDD 1004. The file list link 3002 is reference information (pointer) to a file list to be described later. The link 3002 records the start address of an area where a file list is stored in the work area of the RAM 1006. When no file list corresponding to the folder name 3001 exists, "0" is recoded as information representing that no reference list exists, as represented by 3003 in FIG. 4.

FIG. 5 is a table showing an example of the file list. A file list 4000 in FIG. 5 is a list of the table form that pairs a file name 4001 and print count 4002. The file list 4000 is created in the work area of the RAM 1006. The file list 4000 is created for each line of the folder list 3000, and records a print count set by the user of the image printing application for each image file in each folder in the HDD 1004. The file list 4000 registers only image files which are set to a print count of 1 or more, and does not register any image file which is set to a print count of 0. Note that the embodiment has described an example using a file name in order to specify each file. However, as far as files can be specified, they may be specified by numbers representing an order when files present in a target folder are sorted in name order.

The file name 4001 in the file list 4000 is the character string of the file name of an image file stored in a folder in the HDD 1004 that is designated by the folder name 3001 recorded in the folder list 3000 in correspondence with the file list 4000. The print count 4002 is designated by the user in the first tab processing to be described later, as the number by which an image file designated by a corresponding file name 4001 is printed.

File lists 4010 and 4020 also take the same structure as that of the file list 4000.

Referring back to the description of FIG. 3, in step S101, the folder list 3000 is cleared to be a blank list having no data. At this time, no file list 4000 or the like exists. Referring back to FIG. 3, the processing operation of the printing control application will be continuously explained.

In step S102, the first tab processing to be described later is executed. The first tab processing in step S102 ends when the tab area 2001, 2002, or 2003 or the end button 2005 in FIG. 2 is clicked. Then, the flow advances to step S103.

In step S103, it is determined whether the user has performed an operation to select the first tab. More specifically, when the user clicks the button of the mouse 1013 while designating the tab area 2001 in FIG. 2, it is determined that the first tab is selected. If the user selects the first tab, the flow returns to step S102 to repeat the first tab processing again.

If it is determined in step S103 that the user operation is not selection of the first tab, the flow advances to step S104 to determine whether the user has performed an operation to select the second tab. More specifically, when the user clicks the button of the mouse 1013 while designating the tab area 2002 in FIG. 2, it is determined that the second tab is selected. If the user selects the second tab, the flow advances to step S105 to perform the second tab processing to be described later. The second tab processing in step S105 ends when the tab area 2001, 2002, or 2003 or the end button 2005 in FIG. 2 is clicked. Then, the flow returns to step S103 to repeat determination of a user operation.

If it is determined in step S104 that the user operation is not selection of the second tab, the flow advances to step S106 to determine whether the user has performed an operation to select the third tab. More specifically, when the user clicks the button of the mouse 1013 while designating the tab area 2003 in FIG. 2, it is determined that the third tab is selected. If the user selects the third tab, the flow advances to step S107 to perform the third tab processing to be described later. The third tab processing in step S107 ends when the tab area 2001, 2002, or 2003 or the end button 2005 in FIG. 2 is clicked. Then, the flow returns to step S103 to repeat determination of a user operation.

When the user clicks the mouse 1013 while designating the end button 2005 in FIG. 5, it is determined in step S106 that the user operation is not selection of the third tab. It is therefore determined that the user performs an application end operation, and the operation of the printing control application ends.

Referring back to FIG. 2, the display of the work area 2004 used in the first tab processing in the "multiple folder mode" will be described.

Reference numeral 2006 denotes a folder tree display portion which displays folders of the hierarchy structure in the HDD 1004 in the tree form. A folder icon indicates each folder, and the name of the folder is displayed as a character string on the right side of the folder. "C:" at the top represents the top folder (root directory) in the HDD 1004, and contains folders named "Applications", "Share", and the like. A "User1" folder in the top folder further contains a "Documents" folder and the like. When contents which should be displayed at the folder tree display portion 2006 run over the display range, the display is scrolled up and down. The display is scrolled by operating a scroll bar 2007 by the user via the mouse 1013.

At the folder tree display portion 2006, reference numeral 2008 denotes a currently selected folder whose full pathname is designated by the character string variable FN. In the example of FIG. 2, a folder "C:\User\Pictures\CCC" is selected. The folder name "CCC" is framed, and the folder icon is displayed by changing it into a folder-opening shape. At the folder tree display portion 2006, a single folder is always selected.

When the user designates a folder other than the currently selected folder 2008 at the folder tree display portion 2006 and clicks the button of the mouse 1013, it is determined that the designated folder is newly selected. The display at the folder tree display portion 2006 is updated, and the character string of the full pathname of the folder is stored in the character string variable FN. At the same time, if necessary, the folder list 3000 is updated, and the file list 4000 is created and updated.

Reference numeral 2009 denotes a thumbnail display portion which displays 0 or more thumbnail frames 2010. When image files are stored in a folder of the folder name FN that is selected at the folder tree display portion 2006, thumbnail frames 2010 are laid out and displayed one by one for the respective image files. The display size of the thumbnail frame 2010 is constant regardless of the number of image files in a selected folder. For this reason, when the number of image files in a selected folder is large and all thumbnail frames cannot be displayed within the thumbnail display portion 2009, a scroll bar 2011 for scrolling the display up and down is displayed. The display is scrolled by operating the scroll bar 2011 by the user via the mouse 1013. When no image file is stored in the selected folder, the thumbnail display portion 2009 becomes blank not to display any thumbnail frame.

Thumbnail frames corresponding to respective image files have the same structure as follows.

In the thumbnail frame 2010, reference numeral 2012 denotes an image file name display field which displays the character string of the file name of an image file corresponding to the thumbnail frame 2010. Reference numeral 2013 denotes a thumbnail display field in which an image stored in an image file corresponding to the thumbnail frame 2010 is reduced and displayed. Reference numeral 2014 denotes a print count display field which displays a count at which an image file corresponding to the thumbnail frame 2010 is printed.

Reference numeral 2015 denotes a print count increment button. When the user clicks the button of the mouse 1013 while designating this button, the print count of an image corresponding to the thumbnail frame 2010 is incremented by one, and the display of the print count display field 2014 is updated. Reference numeral 2016 denotes a print count decrement button. When the user clicks the button of the mouse 1013 while designating this button, the print count of an image corresponding to the thumbnail frame 2010 is decremented by one, and the display of the print count display field 2014 is updated. Note that when the value displayed in the print count display field 2014 is 0, the print count decrement button 2016 is hatched as shown in FIG. 2, in order to notify the user that no print count can be decremented with this button.

The print count of each image is set to 0 (inclusive) to 99 (inclusive). While "0" is displayed in the print count display field 2014, further decrement of the print count is inhibited, and the print count decrement button 2016 is disabled, as shown in FIG. 2. While "99" is displayed in the print count display field 2014, further increment of the print count is inhibited, and the print count increment button 2015 is disabled. When the value in the print count display field 2014 falls within a range of 1 to 98, both increment and decrement of the print count are possible, and both the print count increment button 2015 and print count decrement button 2016 are enabled.

When the user selects a folder other than the currently selected folder FN while the user sets the print count of one or more image files to 1 or more at the thumbnail display portion 2009, i.e., one or more image files to be printed exist in the folder FN, the file list 4000 of the format illustrated in FIG. 5 is created, which registers all image files each set to a print count of 1 or more in the folder FN. The folder FN is registered in the folder list 3000 of FIG. 4, and link information to the file list is recorded.

At this time, if the folder FN has already been registered in the folder list 3000, it is not repetitively registered in the folder list 3000. Instead, a file list which already exists with a link being recorded on the line of the folder FN present in the folder list 3000 is updated to the current print count setting.

When the user selects a folder other than the currently selected folder FN while the folder FN has already been registered in the folder list 3000 and the print counts of all image files are set to 0 at the thumbnail display portion 2009, i.e., printing of all image files in a folder registered in the folder list 3000 is canceled, only the file list link 3002 is cleared to a value "0" representing that no file list exists, and a file list corresponding to the folder FN is deleted from the work area of the RAM 1006 without deleting the line of the file list FN present in the folder list 3000.

When the folder FN has already been registered in the folder list 3000 but no corresponding file list exists, the user selects a folder other than the currently selected folder FN while the print counts of one or more image files are set to 1 or more at the thumbnail display portion 2009. In this case, a file list is newly created, and link information to the file list is recorded on the line of the folder FN present in the folder list 3000.

Reference numeral 2017 denotes a folder name display portion which displays, as a character string, the full pathname of the folder 2008 currently selected at the folder tree display portion 2006, i.e., the value of the character string variable FN. If the full pathname is longer than the width of the folder name display portion 2017 and cannot be entirely displayed, the intermediate part of the character string of the full pathname is omitted to display the character string. By referring to the start part of the character string of the full pathname, the user can obtain a rough position of the folder 2008 in the folder hierarchy in the HDD 1004. By referring to the last part of the character string of the full pathname, the user can obtain the folder name of the folder 2008.

Figure 16:
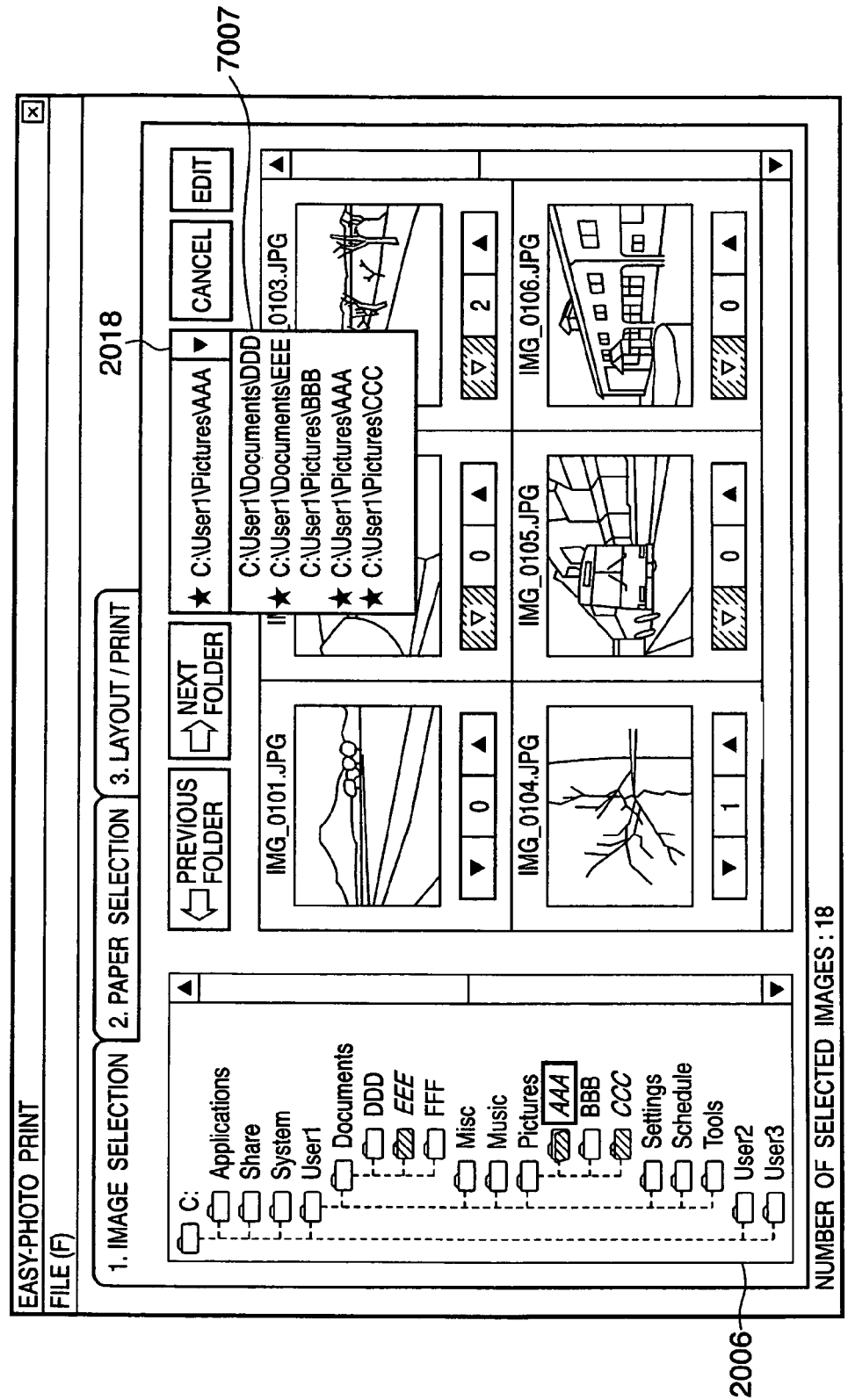
FIG. 16 is a view showing a display example when the selected folder list is displayed.

Reference numeral 2018 denotes a selected-folder list display button which displays a selected folder list when the user clicks the button of the mouse 1013 while designating the button 2018. The selected folder list lists and displays all folder names 3001 registered in the folder list 3000 illustrated in FIG. 4. The selected folder list displays the full path of each folder name 3001. FIG. 16 shows a display example on the display device 1011 when the folder list 3000 has contents shown in FIG. 4 and the selected folder list is displayed. The full pathname of the oldest folder registered in the folder list 3000 is displayed at the bottom of a selected folder list 7007. The full pathnames of subsequent folders are displayed in registration order toward the top of the selected folder list 7007. The full pathname of the last folder registered in the folder list 3000 is displayed at the top of the selected folder list 7007.

If the full pathname is longer than the width of the selected folder list 7007 and cannot be entirely displayed, the intermediate part of the character string of the full pathname is omitted to display the character string. By referring to the start part of the character string of the full pathname, the user can obtain a rough position of the folder in the folder hierarchy in the HDD 1004. By referring to the last part of the character string of the full pathname, the user can obtain the name of the folder.

When the user designates any folder name in the selected folder list 7007 and clicks the button of the mouse 1013 while the selected folder list 7007 is displayed, it is determined that the designated folder is newly selected, so the display of the folder tree display portion 2006 is updated. The thumbnail display portion 2009 is also updated to thumbnail frames corresponding to image files in the newly selected folder. The folder name display portion 2017 and the value of the character string variable FN are also updated.

Reference numeral 2019 denotes a "previous folder" button. When the user clicks the button of the mouse 1013 while designating this button, a folder registered immediately before the currently selected folder 2008 in the folder list 3000 is regarded to be newly selected, and the display of the folder tree display portion 2006 is updated. The thumbnail display portion 2009 is also updated to thumbnail frames corresponding to image files in the newly selected folder. The folder name display portion 2017 and the value of the character string variable FN are also updated.

When the "previous folder" button 2019 is clicked while the currently selected folder 2008 is not registered in the folder list 3000, the last folder registered in the folder list 3000 is regarded to be newly selected.

Note that if no folder is registered in the folder list 3000, the "previous folder" button 2019 is disabled to inhibit any processing corresponding to a user operation.

If the currently selected folder 2008 is the first folder registered in the folder list 3000, no previous folder exists in the folder list 3000. Thus, the "previous folder" button 2019 is disabled to inhibit any processing corresponding to a user operation.

Reference numeral 2020 denotes a "next folder" button. When the user clicks the button of the mouse 1013 while designating this button, a folder registered immediately after the currently selected folder 2008 in the folder list 3000 is regarded to be newly selected, and the display of the folder tree display portion 2006 is updated. The thumbnail display portion 2009 is also updated to thumbnail frames corresponding to image files in the newly selected folder. The folder name display portion 2017 and the value of the character string variable FN are also updated.

When the currently selected folder 2008 is not registered in the folder list 3000, the "next folder" button is disabled to inhibit any processing corresponding to a user operation. If the currently selected folder 2008 is a folder registered at the end of the folder list, no subsequent folder exists in the folder list 3000. Thus, the "next folder" button 2020 is disabled to inhibit any processing corresponding to a user operation.

Reference numeral 2021 denotes a "cancel" button. When the user clicks the button of the mouse 1013 while designating this button, a "cancellation of folder selection" dialog for deleting registration of a folder from the folder list 3000 in FIG. 4 is displayed on the display 1011. If no folder is registered in the folder list 3000, the "cancel" button is disabled to inhibit any processing corresponding to a user operation.

Figure 6:
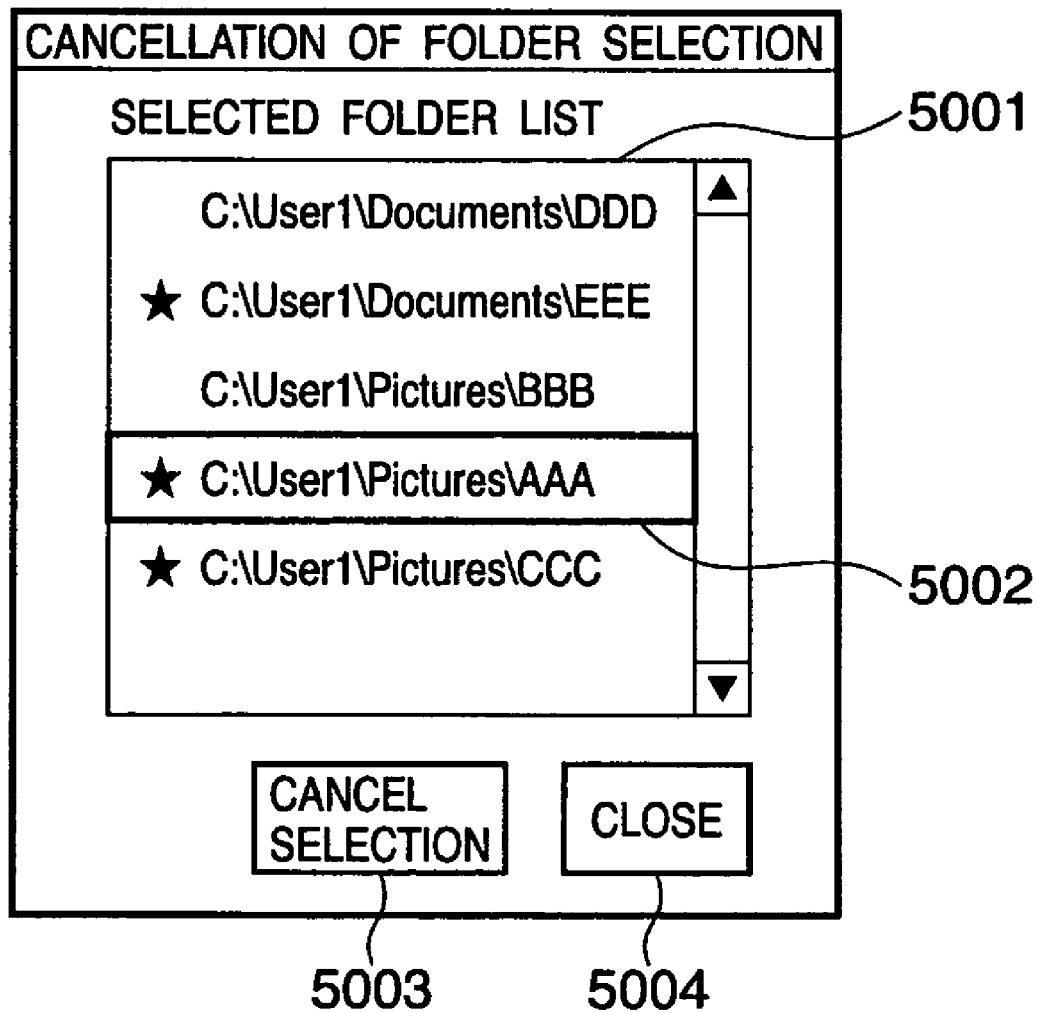
FIG. 6 is a view showing a display example of a "cancellation of folder selection" dialog.

FIG. 6 is a view showing a display example of the "cancellation of folder selection" dialog.

Reference numeral 5001 denotes a selected folder list which displays the same contents as those of the selected folder list 7007 in FIG. 16. When the user designates one of folders in the selected folder list and clicks the button of the mouse 1013, a designated folder is highlighted, as represented by 5002.

Reference numeral 5003 denotes a "cancel selection" button. When the user designates the "cancel selection" button 5003 and clicks the button of the mouse 1013 while selecting one or more folders in the selected folder list 5001, the highlighted folder name 5002 is erased from the selected folder list 5001. At the same time, the line of the corresponding folder is deleted from the folder list 3000 in FIG. 4. If the address of the file list is registered in the link field 3002 to the file list on the line to be deleted from the folder list 3000, the registered file list is erased from the work area of the RAM 1006. In this case, all the print settings of image files in the registration-canceled folder are also canceled.

When no folder is selected from the selected folder list 5001, the "cancel selection" button 5003 is disabled to inhibit any processing corresponding to a user operation.

Reference numeral 5004 denotes a "close" button. When the user designates the "close" button 5004 and clicks the button of the button of the mouse 1013, the "cancellation of folder selection" dialog in FIG. 6 is closed, and the window returns to one in FIG. 2.

In FIG. 2, reference numeral 2022 denotes an "edit" button. When the user clicks the button of the mouse 1013 while designating this button, an "editing of selected folder" dialog for deleting registration of a folder from the folder list 3000 in FIG. 4 is displayed on the display 1011. If no folder is registered in the folder list 3000, the "edit" button is disabled to inhibit any processing corresponding to a user operation.

Figure 7:
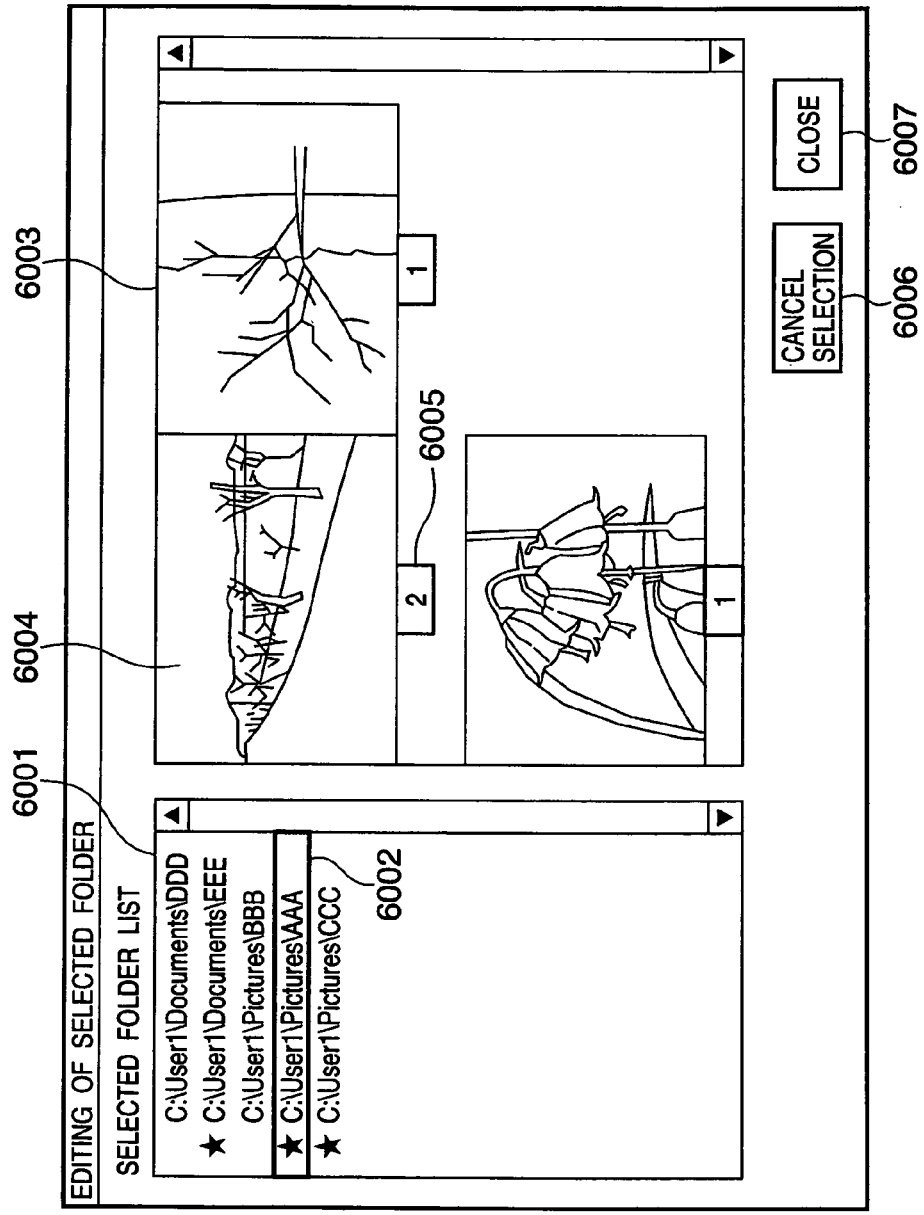
FIG. 7 is a view showing a display example of an "editing of selected folder" dialog.

FIG. 7 is a view showing a display example of the "editing of selected folder" dialog.

Reference numeral 6001 denotes a selected folder list which displays the same contents as those of the selected folder list 7007 in FIG. 16. When the user designates one of folders in the selected folder list and clicks the button of the mouse 1013, a designated folder is highlighted, as represented by 6002.

Reference numeral 6003 denotes a thumbnail display portion. When one of folders is selected from the selected folder list 6001, image files recorded in a file list whose address is indicated by the file list link 3002 corresponding to the folder selected from the folder list 3000, i.e., all images in the folder selected from the selected folder list 6001 for which the user designates a print count of 1 or more are listed and displayed.

Reference numeral 6004 denotes a thumbnail display field in which an image file registered in the file list, i.e., an image recorded in an image file whose print count is designated to 1 or more is reduced and displayed. Reference numeral 6005 denotes a print count display field which displays the print count of an image recorded in the file list.

When no file list corresponding to a folder selected in the selected folder list 6001 exists in the folder list 3000, the thumbnail display portion 6003 becomes blank not to display anything. Also when no folder is selected in the selected folder list 6001, the thumbnail display portion 6003 becomes blank not to display anything.

When a plurality of folders are selected from the selected folder list 6001, the thumbnail display portion 6003 displays the thumbnail and print count of the last folder selected by the user.

Reference numeral 6006 denotes a "cancel selection" button. A processing operation when the user designates the "cancel selection" button 6006 and clicks the button of the mouse 1013 is the same as that for the "cancel selection" button 5003 in FIG. 6, and a description thereof will be omitted. When no folder is selected from the selected folder list 6001, the "cancel selection" button 6006 is also disabled to inhibit any processing corresponding to a user operation.

Reference numeral 6007 denotes a "close" button. When the user designates the "close" button 6007 and clicks the button of the button of the mouse 1013, the "editing of selected folder" dialog in FIG. 7 is closed, and the window returns to one in FIG. 2.

Figure 8:
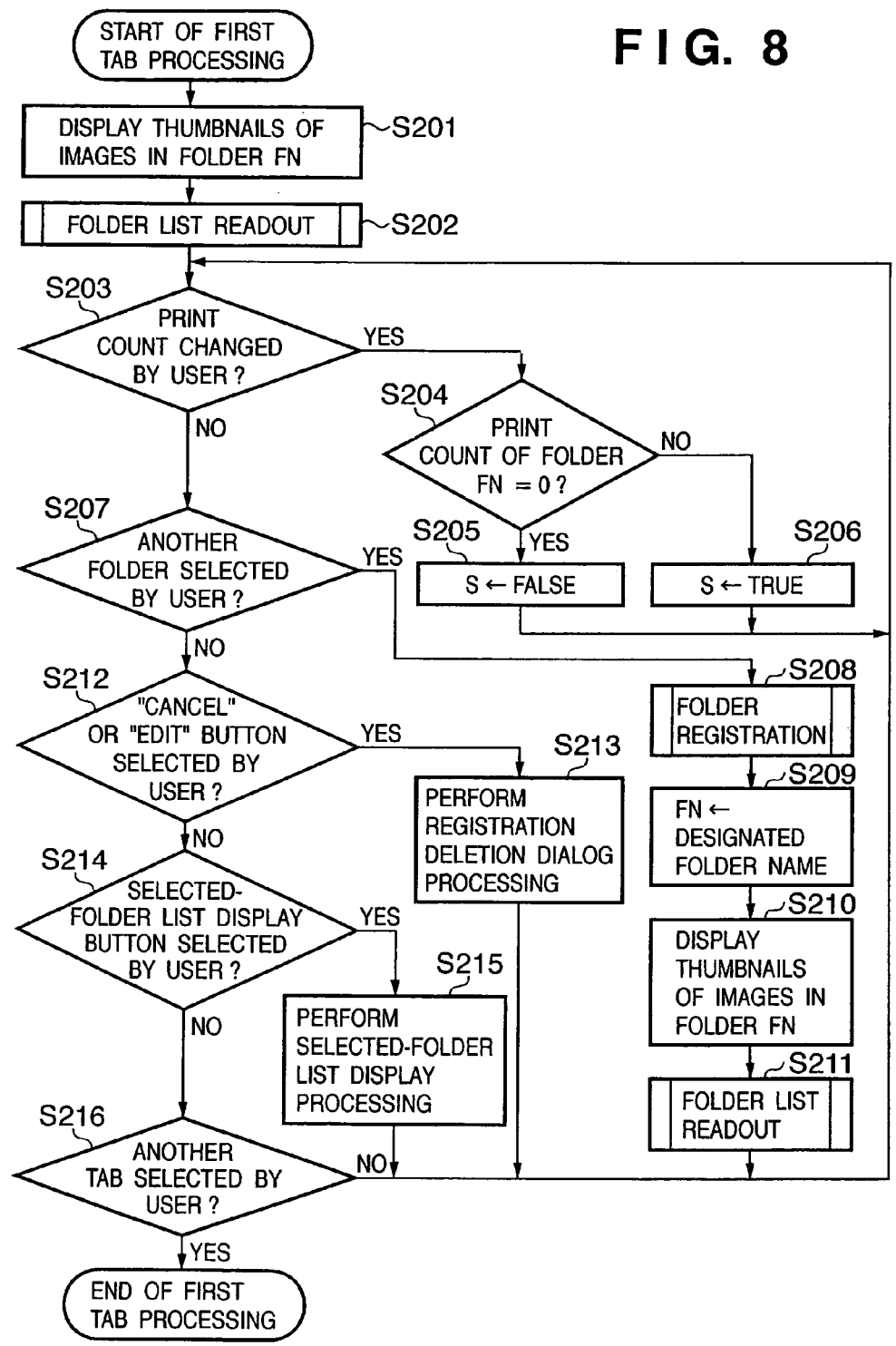
FIG. 8 is a flowchart showing the processing operation of the first tab processing by the printing control application in the first embodiment.

The procedures of the first tab processing by the printing control application in the "multiple folder mode" will be explained with reference to FIG. 8. FIG. 8 is a flowchart showing the processing operation of the first tab processing by the printing control application in the first embodiment. This processing operation corresponds to detailed procedures of the processing in step S102 in the flowchart of FIG. 3.

When the first tab is opened, the HDD 1004 is searched for a folder designated by a folder name stored in the character string variable FN in step S201. The reduced images of image files stored in the folder are laid out and displayed as the thumbnails 2013 in the thumbnail frames 2010 at the thumbnail display portion 2009.

Figure 9:
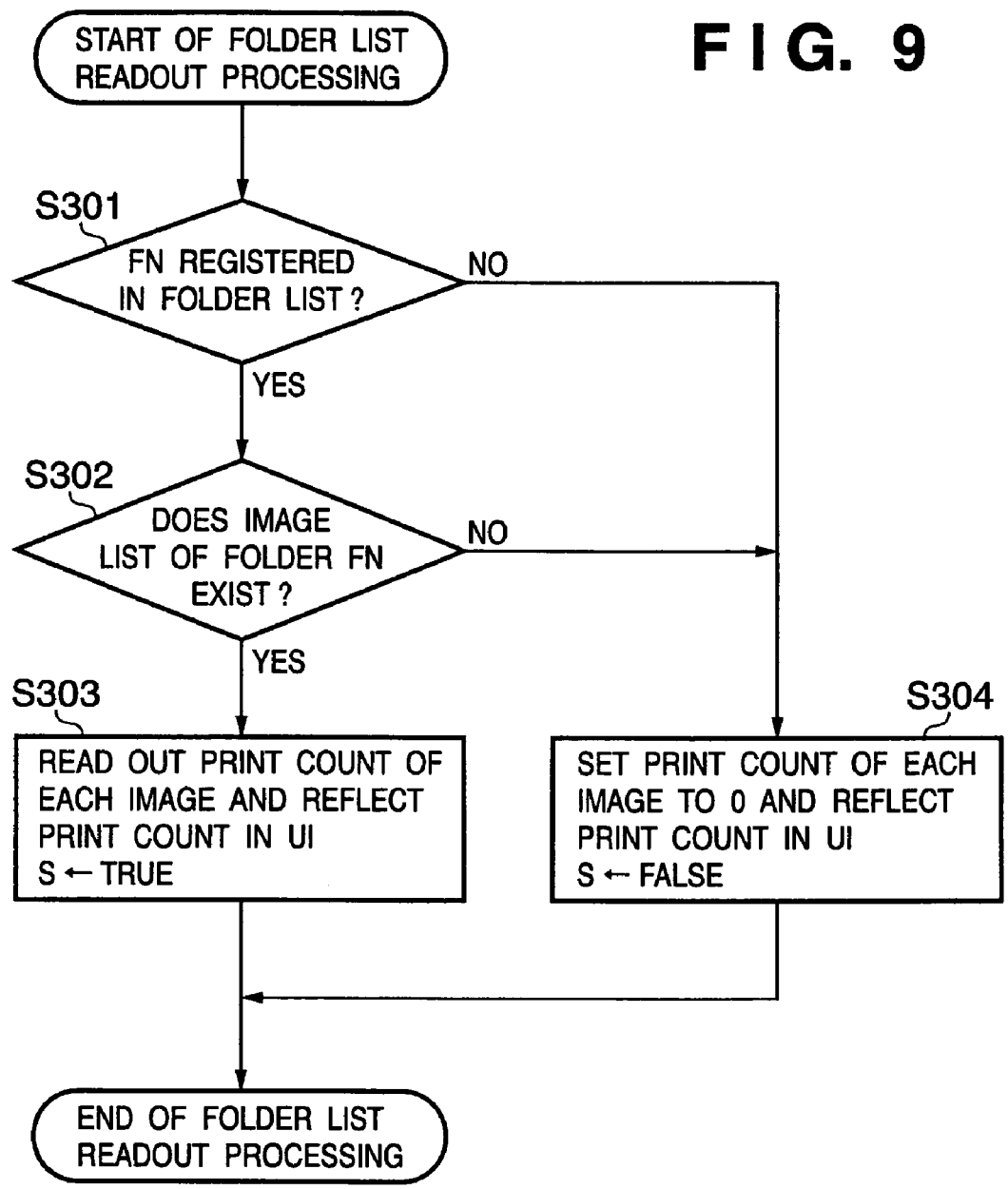
FIG. 9 is a flowchart showing the processing operation of folder list readout processing.

In step S202, folder list readout processing is done. FIG. 9 is a flowchart showing the processing operation of the folder list readout processing in step S202.

In step S301 of FIG. 9, it is determined whether a folder name given by the value of the character string variable FN is registered in a folder list created in the work area of the RAM 1006. If the folder name is registered, the flow advances to step S302; if no folder name is registered, to step S304.

In step S302, a line corresponding to the folder name FN in the folder list is referred to, and a link to the file list is acquired. The flow branches depending on whether the link to the file list exists. If the link to the file list exists, the flow advances to step S303; if no link exists, to step S304.

Processing in step S303 is done when the file list of the folder FN exists. This corresponds to a case wherein the user of the image printing application in the first embodiment sets to print at least one image file in the folder FN.

In step S303, the file list corresponding to the folder FN is referred to using the link to the file list, and the print count of each image file in the folder FN is acquired. The acquired print count is reflected in the print count display field 2014 of each of the thumbnail frames 2010 which are laid out and displayed at the thumbnail display portion 2009 in FIG. 2. In addition, TRUE is stored in the flag variable S. As for an image file not registered in the file list, the print count in the print count display field 2014 is 0.

If it is determined in step S301 that no folder FN is registered in the folder list, or if it is determined in step S302 that no file list link corresponding to the folder FN exists in the folder list, processing in step S304 is performed. This corresponds to a case wherein it is set not to print any image file in the folder FN.

In step S304, the print count display field 2014 of each of the thumbnail frames 2010 which are laid out and displayed at the thumbnail display portion 2009 in FIG. 2 is cleared to 0. Further, FALSE is stored in the flag variable S.

As described above, when a folder of a name designated by the character string variable FN is registered in the folder list in the folder list readout processing shown in FIG. 9, the print count of each image file in the folder FN is set in accordance with the file list. When no folder of the designated name is registered, the print count of each image is reset to 0. Whether the total print count of images is set to 1 or more is stored in the flag variable S. Immediately after the printing control application is activated, the folder list is blank, thus the processing in step S304 is executed in the folder list readout processing of FIG. 9 to set the flag variable S to FALSE.

Referring back to FIG. 8, the first tab processing procedures will be continuously described. In step S203 subsequent to step S202, the type of operation by the user via the mouse 1013 is determined, and the flow branches. If the user operation is a change of the print count by clicking the print count increment button 2015 or print count decrement button 2016 in FIG. 2, the flow branches to step S204; otherwise, to step S207.

In step S204, the total number of print counts displayed in the print count display fields 2014 of the thumbnail frames 2010 at the thumbnail display portion 2009 in FIG. 2 after the change by the user operation is calculated. When the total print count of all images is 0, the flow branches to step S205; otherwise, to step S206.

In step S205, FALSE is stored in the flag variable S. This represents a setting not to print any image file in the folder FN. In step S206, TRUE is stored in the flag variable S. This represents a setting to print at least one image file in the folder FN.

After the processing in either step S205 or S206 is executed, the flow returns to step S203 to wait for the next user operation via the mouse 1013.

If it is determined in step S203 that the user operation is not a change of the print count, it is determined in step S207 whether the user operation is selection of another folder. More specifically, the operation to select another folder includes an operation to designate a folder other than the currently selected folder 2008 from the folder tree display portion 2006 in FIG. 2 and click the button of the mouse 1013, an operation to designate the selected-folder list display button 2018, click the button of the mouse 1013, then designate a folder other than the currently selected folder 2008 from the displayed selected folder list 7007, and click the button of the mouse 1013 again, an operation to designate the "previous folder" button 2019 and click the button of the mouse 1013, and an operation to designate the "next folder" button 2020 and click the button of the mouse 1013. If one of these operations is done by the user, the flow advances to step S208; otherwise, to step S212.

Figure 10:
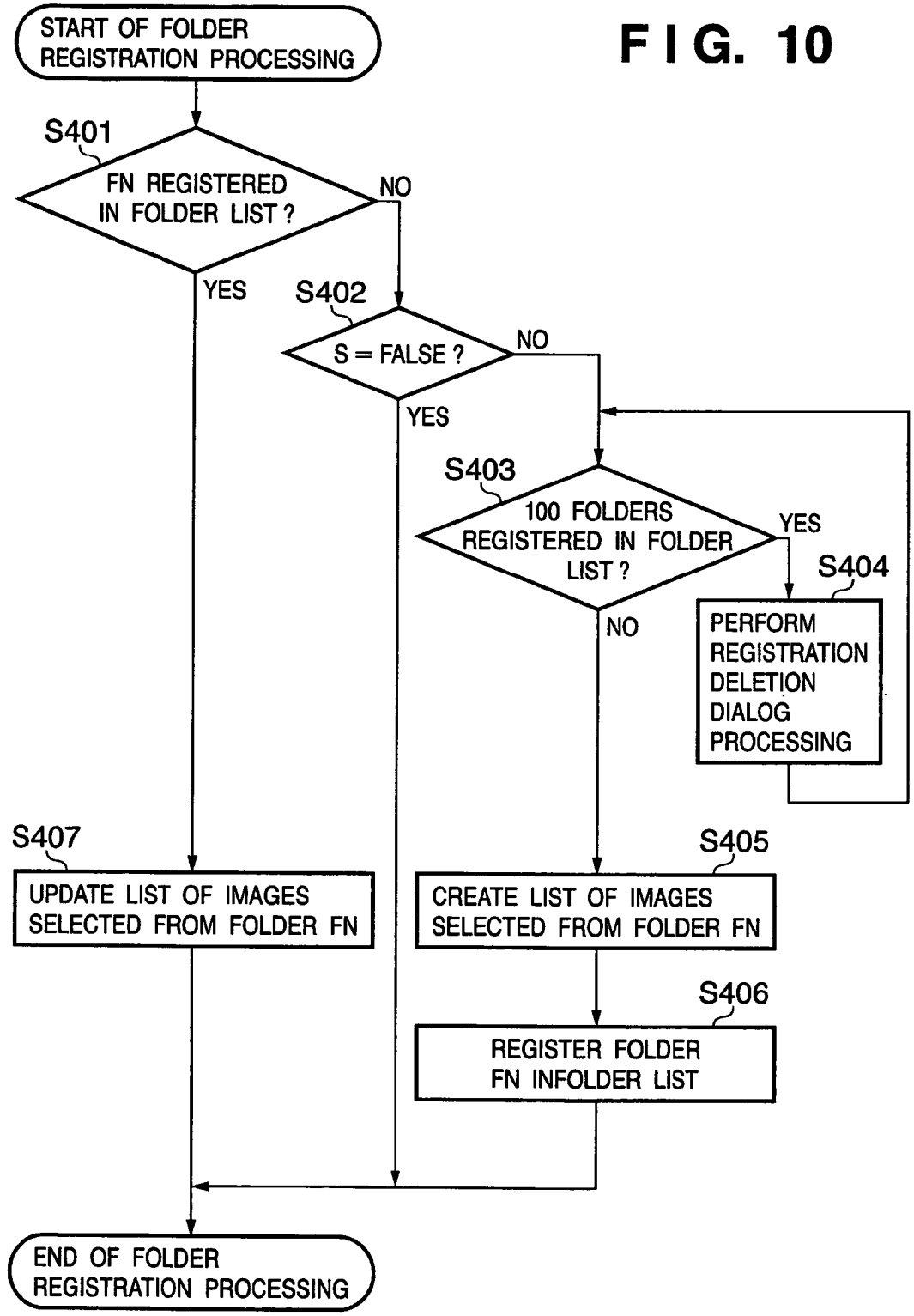
FIG. 10 is a flowchart showing the processing operation of folder registration processing.

In step S208, folder registration processing is executed. The folder registration processing is to, when the user changes a selected folder, register the image print count setting status of the selected folder in the folder list 3000 and file list, as needed, or update the registration contents. FIG. 10 is a flowchart showing the processing operation of the folder registration processing.

In step S401 of FIG. 10, it is determined whether a folder name given by the value of the character string variable FN is registered in a folder list created in the work area of the RAM 1006. If the folder name is registered, the flow advances to step S407; if no folder name is registered, to step S402.

In step S402, it is determined whether the flag variable S is FALSE. When it is determined that the flag variable S is FALSE, a folder FN which has been selected is not registered in the folder list 3000, and does not contain any image to be printed. Hence, registration in the folder list 3000 and file list and update of each list are unnecessary, and the folder registration processing in FIG. 10 ends.

When the flag variable S is TRUE, the folder FN has not been registered in the folder list 3000 yet, and the user sets to print one or more images in the folder FN. Thus, the folder FN needs to be newly added and registered in the folder list 3000. In this case, the flow advances to step S403 to determine whether the number of folders registered in the folder list 3000 has reached 100. If 100 folders (maximum) have been registered, the flow advances to step S404; otherwise, to step S405.

The flow advances to step S404 when 100 folders have already been registered in the folder list 3000, so no folder can be additionally registered. For this reason, registration deletion dialog processing is performed in step S404. This processing is to display the "cancellation of folder selection" dialog described with reference to FIG. 6 and delete registration of a folder from the folder list 3000 in accordance with a user operation. After the end of the processing, the flow returns to step S403.

In step S405, a file list of the format shown in FIG. 5 is created in the work area of the RAM 1006. File names and print counts are registered for all image files for which the print count is set to 1 or more in the print count display fields 2014 in the thumbnail frames 2010 at the thumbnail display portion 2009.

In step S406, the folder FN is registered in the folder list 3000 created in the work area of the RAM 1006. On a new line of the folder list 3000, the value of the character string variable FN is written as the folder name 3001, and the start address of the storage area of the file list created in step S405 is written as the file list link 3002. After that, the processing to newly add and register the folder FN ends, and the folder registration processing in FIG. 10 ends.

If it is determined in step S401 that the folder FN has already been registered in the folder list 3000, a file list corresponding to the folder FN is updated in step S407. The folder name field 3001 of the folder list 3000 is searched for the folder name FN, and a file list link 3002 on the found line is acquired. The contents of a file list recorded at the acquired address are updated by the file names and print counts of all image files for which the print count is set to 1 or more in the print count display fields 2014 of the thumbnail frames 2010 at the thumbnail display portion 2009 at this time. If a value "0" representing that no file list exists is recorded in the file list link 3002, a file list is newly created. To the contrary, if the print counts of all image files are set to 0 at the thumbnail display portion 2009, the file list is deleted from the work area of the RAM 1006, and the value "0" representing that no file list exists is recorded in the file list link 3002 of the folder list 3000.

By the above processing, the folder registration processing ends.

Referring back to FIG. 8, a folder name newly selected by the user operation is stored in the character string variable FN in step S209 next to the folder registration processing in step S208.

In step S210, the HDD 1004 is searched for a folder designated by the folder name newly stored in the character string variable FN. The reduced images of image files stored in the folder are laid out and displayed as the thumbnails 2013 in the thumbnail frames 2010 at the thumbnail display portion 2009.

In step S211, folder list readout processing is done. This folder list readout processing is identical to that in step S202, and a description thereof will be omitted. By the folder list readout processing in step S211, each print count display field 2014 at the thumbnail display portion 2009 and the flag variable S are properly set. Then, the flow returns to step S203 to wait for the next user operation via the mouse 1013.

If it is determined in step S207 that the user operation is not selection of another folder, it is determined in step S212 whether the user operation is designation of the "cancel" button 2021 or "edit" button 2022 and click the button of the mouse 1013. If the user operation is one of these operations, the flow advances to step S213; otherwise, to step S214.

In step S213, registration deletion dialog processing is executed. If the user designates the "cancel" button 2021 in step S212, the "cancellation of folder selection" dialog in FIG. 6 is displayed; if the user designates the "edit" button 2022, the "editing of selected folder" dialog is displayed. Then, the processing of the dialog is executed. If the user designates the "close" button of the displayed dialog and clicks the button of the mouse 1013, the processing in step S213 ends, and the flow returns to step S203 to wait for the next user operation via the mouse 1013.

If the user operation is not designation of the "cancel" button 2021 or "edit" button 2022 in step S212, it is determined in step S214 whether the user operation is designation of the selected-folder list display button 2018 and clicking of the button of the mouse 1013. If the user operation is selection of the selected-folder list display button 2018, a selected folder list is displayed in step S215. Then, the flow returns to step S203 to wait for the next user operation via the mouse 1013.

If it is determined in step S214 that the user operation is not selection of the selected-folder list display button 2018, it is determined in step S216 whether the user operation is designation of one of the tabs 2002 and 2003 and the end button 2005 other than the first tab 2001 and clicking of the button of the mouse 1013. If the user operation is one of these operations, the first tab processing shown in FIG. 8 ends, and the control shifts to step S103 in FIG. 3; otherwise, the flow returns to step S203 to wait for the next user operation via the mouse 1013.

The above-described first tab processing operation in the "multiple folder mode" will be further explained using a display example of a window corresponding to a user operation.

FIG. 2 described above shows a display example on the display 1011 when the folder "CCC" 2008 is selected at the folder tree display portion immediately after the printing control application is activated. The print count of any image file at the thumbnail display portion 2009 is kept at 0 which is an initial value set in step S304 of FIG. 9 called from step S202 of FIG. 8. Hence, the print count display field 2014 in each thumbnail frame 2010 exhibits 0, and the print count decrement button 2016 is disabled. The selected-image count display portion 2023 also displays 0.

At this time, the folder list 3000 is kept cleared in step S101 of FIG. 3, so all the "previous folder" button 2019, "next folder" button 2020, "cancel" button 2021, and "edit" button 2022 are disabled.

Figure 11:
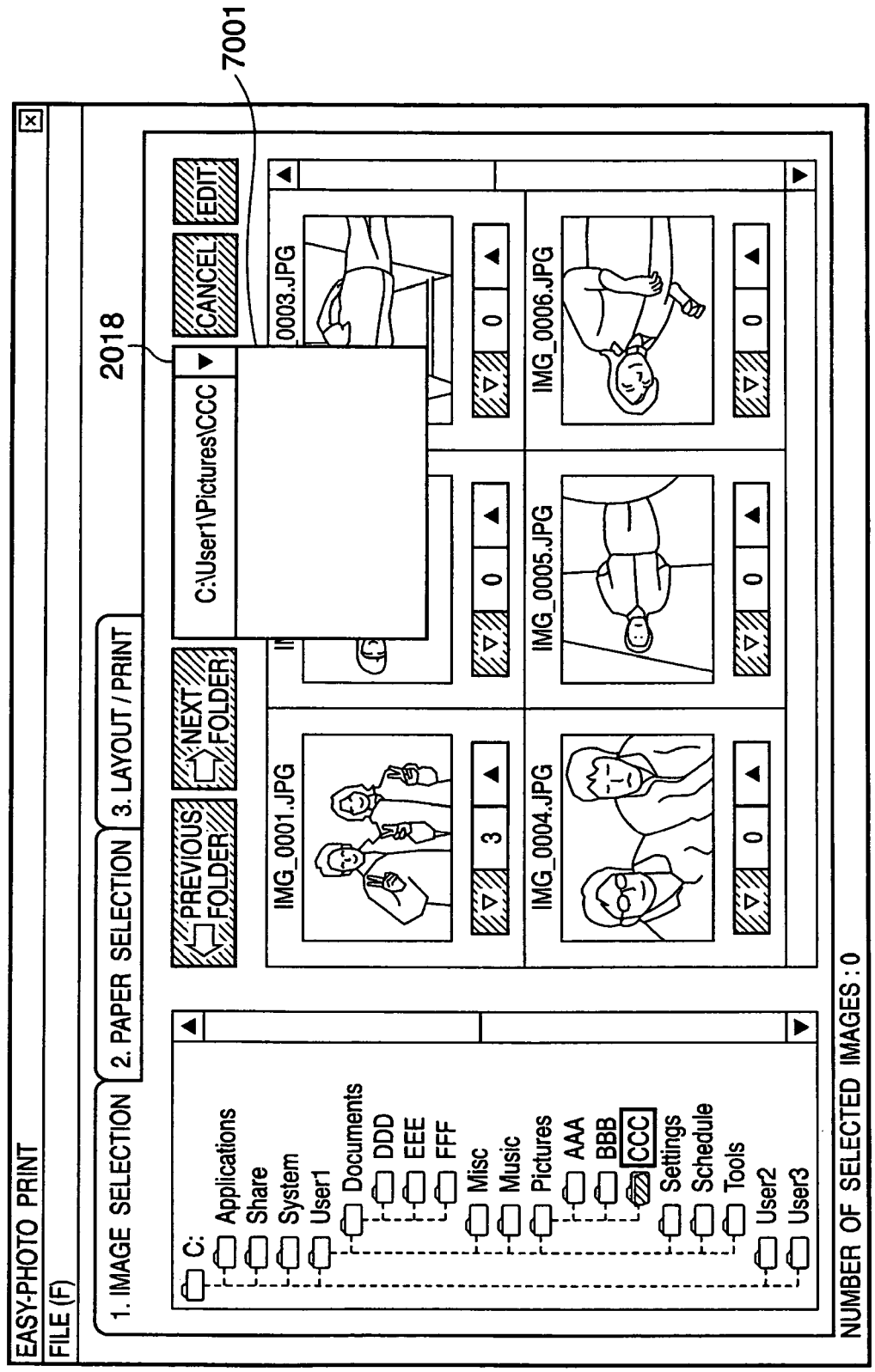
FIG. 11 is a view showing a display example when a selected folder list is displayed.

If the user designates the selected-folder list display button 2018 and clicks the button of the mouse 1013, a selected folder list 7001 is displayed as shown in FIG. 11. At this time, no folder is registered in the folder list 3000, and the selected folder list 7001 displayed on the display device 1011 is blank.

Figure 12:
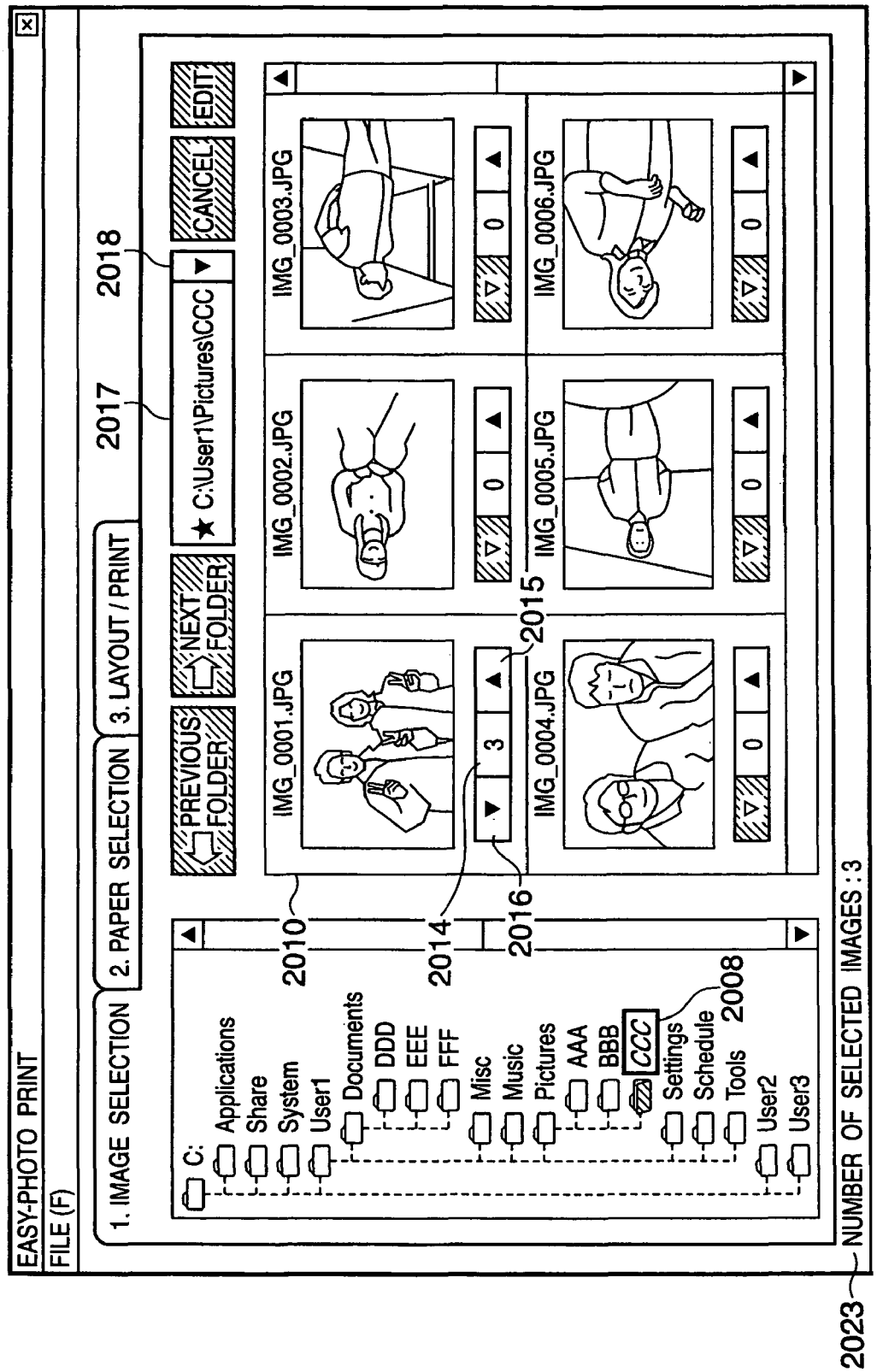
FIG. 12 is a view showing a display example when the print count of an image is set at a thumbnail display portion.

FIG. 12 is a view showing a display example on the display device 1011 when the print count of an image is set at the thumbnail display portion 2009.

When the user designates the print count increment button 2015 of the thumbnail frame 2010 and clicks the button of the mouse 1013 three times, the print count of an image file corresponding to the thumbnail frame 2010 is set to 3. As a result, the print count display field 2014 displays "3" as the print count of the image. Since the print count changes to 1 or more, the print count decrement button 2016 is also enabled to accept a user operation. The selected-image count display portion 2023 displays "3" as the total print count of all images.

The folder tree display portion 2006 represents that it is set to print one or more images from the selected folder 2008. For this purpose, the folder icon of the selected folder 2008 is displayed in color, and the folder name is displayed in bold italics. Also, the folder name display portion 2017 represents that it is set to print one or more images from the currently selected folder. For this purpose, an asterisk is displayed on the left of the character string of the folder name. At this time, however, the currently selected folder is not registered in the folder list 3000. Even if the user designates the selected-folder list display button 2018 and clicks the button of the mouse 1013, the selected folder list 7001 is displayed blank, similar to that shown in FIG. 11.

Figure 13:
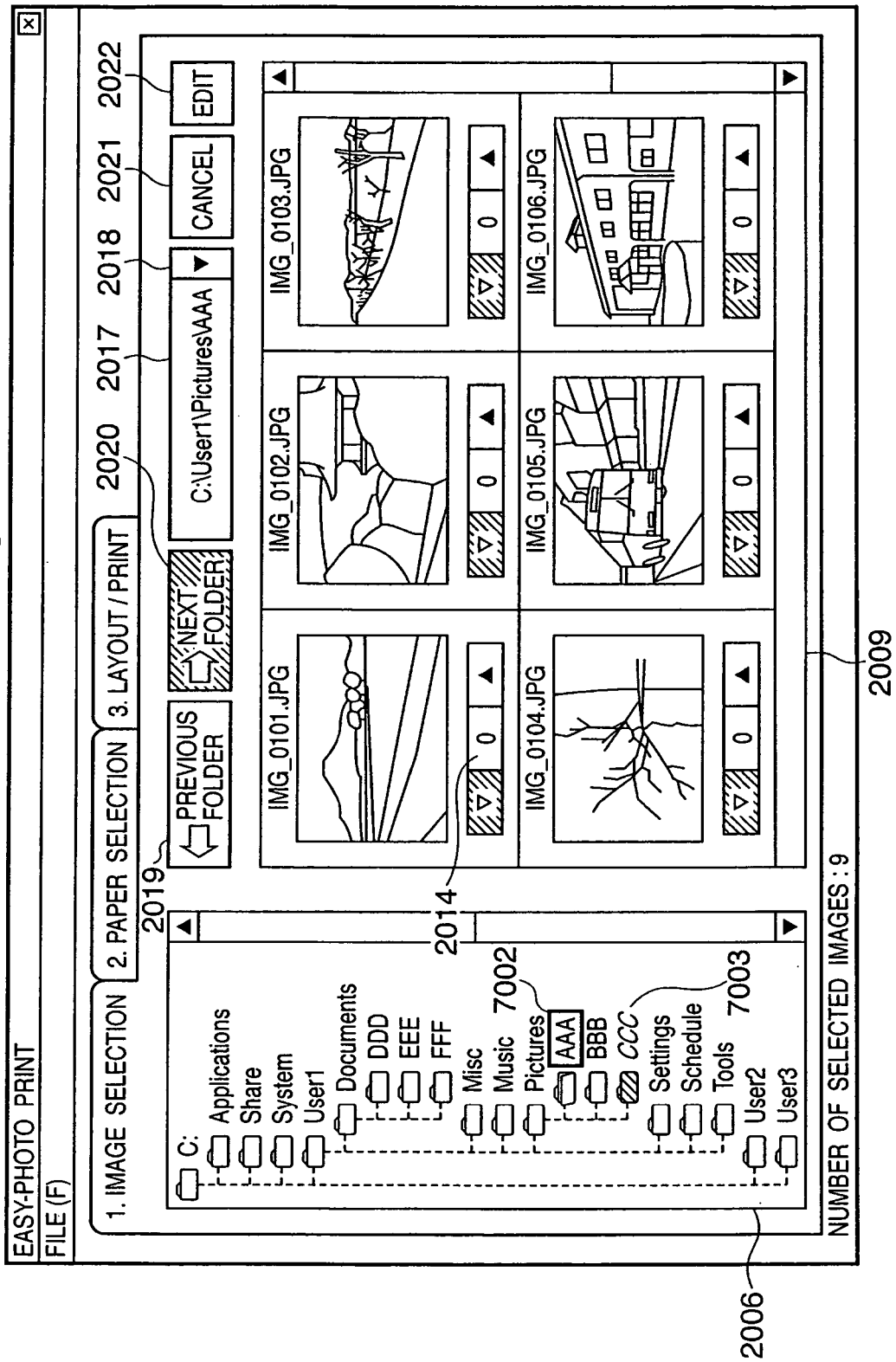
FIG. 13 is a view showing a display example when another folder is selected at a folder tree display portion.

FIG. 13 is a view showing a display example on the display device 1011 when the user additionally designates an image file to be printed in the folder "CCC", then designates another folder "AAA" at the folder tree display portion 2006, and clicks the button of the mouse 1013.

When the user selects a folder, processing from steps S208 to S211 in FIG. 8 is executed. The file list 4000 of designated print images is created in step S405 of FIG. 10 called in this processing. In step S406, the character string of the full pathname of the folder "CCC" in which the image file to be printed is designated is registered in the folder list 3000 together with a link to the file list 4000.

At the folder tree display portion 2006, the newly selected folder "AAA" is set as a currently selected folder 7002, the folder name "AAA" is framed, and the icon is displayed by changing it into a folder-opening shape. Since a folder "CCC" 7003 in which one or more print images are designated is not currently selected, its icon shape is reset to a folder-closed shape, and the frame around the character string of the folder name is erased.

However, the folder "CCC" is registered in the folder list 3000, and the corresponding file list link 3002 is also recorded, that is, one or more print images are designated in this folder. To represent this, the icon is displayed in color, and the character string of the folder name is kept displayed in bold italics.

The thumbnail display portion 2009 is updated to image files contained in the newly selected folder "AAA". Since the folder "AAA" is not registered in the folder list 3000, the print count of each image is set to 0 which is a value initialized in step S304 of FIG. 9 called from step S211 of FIG. 8. The value "0" is displayed in the print count display field 2014 of each thumbnail frame 2010.

The folder name display portion 2017 displays the character string of the full pathname of the newly selected folder "AAA". However, no print image is designated in the folder "AAA", so an asterisk on the left of the character string of the folder name is erased.

Since the folder "CCC" is registered in the folder list 3000 and the currently selected folder "AAA" is not registered in it, the "previous folder" button 2019 is enabled and the "next folder" button 2020 is disabled.

Since the folder "CCC" is registered in the folder list 3000, the "cancel" button 2021 and "edit" button 2022 are enabled.

Figure 14:
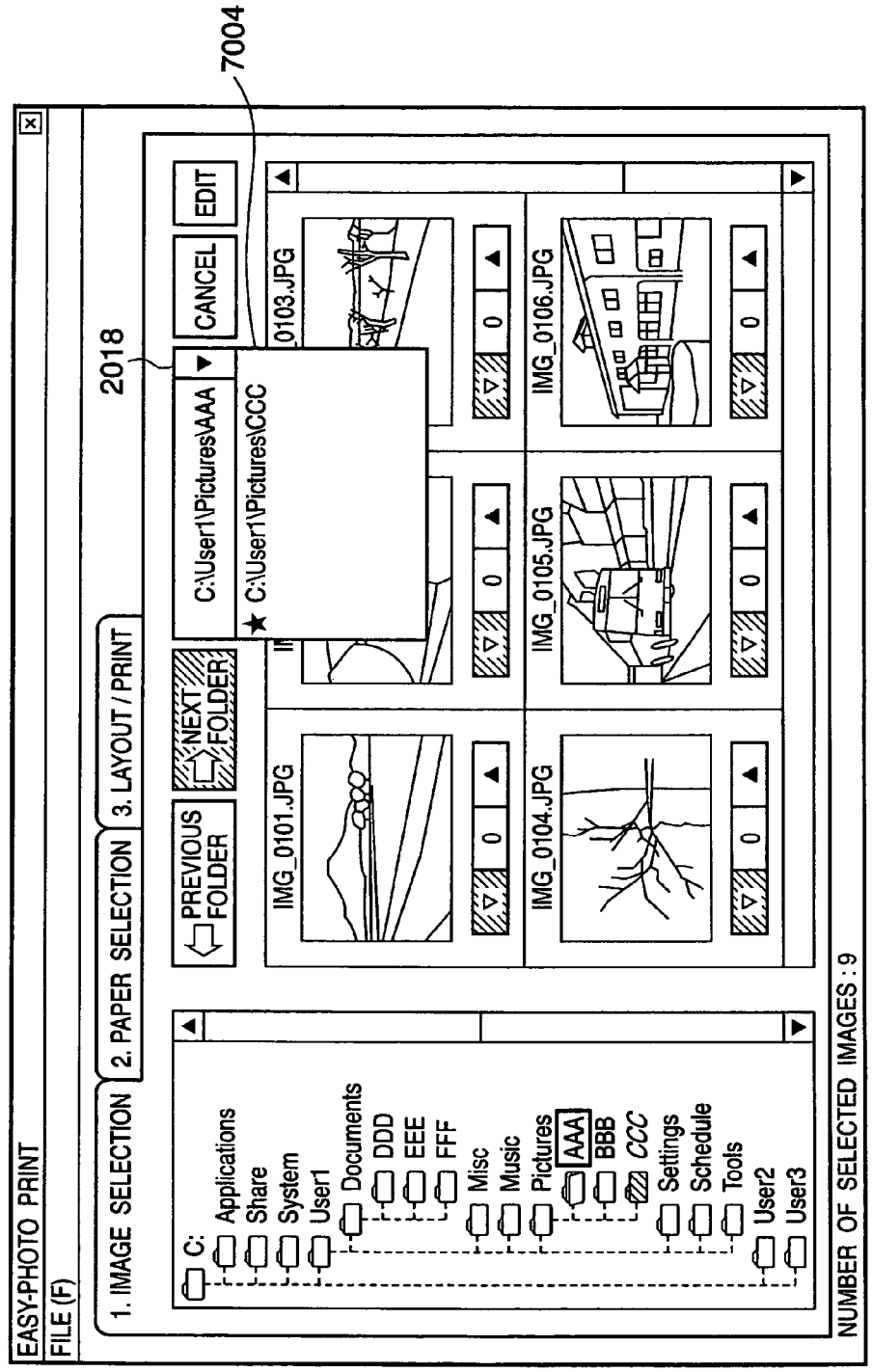
FIG. 14 is a view showing a display example when a selected-folder list display button is selected.

FIG. 14 is a view showing a display example on the display device 1011 when the user designates the selected-folder list display button 2018 in the state of FIG. 13 and clicks the button of the mouse 1013.

At this time, the character string of the full pathname of the folder "CCC" registered in the folder list 3000 is displayed as a selected folder list 7004. The file list link 3002 is registered in the folder list 3000 in correspondence with the folder "CCC". More specifically, one or more print images are designated, which is represented by displaying an asterisk on the left of the character string of the folder name.

Figure 15:
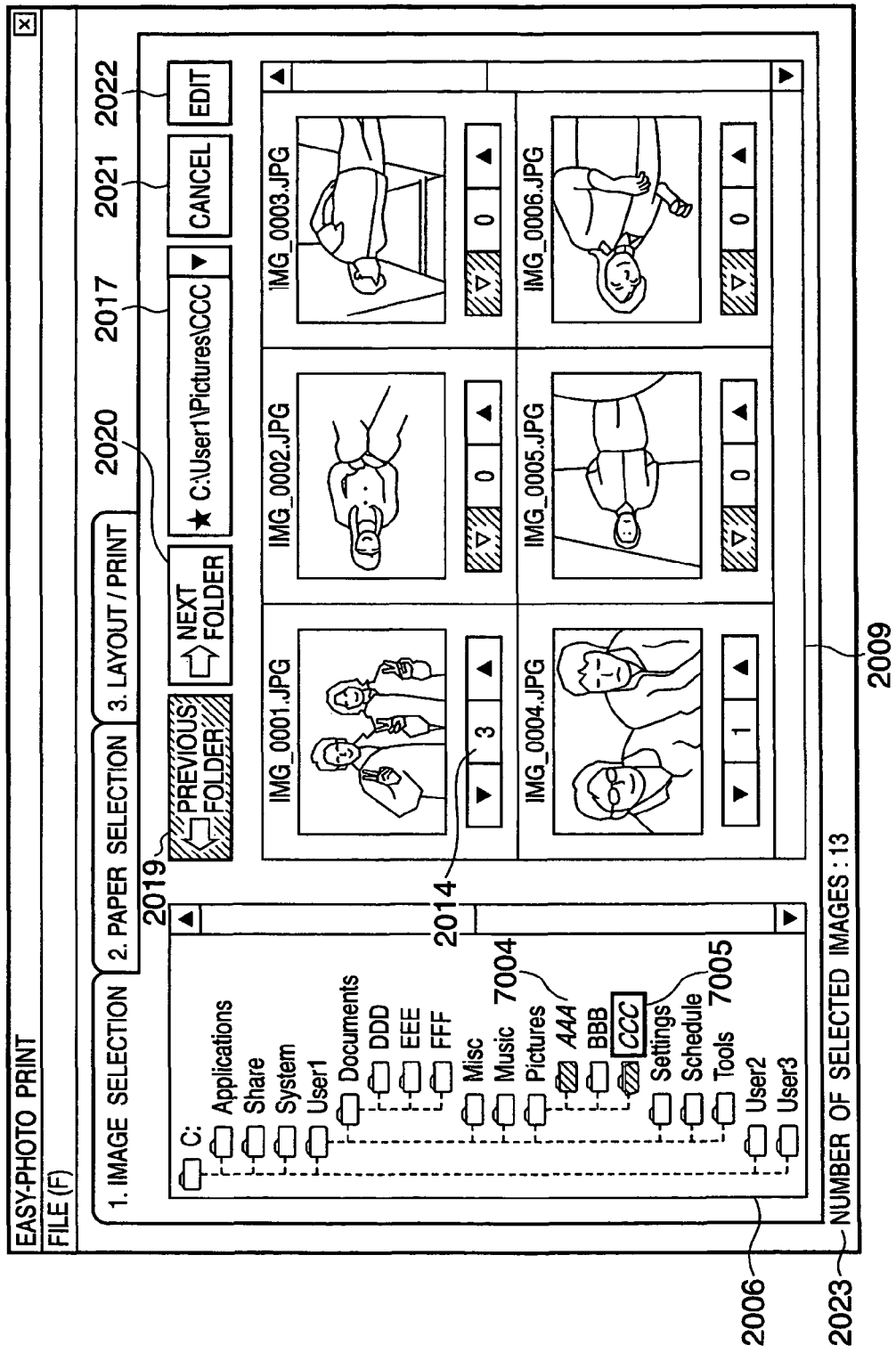
FIG. 15 is a view showing a display example when an image file to be printed is designated and then a previous folder is selected again.

FIG. 15 is a view showing a display example on the display device 1011 when the user designates an image file to be printed in the folder "AAA", designates the "previous folder" button 2019, clicks the button of the mouse 1013, and selects the previous folder "CCC" again.

When the user operates the "previous folder" button, processing from steps S208 to S211 in FIG. 8 is executed. The file list 4010 of images designated in the folder "AAA" so as to be printed is created in step S405 of FIG. 10 called in this processing. In step S406, the character string of the full pathname of the folder "AAA" is additionally registered in the folder list 3000 together with a link to the file list 4010.

In step S303 of FIG. 9 called from step S211, the file list 4000 corresponding to the folder "CCC" registered in the folder list 3000 is read out. The print count of each image file is reflected in the print count display field 2014 at the thumbnail display portion 2009, and the corresponding print count decrement button 2016 is enabled. Accordingly, the thumbnail display portion 2009 reproduces the same state as that when the user finally selects the folder "CCC".

At the folder tree display portion 2006, the newly selected folder "CCC" is set as a currently selected folder 7005, the folder name "CCC" is framed, and the icon is displayed by changing it into a folder-opening shape. The folder "CCC" is registered in the folder list 3000, and the corresponding file list link 3002 is also recorded, that is, one or more print images are designated in this folder. To represent this, the icon is displayed in color, and the character string of the folder name is displayed in bold italics.

Since the folder "AAA" selected immediately before the folder "CCC" is not currently selected, its icon is reset to a folder-closed shape, and the frame around the character string of the folder name is erased. However, one or more print images are designated in the folder "AAA", so the folder icon is displayed in color, and the character string of the folder name is kept displayed in bold italics.

The folder name display portion 2017 displays the character string of the full pathname of the newly selected folder "CCC". Since one or more print images are designated in the folder "CCC", an asterisk is displayed on the left of the character string of the folder name.

At this time, the folders "CCC" and "AAA" are registered in the order named in the folder list 3000. However, no folder is registered before the folder "CCC", and the "previous folder" button 2019 is disabled. To the contrary, the folder "AAA" is registered after the folder "CCC", the "next folder" button 2020 is enabled. Since the two folders are registered in the folder list 3000, the "cancel" button 2021 and "edit" button 2022 are also enabled.

The selected-image count display portion 2023 displays "13" as the total print count of images designated in the folders "CCC" and "AAA" so as to be printed.

FIG. 16 is a view showing a display example on the display device 1011 when the user designates print images in the folders "BBB", "EEE", and "DDD", cancels all the selected images in the folders "BBB" and "DDD", selects the folder "AAA" again, designates the selected-folder list display button 2018, and clicks the button of the mouse 1013.

At the folder tree display portion 2006, an icon of a folder-opening shape and a frame around a folder name are displayed at the currently selected folder "AAA". The folder icons of the folders "CCC", "AAA", and "EEE" in which print images are selected are displayed in color, and the folder names are displayed in bold italics. The folders "BBB" and "DDD" in which print images are designated once and then selection of all the images is canceled are displayed in a normal way similarly to other folders.

A folder is registered in the folder list 3000 in step S406 of FIG. 10 called from step S208 of FIG. 8 when the user designates a print image in a target folder and then selects another folder. After that, even if the user sets the print counts of all image files in the target folder to 0, registration of the folder is not deleted from the folder list 3000. Hence, after the user executes this operation, five folders "CCC", "AAA", "BBB", "EEE", and "DDD" are registered in the folder list 3000. In the two folders "BBB" and "DDD" out of these folders, the print counts of all image files are set to 0. In step S407 of FIG. 10 called from step S208 of FIG. 8, each corresponding file list is deleted from the work area of the RAM 1006, and the file list link field in the folder list 3000 becomes blank.

In FIG. 16, the selected folder list 7007 is displayed in response to designating the selected-folder list display button 2018 by the user and clicking the button of the mouse 1013. The selected folder list 7007 displays, in registration order, the five folders registered in the folder list 3000 at this time. In addition, asterisks are displayed on the left of the pathnames of the folders "CCC", "AAA", and "EEE" in which print images are selected. In contrast, no asterisk is displayed for the folders "BBB" and "DDD" in which the user cancels all print image settings.

Figure 20:
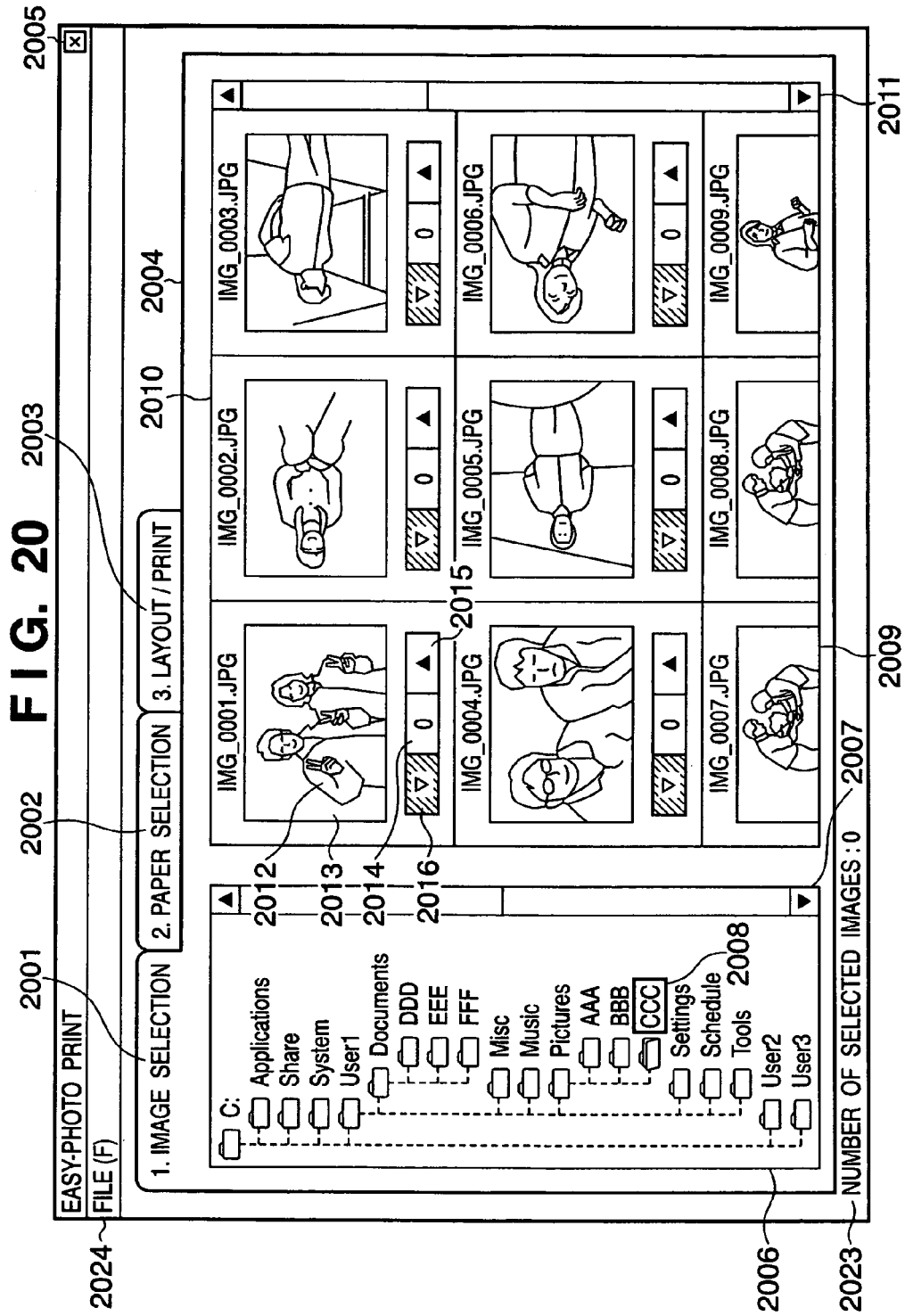
FIG. 20 is a view showing a display example on the display device in a "single folder mode" by the printing control application in the first embodiment.

FIG. 20 is a view showing a display example on the display device 1011 when the first tab is selected in the "single folder mode".

Figure 30:
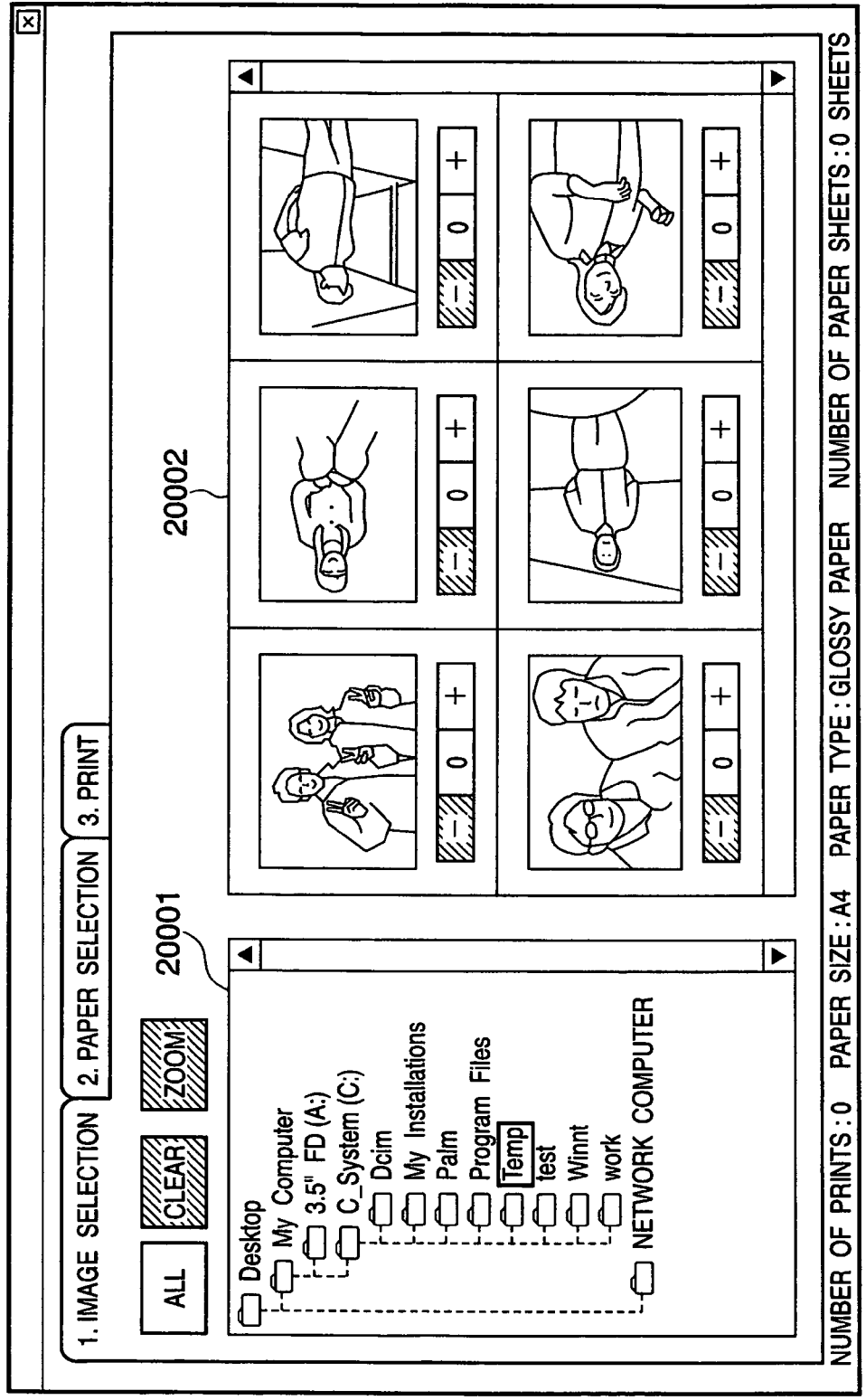
FIG. 30 is a view showing a display example of the user interface of a conventional printing control apparatus.

As described above, a processing operation of the printing control application in the "single folder mode" according to the first embodiment is basically the same as the prior art shown in FIG. 30.

When the "single folder mode" switches to the "multiple folder mode" by changing the setting of the mode setting check box 10001 in the "setup" dialog of FIG. 19, all image file print settings made in the "single folder mode" are canceled. Also when the "multiple folder mode." switches to the "single folder mode", all image print settings made in the "multiple folder mode" are canceled. At the same time, the folder list 3000 and file list 4000 which are created in the work area of the RAM 1006 are cleared to an initial state.

The second tab processing will be explained with reference to FIG. 17.

FIG. 17 is a view showing a display example on the display device 1011 in the second tab processing by the printing control application in the first embodiment. When the user designates the second tab 2002 in FIG. 2 and clicks the button of the mouse 1013, the window in FIG. 17 is displayed. The following processing operation corresponds to the second tab processing performed in step S105 in the flowchart of FIG. 3.

In the second tab processing, the second tab 2002 is selected and displayed, and the display of the work area 2004 is switched to one for the second tab.

In FIG. 17, reference numeral 8001 denotes a printer name display field which displays the name of the printer 1014 connected to the information processing apparatus 1000 via the input/output interface 1015. When a plurality of printers are connected to the information processing apparatus 1000, the user designates a printer list display button 8002, clicks the button of the mouse 1013, and displays a list of printer names on a drop-down menu. The user designates a printer name from the printer name list, and clicks the button of the mouse 1013. Then, the designated printer is newly selected, and its name is displayed in the printer name display field 8001.

A paper size display portion 8003 lists and displays paper sizes available in a printer currently displayed in the printer name display field 8001. The paper size is displayed with a pair of the paper icon and the character string of the size name for user friendliness. A paper size currently selected from the paper size list is meshed and highlighted. In FIG. 17, the "A4" size is selected.

When the user designates one of paper sizes at the paper size display portion 8003 and clicks the button of the mouse 1013, the display is updated to show that the designated paper size is selected. When the printer in the printer name display field 8001 is changed, the paper size display portion 8003 is updated to a list of paper sizes available in the newly selected printer.

A paper type display portion 8004 displays a list of paper types which are available in a printer currently displayed in the printer name display field 8001 at a paper size currently selected at the paper size display portion 8003. The paper type is displayed with a pair of the paper icon and the character string of the type name for user friendliness. A paper type currently selected from the paper type list is meshed and highlighted. In FIG. 17, "coated paper" is selected.

When the user designates one of paper types at the paper type display portion 8004 and clicks the button of the mouse 1013, the display is updated to show that the designated paper type is selected. When the printer in the printer name display field 8001 is changed, the paper type display portion 8004 is updated to a list of paper types which are available in the newly selected printer at a paper size selected at the paper size display portion 8003. Also when the paper size selected at the paper size display portion 8003 is changed, the paper type display portion 8004 is updated to a list of paper types which are available in the newly selected printer at the paper size currently selected at the paper size display portion 8003.

The selected-image count display portion 2023 displays the total number of image files designated to be printed in the first tab processing described above.

If the user designates one of the end button 2005 and the tab areas 2001 and 2003 of the remaining tabs during the second tab processing and clicks the button of the mouse 1013, the second tab processing, i.e., the processing in step S105 of FIG. 3 ends.

The third tab processing will be explained with reference to FIG. 18.

Figure 18:
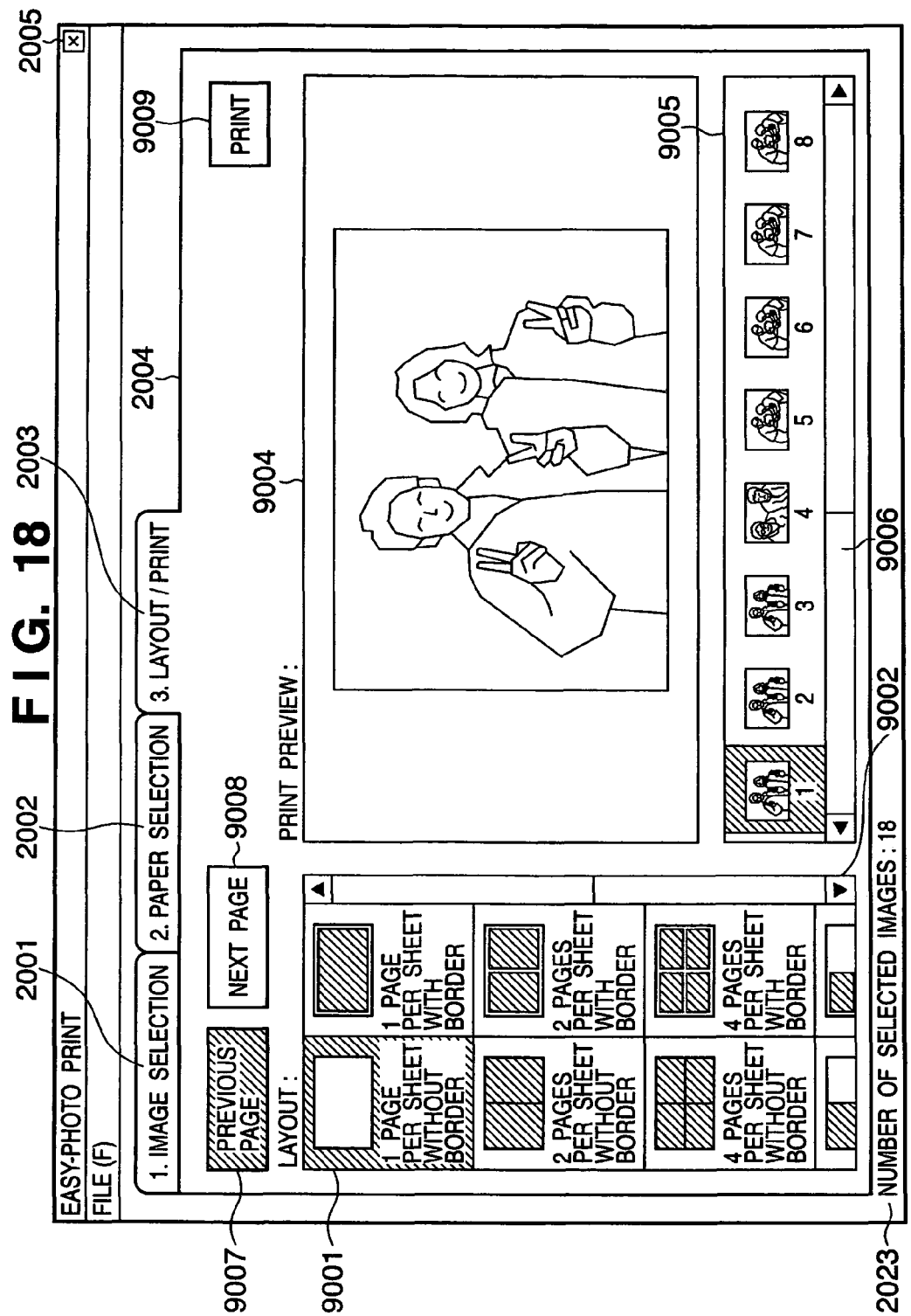
FIG. 18 is a view showing a display example on the display device in the third tab processing by the printing control application in the first embodiment.

FIG. 18 is a view showing a display example on the display device 1011 in the third tab processing by the printing control application in the first embodiment. When the user designates the third tab 2003 in FIG. 2 and clicks the button of the mouse 1013, the window in FIG. 18 is displayed. The following processing operation corresponds to the third tab processing performed in step S107 in the flowchart of FIG. 3.

In the third tab processing, the third tab 2003 is selected and displayed, and the display of the work area 2004 is switched to one for the third tab.

In FIG. 18, reference numeral 9001 denotes a layout display portion which displays a list of layout types that can be designated in a printer displayed in the printer name display field 8001 of the second tab at a paper size selected at the paper size display portion 8003 with a paper type selected at the paper type display portion 8004. The layout type is displayed with a pair of the layout icon and the character string of the layout name for user friendliness. A layout currently selected from the layout type list is meshed and highlighted. In FIG. 18, a "1 page per sheet without border" layout is selected. If many layout types are listed, displayed, and do not fall within the layout display portion 9001, the display is scrolled up and down. The list is scrolled by operating a scroll bar 9002 by the user via the mouse 1013.

Some printer models do not support printing of 1 page per sheet without any border. Even printers of models capable of printing 1 page per sheet without any border may not achieve it depending on the paper size. Further, printing of 1 page per sheet without any border can or cannot be done depending on the paper type even with a combination of a paper size and a printer of a model capable of printing of 1 page per sheet without any border. In addition, some layouts cannot be properly applied to a paper size, such as a layout to lay out 100 images at a small paper size, e.g., credit-card size. For this reason, at the start of the third tab processing, layouts which are listed and displayed at the layout display portion 9001 are changed in accordance with displays and selections in the printer name display field 8001, paper size display portion 8003, and paper type display portion 8004 at the second tab.

Reference numeral 9004 denotes a print preview portion. The print preview portion 9004 displays an estimated output result view when images designated to be printed at the first tab are printed in print orders displayed in the folder print order display field 10002 and image print order display field 10004 in FIG. 19 in accordance with settings made in the printer name display field 8001, paper size display portion 8003, paper type display portion 8004, and layout display portion 9001. The print preview portion 9004 displays an entire estimated view of an image to be printed on one paper sheet.

When the "setup" dialog in FIG. 19 is opened by a user operation to the "setup" item in the "file" menu 2024 and the print order setting is changed, the display at the print preview portion 9004 is updated in accordance with the changed print order setting.

Reference numeral 9005 denotes a print list display portion. The print list display portion 9005 lists and displays reduced images of all estimated output result views together with page numbers when image files designated to be printed at the first tab are printed in print orders displayed in the folder print order display field 10002 and image print order display field 10004 in FIG. 19 in accordance with settings made in the printer name display field 8001, paper size display portion 8003, paper type display portion 8004, and layout display portion 9001. When the number of pages to be output is large and all the pages do not fall within the print list display portion 9005, the display is scrolled left and right. The display is scrolled by operating a scroll bar 9006 by the user via the mouse 1013. Note that the print count may be displayed in parentheses near the number of each image.

When the "setup" dialog in FIG. 19 is opened by a user operation to the "setup" item in the "file" menu 2024 and the print order setting is changed, the display at the print list display portion 9005 is updated in accordance with the changed print order setting.

At the print list display portion 9005, a page displayed at the print preview portion 9004 is meshed and highlighted. In FIG. 18, an estimated output result view of the first page is displayed at the print preview portion 9004.

When the user designates an arbitrary page at the print list display portion 9005 and clicks the button of the mouse 1013, the designated page is highlighted at the print list display portion 9005. At the print preview portion 9004, the display is updated to an estimated output result view of the designated page.

Reference numeral 9007 denotes a "previous page" button. When the user designates the "previous page" button 9007 and clicks the button of the mouse 1013, a page immediately previous to a page currently highlighted at the print list display portion 9005 is highlighted, and an estimated output result view of the newly highlighted page is displayed at the print preview portion 9004. When the first page is highlighted at the print list display portion 9005, the "previous page" button 9007 is disabled to inhibit any processing corresponding to a user operation.

Reference numeral 9008 denotes a "next page" button. When the user designates the "next page" button 9008 and clicks the button of the mouse 1013, a page immediately subsequent to a page currently highlighted at the print list display portion 9005 is highlighted, and an estimated output result view of the newly highlighted page is displayed at the print preview portion 9004. When the final page is highlighted at the print list display portion 9005, the "next page" button 9008 is disabled to inhibit any processing corresponding to a user operation.

Reference numeral 9009 denotes a "print" button. When the user designates the "print" button 9009 and clicks the button of the mouse 1013, all image files designated to be printed at the first tab are printed by the printer 1014 in print orders displayed in the folder print order display field 10002 and image print order display field 10004 in FIG. 19 in accordance with settings made in the printer name display field 8001, paper size display portion 8003, paper type display portion 8004, and layout display portion 9001.

Figure 35:
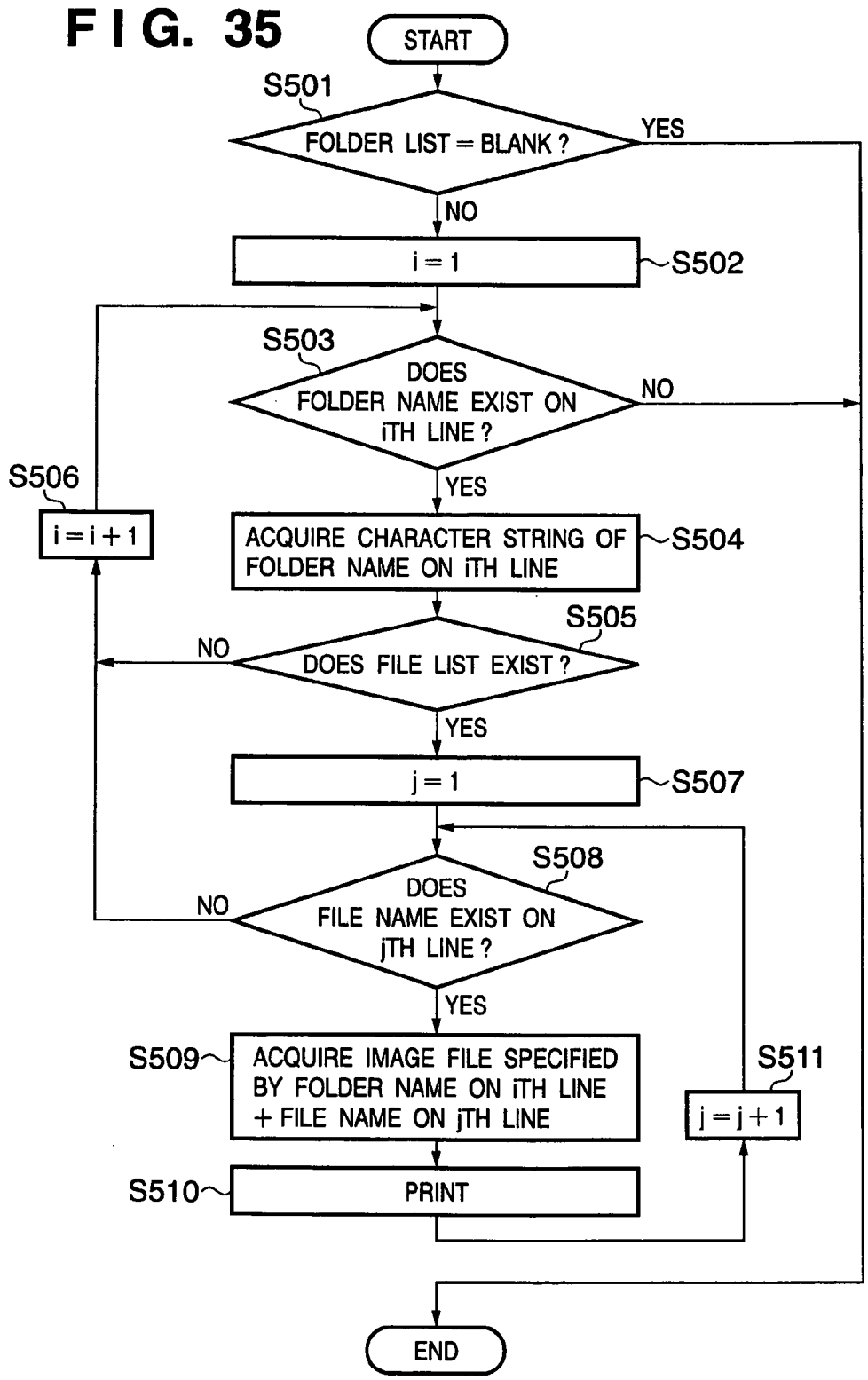
FIG. 35 is a flowchart showing the processing procedures of print processing in the embodiment.
Figure 36:
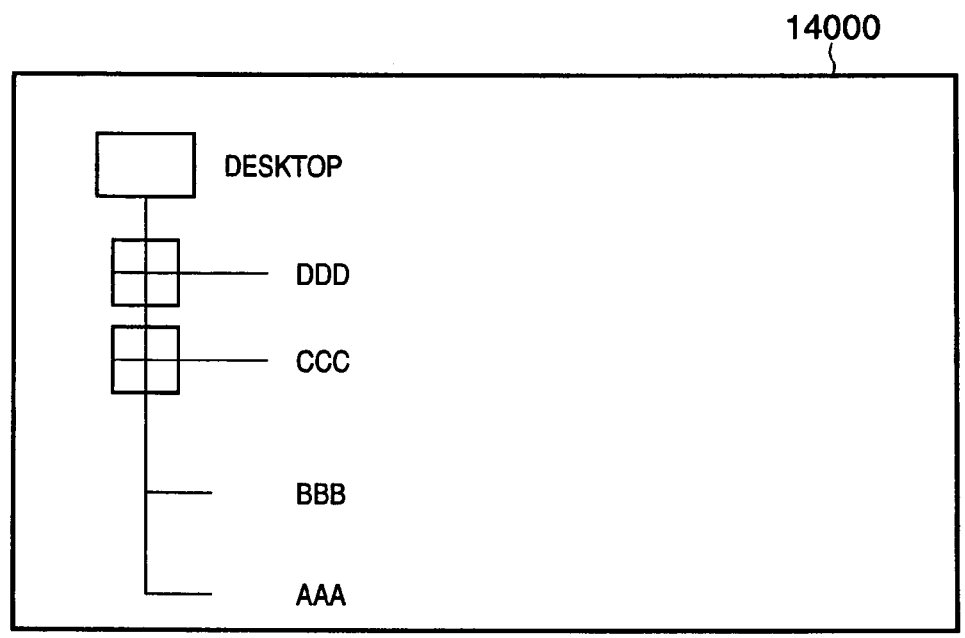
FIG. 36 is a view showing a conventional method of visually displaying the hierarchy structure of folders.
Figure 37:
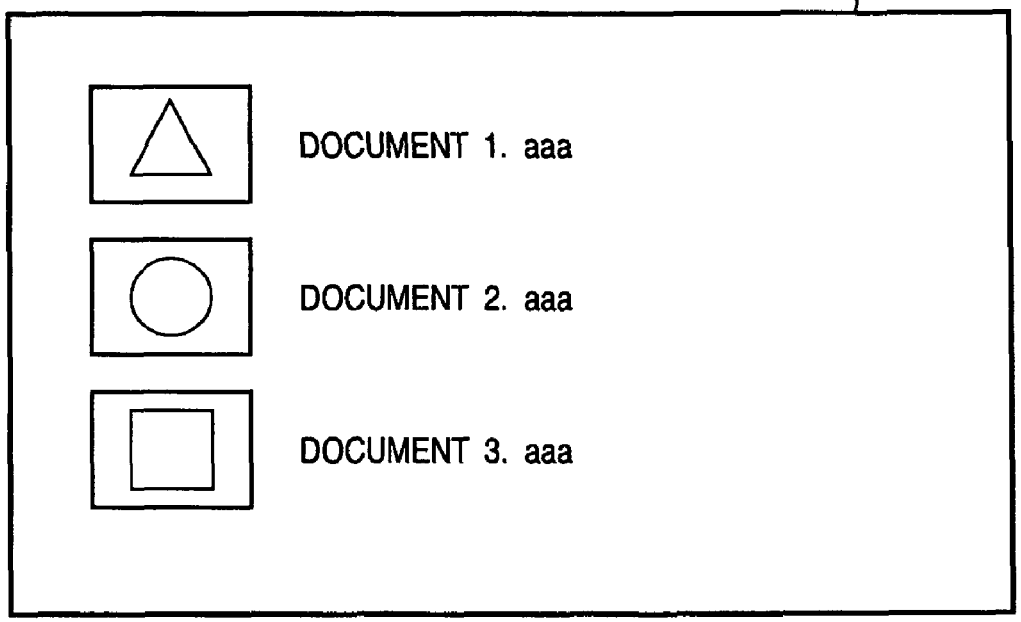
FIG. 37 is a view showing a conventional folder display example.
Figure 38:
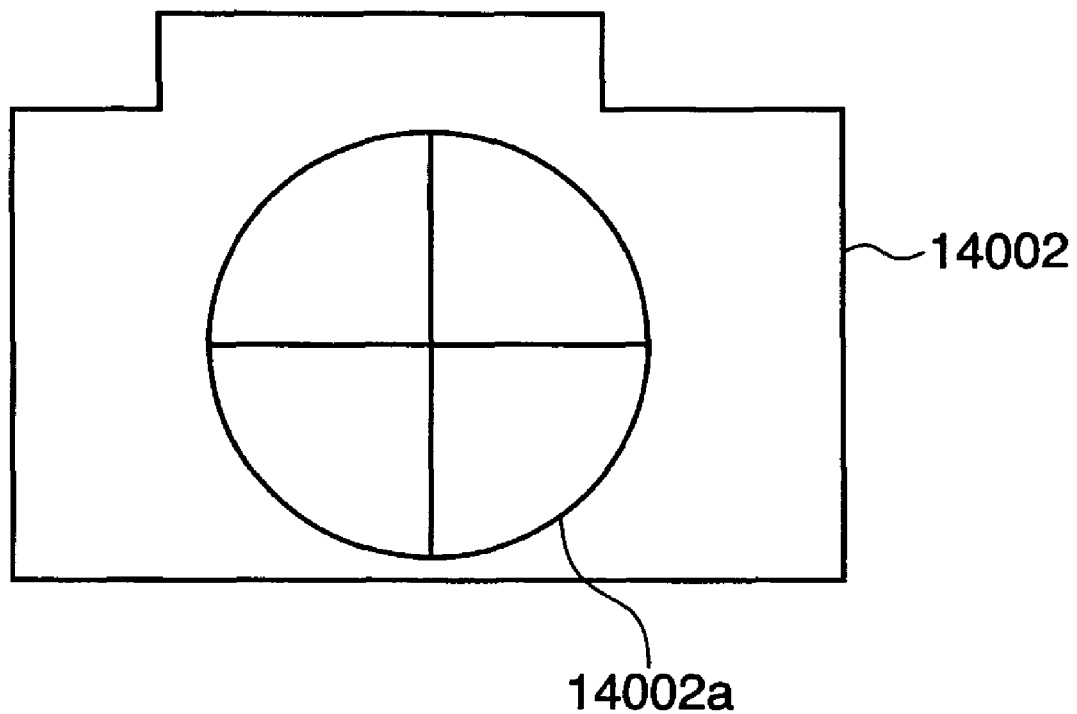
FIG. 38 is a view showing another conventional folder display example.
Figures 39A, 39B:
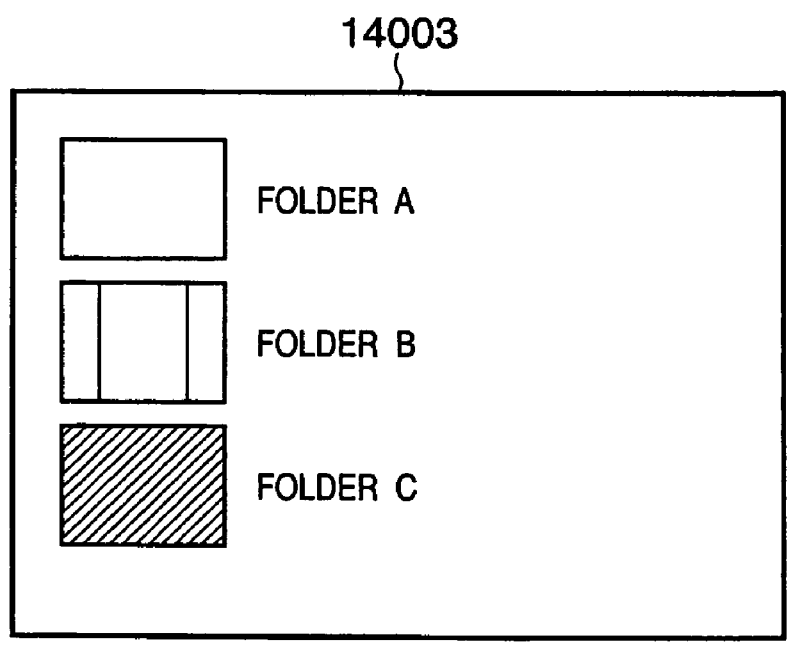
FIGS. 39A and 39B are views showing still another conventional folder display example.

Processing procedures when the print button 9009 is clicked will be explained in accordance with the flowchart of FIG. 35. Prior to a description, the pathnames (character strings each representing the location of a folder) of folders in the folder list 3000, and the character strings of file names in the file list 4000 and the like are rearranged in orders set in the setup window of FIG. 19.

In step S501, it is determined whether the folder list is blank. If the folder list is blank, this means that no image data file to be printed is selected, and the processing ends.

If it is determined that the folder list is not blank, the flow advances to step S502 to initialize a variable i to "1".

In step S503, it is determined whether the character string of the pathname of a folder exists on the ith line of the folder list. If no character string exists, all folders stored in the folder list have been processed, and the processing ends.

If the character string of the folder name exists on the ith line of the folder list in step S503, it is acquired in step S504. In step S505, it is determined whether a file list linked to the acquired folder name exists. This determination is based on whether the address (pointer) stored in the second field is "0", as shown in FIG. 4.

If the address is "0", no corresponding file list exists, that is, no image data file to be printed exists in the folder of interest. The flow advances to step S506 to increment the variable i by only "1", and returns to step S503.

If it is determined in step S505 that a file list corresponding to the folder of interest exists, a variable j is initialized to "1" in step S507.

In step S508, it is determined whether a file name is described on the jth line in the file list of interest. If it is determined that no file name is described on the jth line, this means that print processing of the file list of interest is completed, and processing in step S506 is executed.

If it is determined that a file name is described on the jth line in the file list, the flow advances to step S509 to read out an image file specified by the folder name on the ith line+the file name on the jth line. The readout image file is printed out in step S510. Thereafter, the variable j is incremented by only "1" in step S511, and processing from step S508 is repeated.

As a result, images are printed in description orders in the folder list and file list.

Image print procedures in the "multiple folder mode" will be explained with reference to FIGS. 21 and 22.

Figure 21:
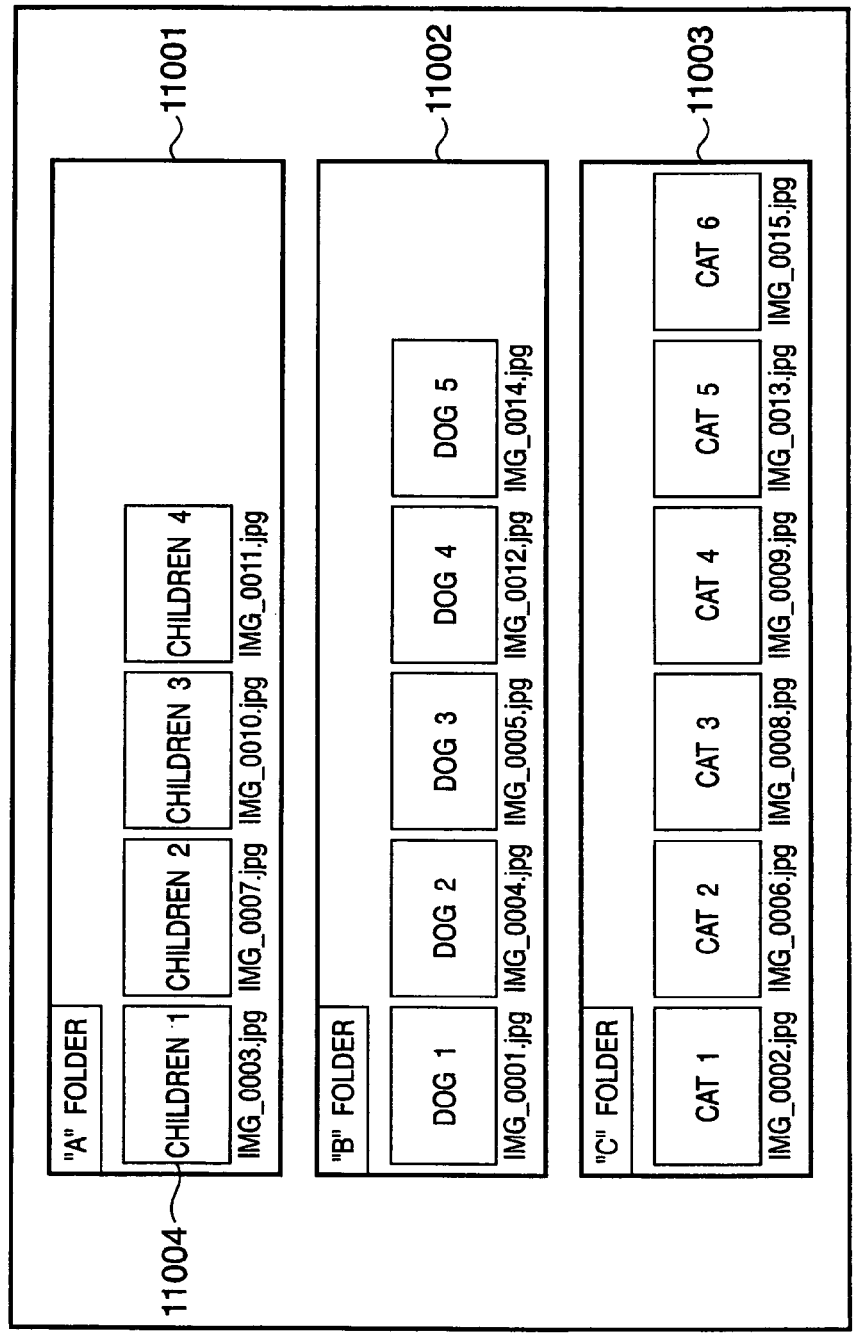
FIG. 21 is a view schematically showing an example of folders in an HDD and image files contained in the folders.
Figure 22:
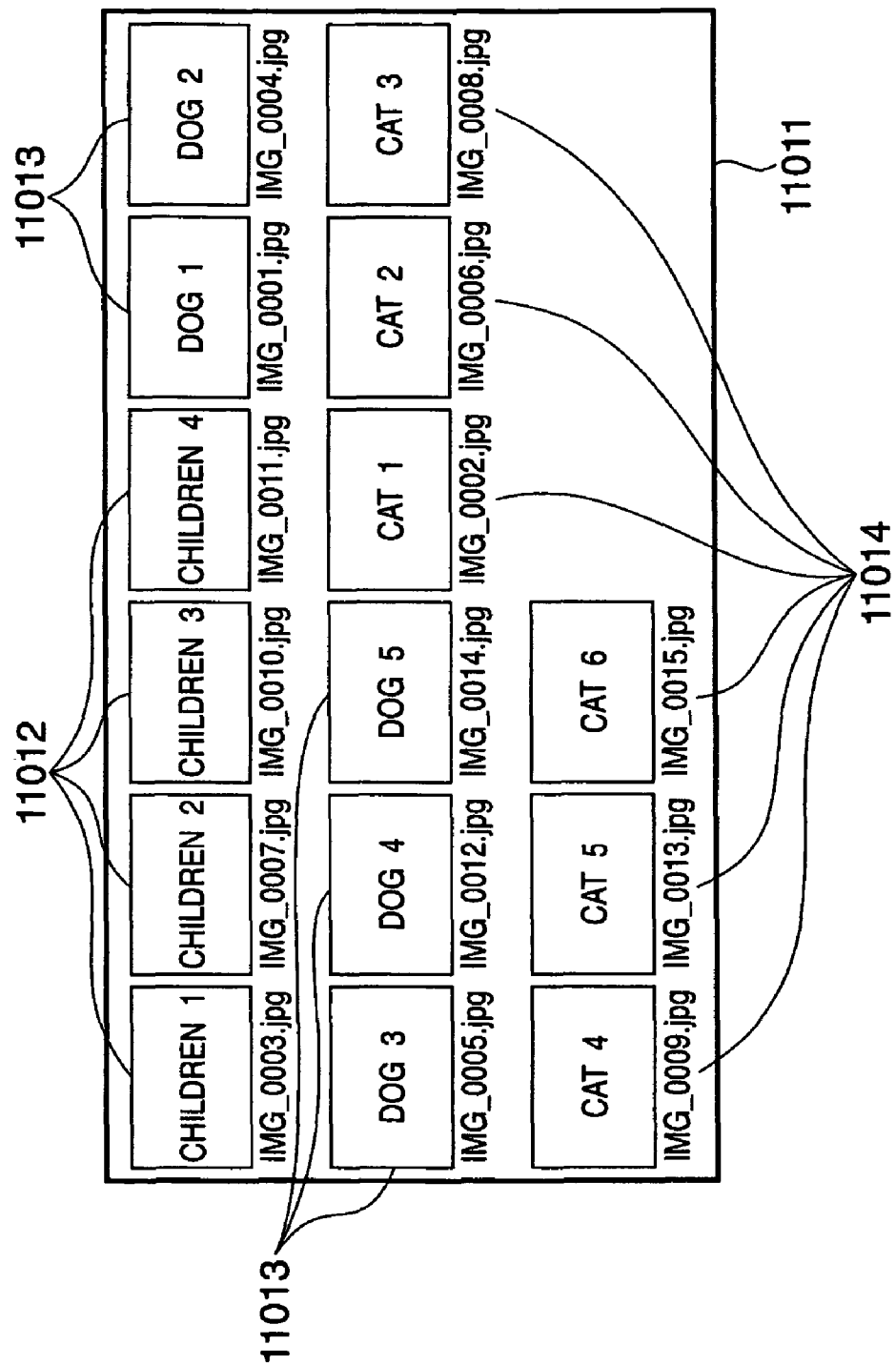
FIG. 22 is a view showing an output example of printing images in a plurality of folders on one paper sheet.

FIG. 21 is a view schematically showing an example of folders in the HDD 1004 and image files contained in the folders. The HDD 1004 stores three folders: an "A" folder 11001, "B" folder 11002, and "C" folder 11003. In each folder, image files are arranged and stored by type. In FIG. 21, the "A" folder 11001 stores four files associated with "children" including an image file 11004 of a file name "IMG_0003.jpg". Similarly, the "B" folder 11002 stores image files associated with "pet dog", and the "C" folder 11003 stores image files associated with "pet cat". The respective image files have different file names and different photographing dates and times.

Assume that the user checks the mode setting check box 10001 in the "setup" dialog of FIG. 19 to set the "multiple folder mode", and designates the "selection order" in the folder print order display field 10002 and the "name order" in the image print order display field 10004. In this state, the user designates all files as print targets in the "A" folder 11001, "B" folder 11002, and "C" folder 11003 in the order named at a print count of 1 for each folder by the first tab operation. Further, the user selects an index layout of laying out many images on one paper sheet and printing them, and executes printing by the third tab operation. Then, an output shown in FIG. 22 is obtained. FIG. 22 is a view showing an output example of printing images in a plurality of folders on one paper sheet.

A total of 15 images designated in the "A" folder 11001, "B" folder 11002, and "C" folder 11003 are printed on one paper sheet 11011. Images 11012 in the "A" folder 11001 which is the first folder selected by the user are laid out at the beginning. The four images 11012 are sorted in name order designated in the image print order display field 10004 in the "setup" dialog.

Images 11013 in the "B" folder 11002 are arranged next to the images 11012 in the "A" folder 11001. The five images 11013 are also sorted in name order. Similarly, six images 11014 in the "C" folder are sorted and arranged in name order.

In the first embodiment, the printing control application is equipped with the "single folder mode" and "multiple folder mode", and the "single folder mode" is defined as a default setting. A user who utilizes a conventional printing control application can use the printing control application in the first embodiment without any sense of incongruence.

The first embodiment provides the "multiple folder mode" in which, even when the folder list 3000 and file list 4000 are created in the work area of the RAM 1006, and the user selects print images, and then selects different folders, designated image files and their print counts are recorded and all the recorded images are printed at once. Image files distributed in a plurality of folders can, therefore, be printed by one print operation.

This reduces a troublesome work of the user in printing image files distributed in a plurality of folders. In addition, for example, when "4 pages per sheet without border" contained at the layout display portion 9001 in FIG. 18 is selected, images distributed in a plurality of folders can be printed at once on one paper sheet. This processing is impossible by a single printing control application unless print images can be simultaneously selected from a plurality of folders.

In the "multiple folder mode" according to the first embodiment, print images can be simultaneously selected from a plurality of folders. However, the method of operating the folder tree display portion 2006 and thumbnail display portion 2009 in FIG. 2 is the same as that in the prior art shown in FIG. 30, and an operation method when selecting print images from a single folder is the same as that in the prior art or the "single folder mode". For this reason, a user who is familiar with a conventional printing control application can smoothly shift to the "multiple folder mode".

Figure 31:
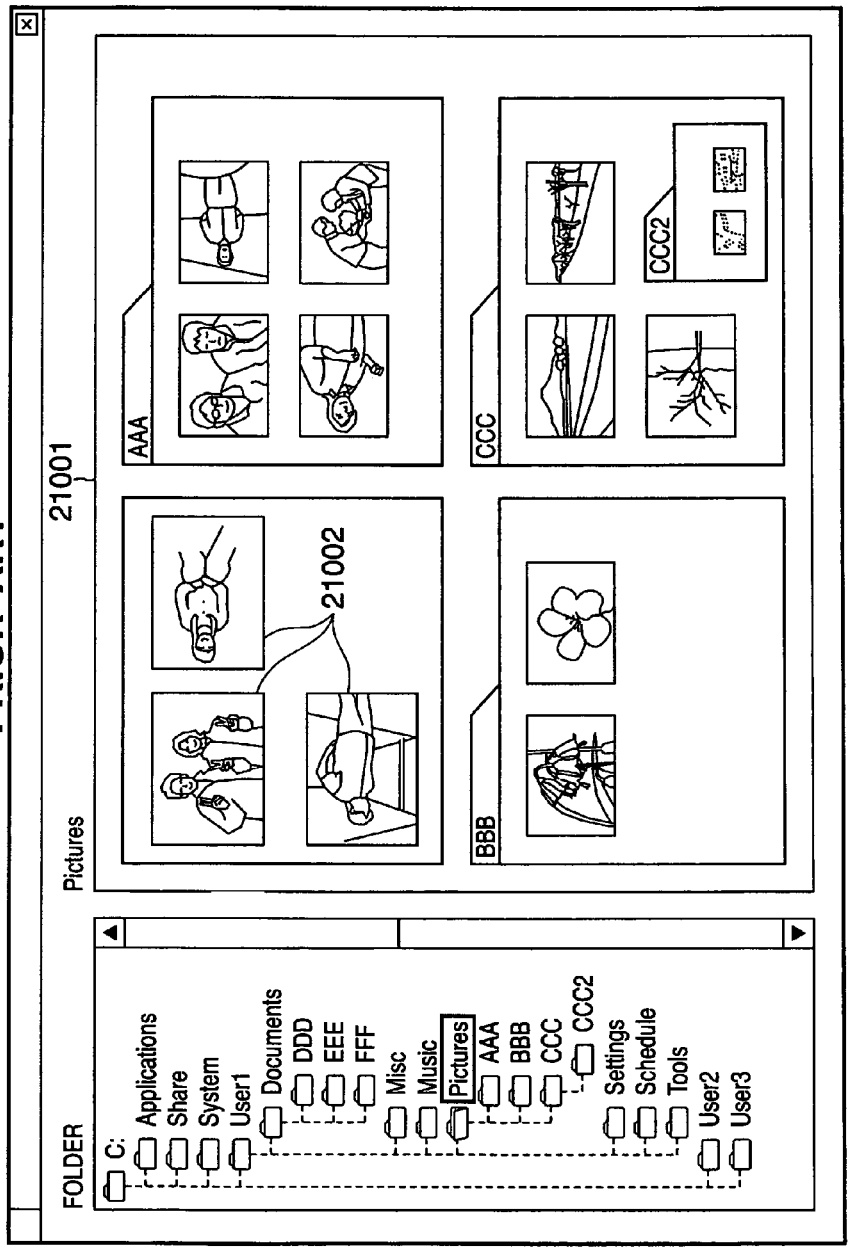
FIG. 31 is a view showing an example of a conventional hierarchical data display method.
Figure 32:
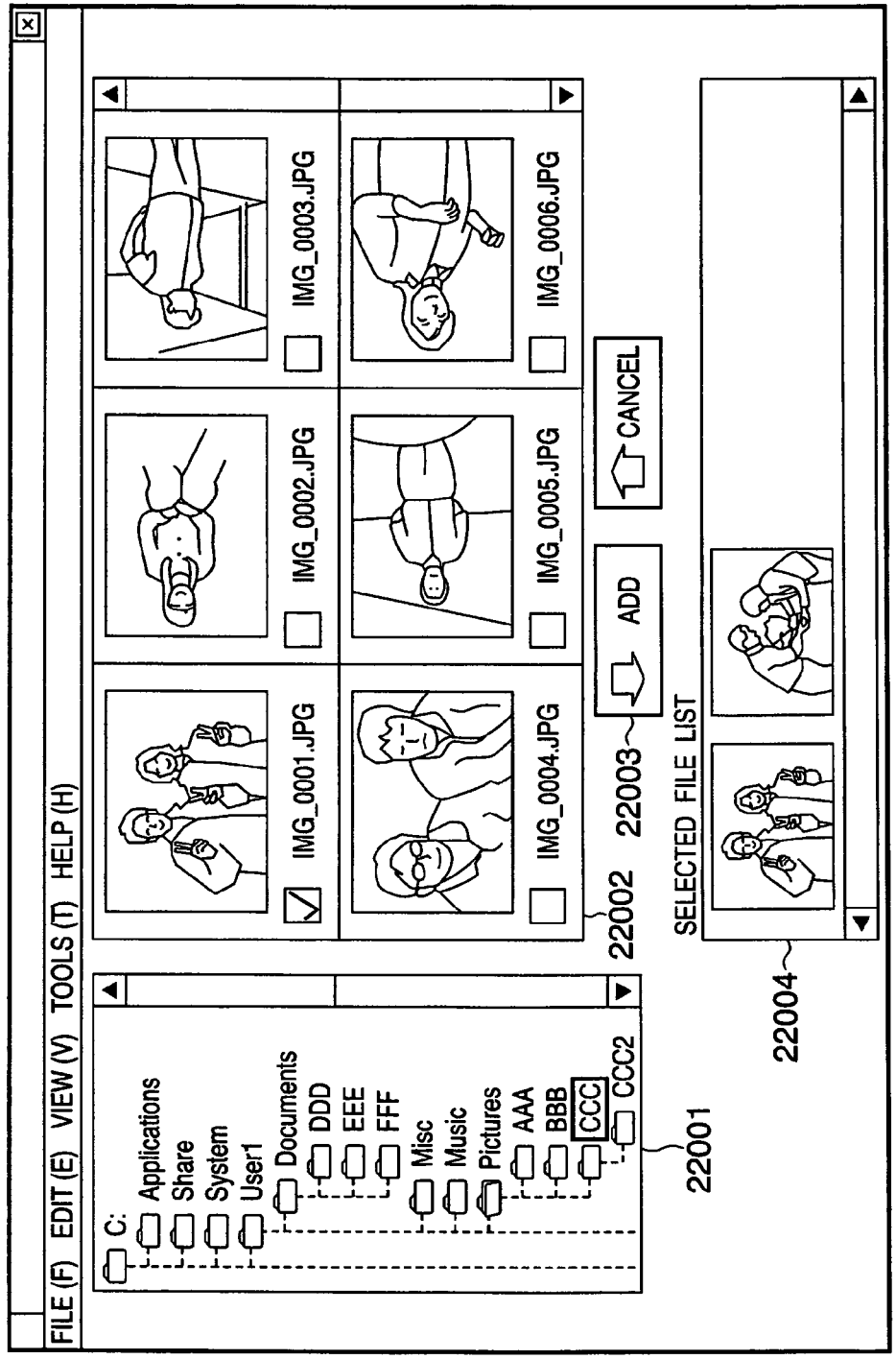
FIG. 32 is a view showing an example of a conventional print image selection method.
Figure 33:
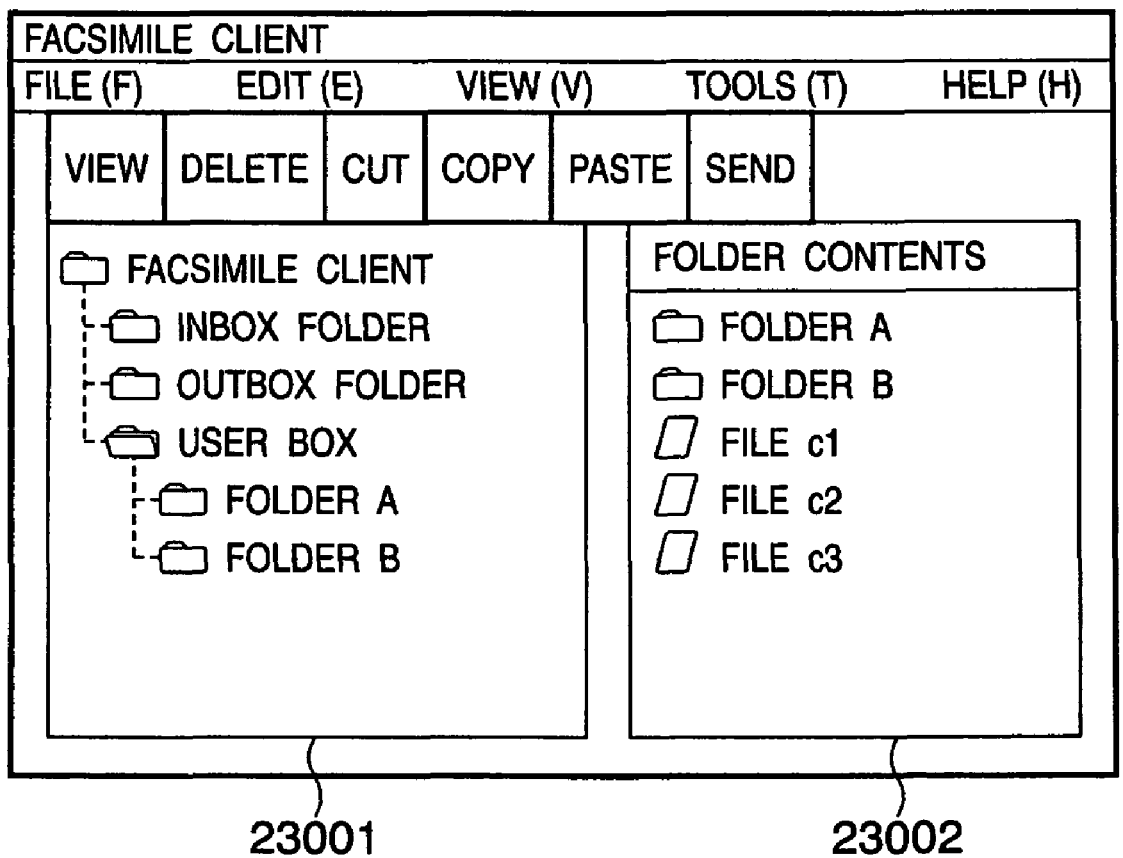
FIG. 33 is a view showing an example of a conventional output file selection method.

Since the display at the thumbnail display portion 2009 is the same as that in the prior art shown in FIG. 30, it can be prevented to decrease the display size of an image, or to space the display positions of designated print images apart from each other and make it difficult to find them out, unlike the prior art in FIG. 31. Unlike the prior art in FIG. 32, the first embodiment does not require any cumbersome operation to temporarily add an image file to the selected file list 22004 and separately designate the print count.

In the first embodiment, the method of displaying, at the folder tree display portion 2006, a folder in which print images are designated is changed as represented by 7003 in FIG. 13. Even if another folder is selected after a print image is designated, the folder having the selected image can be easily found out. Thus, the folder having the selected image can be easily selected again.

The first embodiment provides the selected-folder list display button 2018. When a folder having a selected print image exists in addition to the currently selected folder, the selected folder list 7007 is displayed by a simple user operation, and the folder having the selected print image can be easily selected again. The selected folder list 7007 is not always displayed, but is displayed only in response to a user operation to the selected-folder list display button 2018. A limited display area on the display device 1011 can be exploited.

In the first embodiment, when the name of a folder having a selected print image is long and does not fall within the width of the selected folder list 7007, the folder name is displayed by omitting its intermediate part. The user can obtain a rough position of the target folder in the folder hierarchy in the HDD 1004 from the start part of the folder name, obtain the name of the target folder from the last part of the folder name, and more accurately select the target folder.

In the first embodiment, registration of a folder which is registered once in the selected folder list is not deleted even after the print image setting is canceled. When the user changes his mind and is to print an image whose print setting has been canceled once, he can easily set the image again without any cumbersome operation to search the folder tree display portion 2006 for a folder containing the image.

In the first embodiment, the folder name of a folder having a designated print image is displayed in the selected folder list 7007 with, e.g., an asterisk (another mark or symbol is possible as far as folders can be discriminated). This folder is discriminated from a folder in which the print image settings of all internal image files are canceled. For example, when the user wants to reconfirm an image set to be printed at the thumbnail display portion 2009, he can easily find out the target folder from the selected folder list 7007.

Since the first embodiment provides the "previous folder" button 2019 and "next folder" button 2020, a folder registered in the folder list 3000 can be selected by a simple user operation.

The first embodiment provides the "cancellation of folder selection" dialog and "editing of selected folder" dialog, so registration of a folder registered in the folder list 3000 can be deleted. When many unnecessary folders are registered in the selected folder list 7007 by repeating operations at the folder tree display portion 2006 and thumbnail display portion 2009, particularly when many folders in which the print settings of all image files are canceled are registered, these folders can be easily arranged to display the selected folder list 7007 with an easy-to-see layout. Since folders in which print images are set are displayed with asterisks even in the selected folder lists 5001 and 6001 in these dialogs, the user can avoid erroneous cancellation of registration of a folder in which print images are set. The "editing of selected folder" dialog is equipped with the thumbnail display field. When the print setting is made for an image file in a folder selected in the selected folder list 6001, the reduced image of the image file is displayed. The user can determine an unnecessary folder among folders in which print images are set, and cancel registration of the unnecessary folder.

In the first embodiment, if a folder is to be additionally registered while the number of folders registered in the folder list 3000 has reached 100, the registration deletion dialog processing is executed in step S404 of FIG. 10. Even without opening the "cancellation of folder selection" dialog and "editing of selected folder" dialog by a user operation, it can be prevented to excessively increase folders registered in the folder list 3000, i.e., folder names displayed in the registered folder list 7007. It can also be prevented to increase a capacity used in the work area of the RAM 1006 without limitation.

In the first embodiment, the print order of folders can be set in addition to the print order of images in the "setup" dialog. In the "multiple folder mode", images can be printed in an order which meets the user's will.

In the first embodiment, three orders "date order", "name order", and "selection order" are displayed as choices in the folder print order display field 10002 in the above-described "setup" dialog of FIG. 19. It is, however, also possible to exclude some of these orders from the choices or add another order to the choices. For example, when "ignore folder" is added as a choice and selected, all images set to be printed may be sorted at once in a print order displayed in the image print order display field 10004, instead of treating image files for each folder. This setting and the setting to sort images in each folder may be switched to print images.

FIG. 29 is a view showing a print result of printing images in the folder structure illustrated in FIG. 21 by the "ignore folder" method. Note that FIG. 29 shows an example when the "name order" is set in the image print order display field 10004 of the "setup" dialog.

Figure 23:
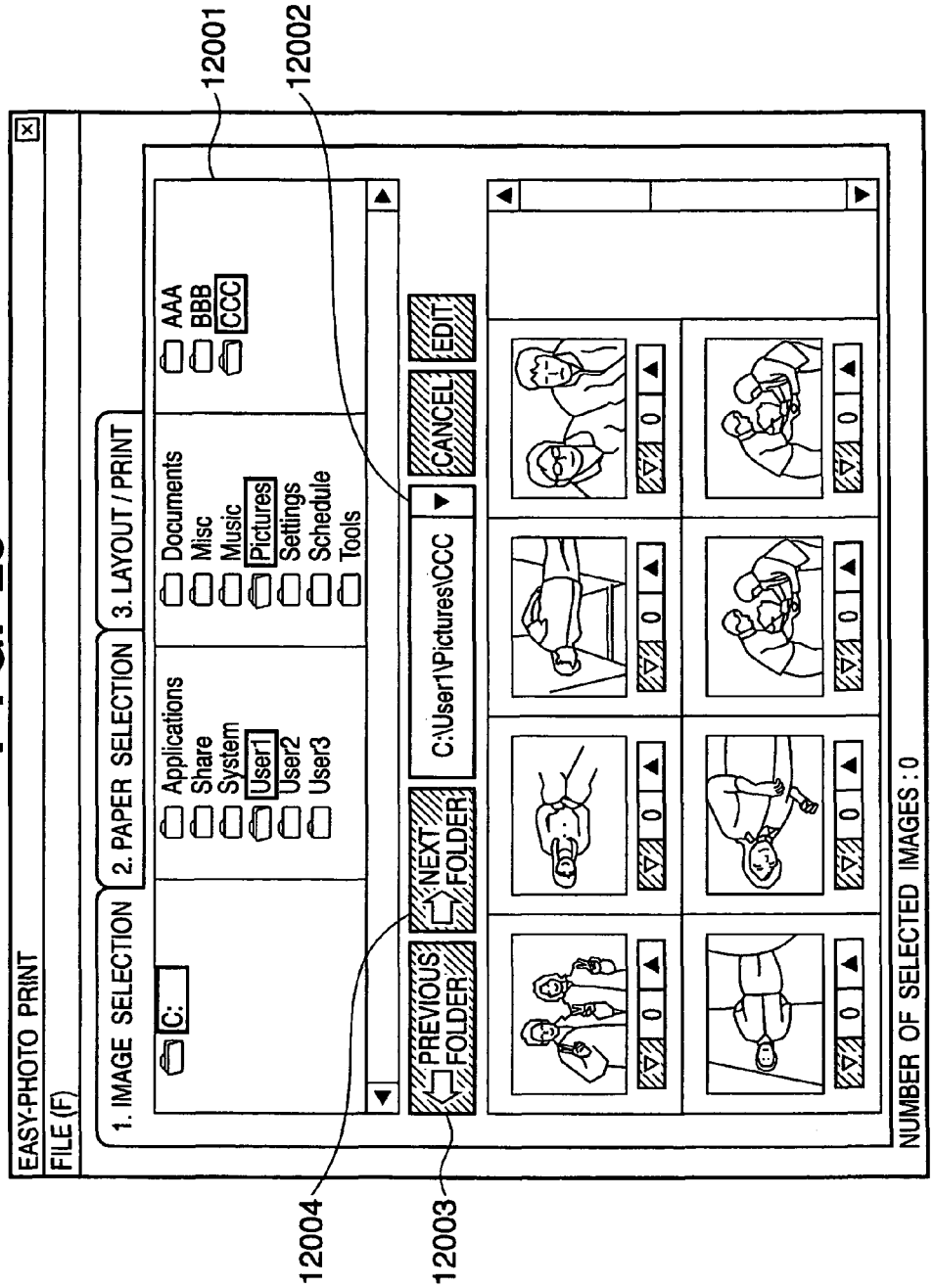
FIG. 23 is a view showing an example of displaying the hierarchy structure of folders in a hierarchical list box.

In the first embodiment, the folder tree display portion 2006 displays the hierarchy structure of folders in the HDD 1004 with the tree form. However, the display form is not limited to the tree one, and folders may be displayed in, e.g., a hierarchical list box 12001, as shown in FIG. 23. In the example of FIG. 23, "C:" displayed in the leftmost list box contains folders displayed in the second list box, and a "User 1" folder selected in the second list box contains folders displayed in the third list box. In this example, a folder "C:\User1\Pictures\CCC" is selected.

In this display form, when print images are set in a folder other than the currently selected folder, it is difficult to find out the folder from the hierarchical list box 12001. However, the folder can be easily accessed by operating a selected-folder list display button 12002 to open a selected folder list. A "previous folder" button 12003 and "next folder" button 12004 are also available.

In the first embodiment, the icon of a folder during setting of print images is colored, and the folder name is displayed in bold italics at the folder tree display portion 2006. However, the display method may be changed to a different form. For example, the shape of the folder icon is changed, a mark such as an asterisk is added to the folder icon or the character string of the folder name, the color of the character string of the folder name is changed, or the character string of the folder name is underlined. However, the display method is not limited to them as far as a target folder can be discriminated from other folders.

To the contrary, it is also possible not to change the display method of a folder during setting of print images. In this case, a folder during setting of print images cannot be determined only from the folder tree display portion 2006, but the selected folder list 7007 may serve as an alternate means.

In the first embodiment, the thumbnail display portion 2009 displays only image files contained in the single folder 2008 selected at the folder tree display portion 2006 even in the "multiple folder mode" However, the thumbnail frames of a plurality of folders in which print images are selected may be successively displayed.

Figure 24:
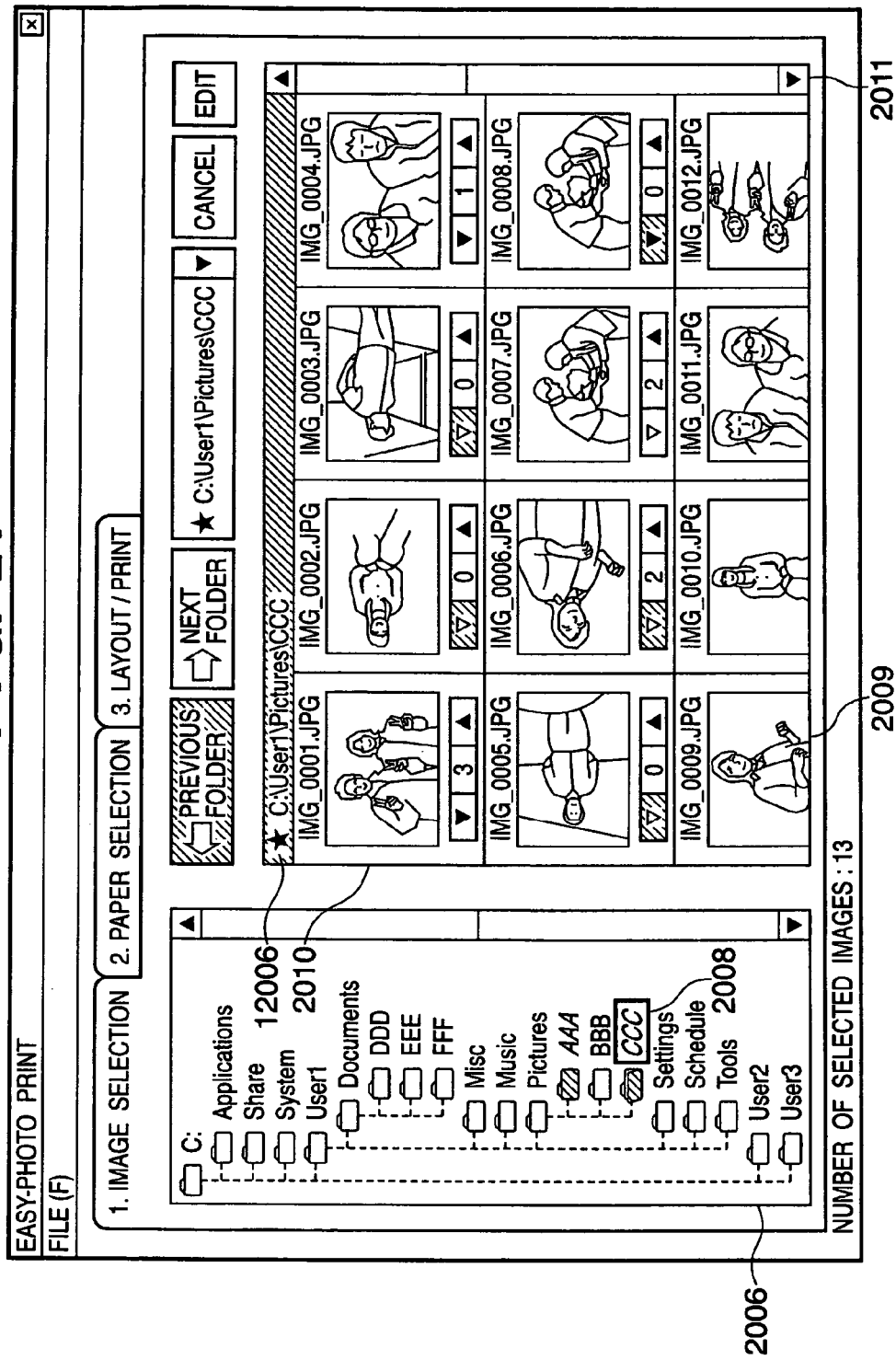
FIG. 24 is a view showing an example of a user interface which successively displays the images of folders at the thumbnail display portion.
Figure 25:
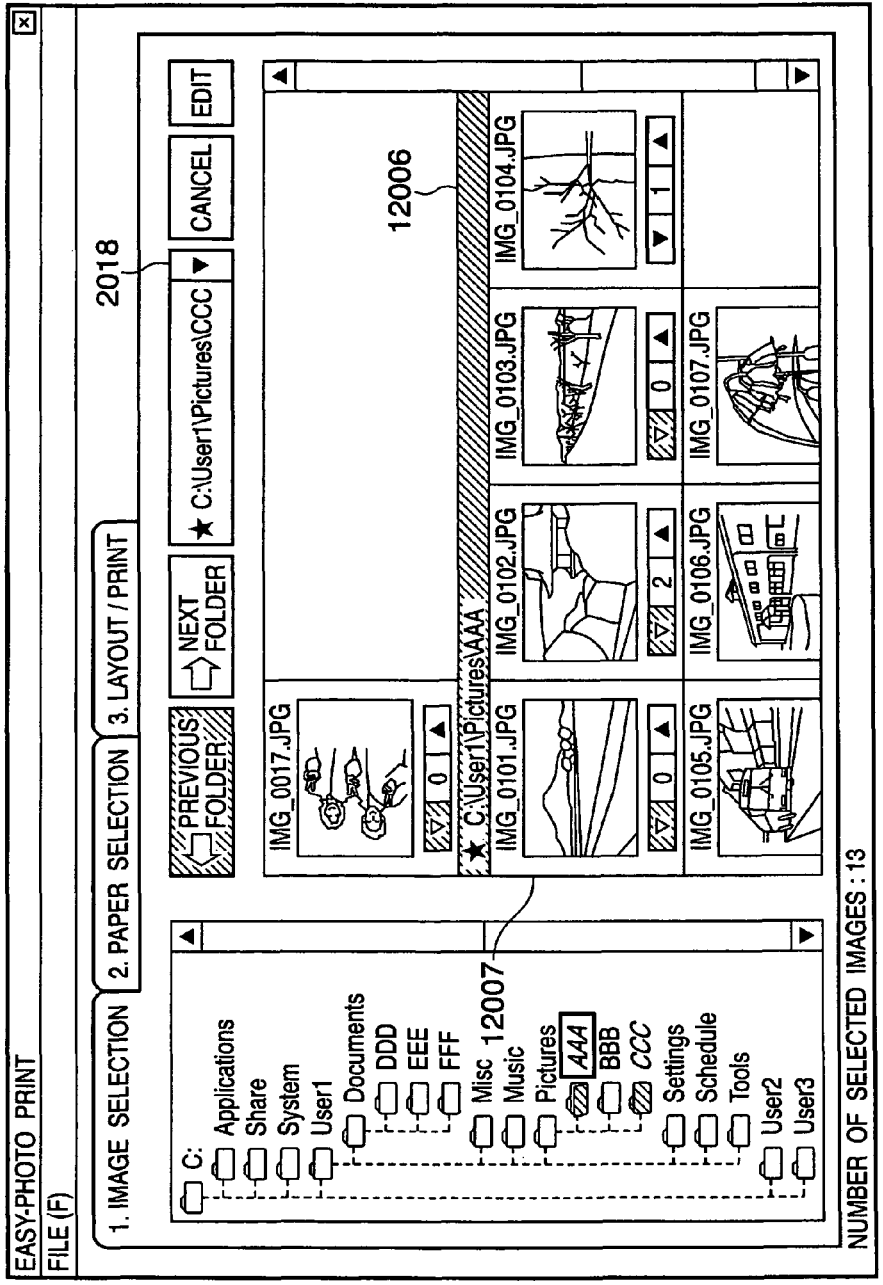
FIG. 25 is a view showing an example of the user interface which successively displays the images of folders at the thumbnail display portion.

FIGS. 24 and 25 are views showing an example of the user interface when images in a plurality of folders are successively displayed at the thumbnail display portion. As illustrated in FIG. 24, a full path character string 12005 of a folder name is displayed above the thumbnail frame 2010 at the thumbnail display portion 2009. When the user refers to a lower portion at the thumbnail display portion by operating the scroll bar 2011, a full path character string 12006 of a folder name is displayed for the next folder having undergone image print setting, as illustrated in FIG. 25. Thumbnail frames 12007 corresponding to image files contained in the folder designated by the full path character string 12006 are displayed below the full path character string 12006. At this time, the display at the folder tree display portion 2006 is also updated to select a folder corresponding to the full path character string 12006. When the user selects a new folder at the folder tree display portion 2006, the full path character string of the new folder and thumbnail frames corresponding to image files contained in the new folder are added and displayed at the bottom of the thumbnail display portion 2009. When the user selects a folder having undergone image print setting by operating the folder tree display portion 2006, selected-folder list display button 2018, and the like, the thumbnail display portion 2009 is scrolled to update the display so that the selected folder appears at the thumbnail display portion 2009. When print images are set in folders, the full path character strings 12005 and 12006 are displayed with asterisks added on the left.

This configuration can also implement the same effects as those of the first embodiment. Further, the full path character strings 12005 and 12006 of folder names are displayed at the thumbnail display portion 2009, and function as a substitute for the selected folder list. Thus, the display of the selected-folder list display button 2018 and selected folder list 7007 can be omitted to exploit a limited display area on the display 1011.

In the first embodiment, when all the print settings of images in a folder registered in the folder list 3000 are temporarily canceled, the folder is not deleted from either the folder list 3000 or the selected folder list 7007. However, the folder can be deleted from the selected folder list 7007. In this case, the number of folders displayed in the selected folder list 7007 can be decreased to provide an easy-to-see display. Similarly, registration of the folder may also be deleted from the folder list 3000. This can reduce a capacity used in the work area of the RAM 1006.

In the first embodiment, the folder registration processing in FIG. 10 is performed when the user selects another folder while setting one or more print images. However, a folder can also be registered in the folder list 3000 at another timing. For example, step S208 in the flowchart of FIG. 8 executed when the user sets the print count of an image to 1 or more at the thumbnail display portion 2009 may be omitted, and the folder registration processing may be done in step S206 instead. Alternatively, a new folder may also be registered after step S211 in FIG. 8 executed when the user selects the new folder, in addition to processing in step S208. However, in these cases, especially in the latter case, the possibility of registering, in the folder list 3000, a folder having no designated print image increases. To prevent this, such a folder is desirably deleted from the folder list 3000 when all the print settings of images are canceled, as described above.

The first embodiment adopts the "previous folder" button 2019 and "next folder" button 2020, but these buttons may not be displayed. In this case, the selected folder list 7007 can be used as an alternate means for these buttons.

To the contrary, if the "previous folder" button 2019 and "next folder" button 2020 are arranged, the display of the selected-folder list display button 2018 and selected folder list 7007 can also be omitted by using these buttons as alternate means. Accordingly, a limited display area on the display 1011 can be exploited.

The first embodiment employs the "cancel" button 2021 and "edit" button 2022, but one or both of them can also be omitted. With this configuration, a limited display area on the display 1011 can also be exploited. In this case, the display items of the selected folder list 7007 cannot be decreased in accordance with the user's will. However, if the number of items in the selected folder list 7007 exceeds 100, the folder registration deletion processing is done by processing in step S404 of FIG. 10.

In the first embodiment, the display of the "close" button 5004 in the "cancellation of folder selection" dialog of FIG. 6 is not controlled. However, when the registration deletion dialog processing is performed in step S404 of FIG. 10, registration of one or more folders must be deleted from the folder list 3000. For this purpose, when the "cancellation of folder selection" dialog in FIG. 6 is to be opened, the "close" button 5004 may be disabled to inhibit any processing corresponding to a user operation of the button until registration of one or more folders is deleted. When the printing control application is configured in this fashion, the number of folders registered in the folder list 3000 is always smaller than 100 after execution of processing in step S404. Thus, the flow may advance to step S405 instead of returning to step S403.

In the first embodiment, the "cancellation of folder selection" dialog which does not display any thumbnail list is displayed in processing in step S404 of FIG. 10. Alternatively, the "editing of selected folder" dialog which displays a thumbnail list may be displayed.

In the first embodiment, the folder name of a folder (folder having a file list pointer) in which images to be printed are set is displayed with an asterisk in the selected folder list 7007. However, the display method of the folder name may be changed to another form. In short, it suffices to distinguishably display a folder having an image data file selected for printing, and a folder having no selected image data file. For example, a figure (icon) is added instead of an asterisk, or the character string of a folder name is displayed in a color different from that of another folder name, displayed in boldface or italics, inversely displayed, or underlined. However, the display method is not limited to them as far as a target folder can be discriminated from other folders.

In the first embodiment, images selected from a plurality of folders are successively printed in the "multiple folder mode", but the break between folders may be reflected in a print result. In this case, for example, when images are classified by type in folders, the user can easily classify printed products serving as output results.

Figure 27:
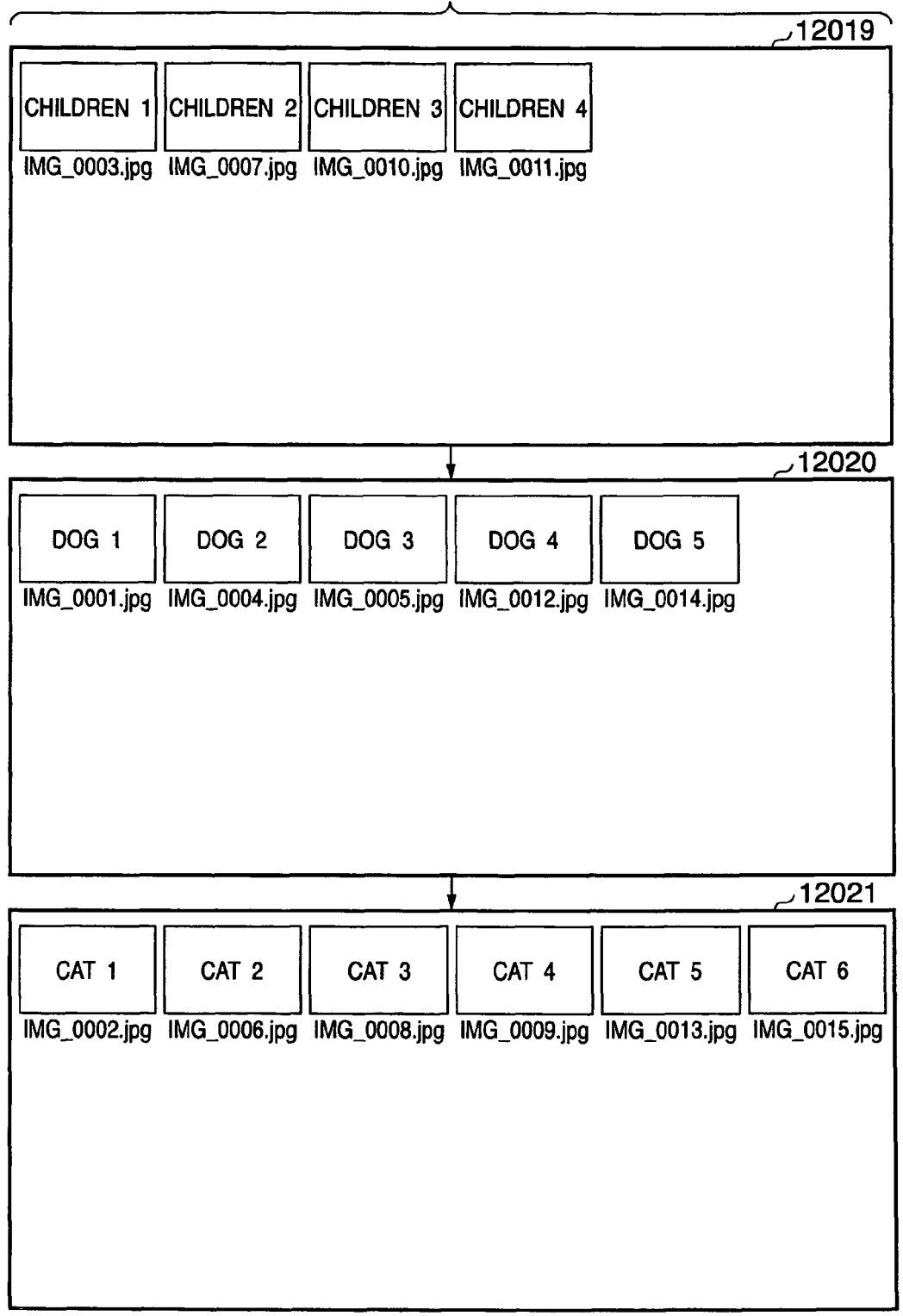
FIG. 27 is a view showing an output example when a page break is inserted as a folder break.

FIG. 27 is a view showing an output example when a page break is inserted as a folder break. Images selected by the user from the first folder complying with a sorting rule displayed in the folder print order display field 10002 in the "setup" dialog of FIG. 19 are printed on a first paper sheet 12019 by sorting the images by a method displayed in the image print order display field 10004. A page break is inserted before images contained in the next folder, and images contained in the second folder are sorted and printed on a second paper sheet 12020. Similarly, images contained in the third folder are printed on a third paper sheet 12021. At this time, a folder name may be printed on each paper sheet.

FIG. 28 is a view showing an output example when an image is inserted as a folder break. Images 12023 contained in the first folder are printed at the start on a paper sheet 12022, and a break image 12024 is printed subsequently to the images 12023. Then, images contained in the second folder are printed. The break image 12024 is inserted at a position corresponding to a folder break. The break image 12024 may be printed before the images 12023 contained in the first folder.

Alternatively, a line feed may be inserted at a position corresponding to a folder break, the character string of the folder name of a folder which stores images to be printed next may be printed at a break position, or a caption page may be printed. By these methods, when images are classified by type in folders, the user can easily classify printed products serving as output results.

In these cases, images selected from different folders cannot be printed on one paper sheet, unlike the above-described embodiment. It is desirable to, for example, set a new setting item in the "setup" dialog and insert a page break or break image in accordance with the setting value of the new setting item, or display a "layout with break" and "layout without break" as choices at the layout display portion 9001 in FIG. 18 and only when the "layout with break" is selected, insert a page break or image.

The user interface in the first embodiment does not have the "all" button, "clear" button", and "zoom" button shown in the prior art of FIG. 30, but may have these buttons. At this time, as an operation upon selecting the "clear" button, all the print counts of images in a currently selected folder may be reset to 0, or the print counts of all images including another folder for which the print count has been set may be reset to 0.

Figure 26:
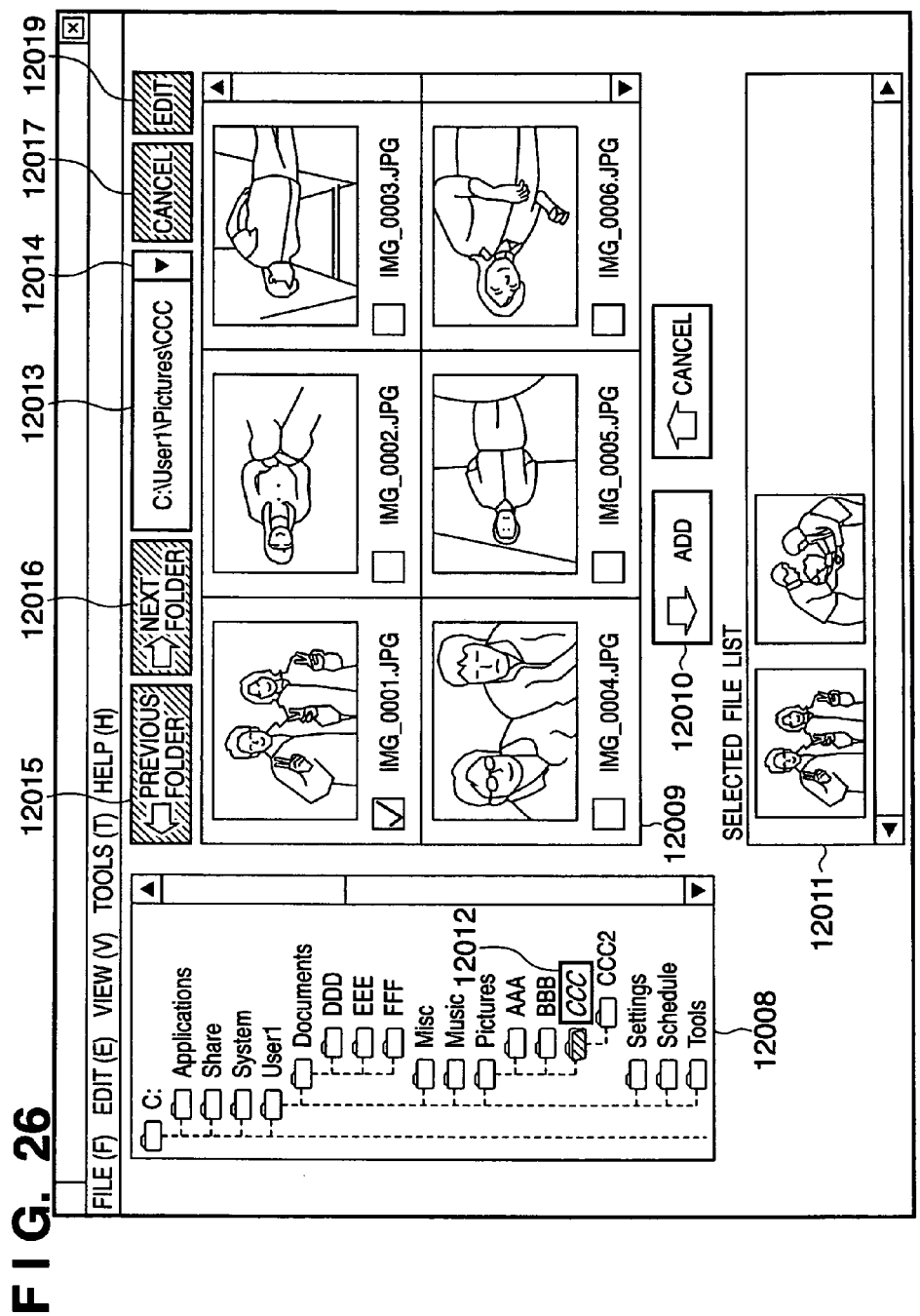
FIG. 26 is a view showing a display example, on the display, of a user interface for separately designating whether to print an image and the print count.

In the user interface of the first embodiment, whether to print a target image file and the print count are simultaneously set, similar to the prior art in FIG. 30. It is also possible to first set whether to print each image, and then separately designate the print count of each image, like the prior art in FIG. 32. FIG. 26 shows a display example, on the display 1011, of the user interface for separately designating whether to print an image and the print count.

A processing operation when the user interface in FIG. 26 is employed is as follows. When the user designates, at a folder tree display portion 12008 via the mouse 1013, a folder which stores image files to be printed, the reduced images of images stored in the image files in the folder are listed and displayed at a thumbnail display portion 12009.

When the user selects a thumbnail (adds a check mark in FIG. 26) and clicks an "add" button 12010, an image corresponding to the selected thumbnail is registered in a "selected file list" 12011. At this time, the display form of a folder 12012 selected at the folder tree display portion 12008 is changed similarly to the folder 2008 in FIG. 12.

The user interface is equipped with a folder name display portion 12013, selected-folder list display button 12014, "previous folder" button 12015, "next folder" button 12016, "cancel" button 12017, and "edit" button 12018, similar to the folder name display portion 2017, selected-folder list display button 2018, "previous folder" button 2019, "next folder" button 2020, "cancel" button 2021, and "edit" button 2022 shown in FIG. 2. The folder tree display portion 12008, the display method of these objects, and processing contents to a user operation are the same as those of the corresponding objects in FIG. 2, and a description thereof will be omitted.

This configuration of the user interface of the printing control application allows the user to collect images from a plurality of folders, easily select again a folder containing previously registered images, and additionally register images, though the operation becomes cumbersome because registration of an image file in the "selected folder list" and designation of the print count of the image file are performed at different locations, similar to the prior art in FIG. 27.

Note that the first embodiment has described an example of printing a plurality of image data files at once, but the batch printing is not limited to print processing. For example, the batch printing can also be applied to image processing (including color conversion and sharpness conversion) such as filter processing of filtering image data files at once. Also, the target data file is not limited to an image file, and may be a document file, audio file, or moving image file.

Other Embodiment

FIG. 34 is a table showing the memory map of a storage medium according to the second embodiment of the present invention.

A storage medium 13000 according to the second embodiment is formed from a CD-ROM, DVD-ROM, or the like which stores various programs (program codes) as shown in FIG. 34. Data subordinate to various programs are managed at a predetermined directory in the storage medium 13000.

The storage medium 13000 also stores information for managing the programs, e.g., version information and information on the creator. Further, the storage medium 13000 may store information dependent on an OS or the like on the program reading side, e.g., icons for identifiably displaying programs, or when a program for installing various programs in a computer or programs to be installed are compressed, a program for decompressing the programs.

The object of the present invention is also achieved even by supplying a storage medium which records software program codes to implement the functions of the first embodiment to the system or apparatus and causing the computer (or CPU or MPU) of the system or apparatus to read out and execute the program codes stored in the storage medium.

In this case, the program codes read out from the storage medium implement the functions of the first embodiment by themselves, and the storage medium which stores the program codes constitutes the present invention.

As the storage medium to supply the program codes, for example, a floppy disk, hard disk, optical disk, magnetooptical disk, CD-ROM, CD-R, CD-RW, DVD-ROM, DVD-RAM, DVD-RW, DVD+RW, magnetic tape, nonvolatile memory card, or ROM can be used. The program codes may be downloaded via a network.

The functions of the above-described embodiment are implemented not only when the readout program codes are executed by the computer but also when the OS (Operating System) or the like running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, the user can select files to be printed from arbitrary folders, and easily designate a folder selected in the past, improving the operability of selecting a file to be printed.

Folders can be easily switched by switching them in the forward or backward direction without designating folders one by one.

Since location information of a desired folder in a folder list can be deleted, only location information of a significant folder can be left.

When folder location information in a folder list is deleted, an associated file list is also deleted to exclude all data files stored in the folder from print choices.

According to the present invention, the user can select files to be printed from arbitrary folders, and easily find out a folder which stores files selected in the past, improving the operability of selecting a file to be printed.

Target files are image data files, batch processing is printout processing, the thumbnails of the image data files are displayed as a list of file, and the print count can also be designated in this state. Hence, data files to be printed and their print counts can be easily designated without opening the data files.

By displaying the total print count of data files designated to be printed, the number of print paper sheets to be set in the printer can also be grasped.

The display window can be effectively used by making it possible to switch between a window made up of a folder view display area and file view display area, a window for designating the size and type of a print medium, and a window for designating a layout.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-179646, filed Jun. 20, 2005, 2005-179647, filed Jun. 20, 2005, which are hereby incorporated by reference herein in their entirety.

What is claimed is:

1. A printing control apparatus which prints desired data files stored in a plurality of folders stored in a storage medium, comprising:

window display means for displaying a window having a folder view display area for displaying a list of folders, and a file view display area for displaying a list of files stored in a selected folder;

first storage means for, when a folder in the folder view display area is designated by predetermined designation means, setting the designated folder as a selected folder, and storing location information of the selected folder in a predetermined folder list;

second storage means for, when a data file to be printed in the file view display area is designated by the predetermined designation means, storing information for specifying the designated data file in a predetermined file list;

printout processing means for, when printing is designated, performing printout processing for a selected data file on the basis of the information stored in said second storage means;

folder list display means for displaying the folder list stored in said first storage means; and update means for, when location information of a desired folder in the displayed folder list is designated by the predetermined designation means, setting a folder specified by the location information designated by the designation means as a selected folder, and designating said window display means to update display.

2. The apparatus according to claim 1, wherein the data file includes an image data file, a thumbnail image of the image data file, a print count, and a symbol for designating increment/decrement of the print count are displayed in the file view display area, said second storage means stores, in the file list, a file name and print count of a data file having a print count of not less than "1", and said first storage means stores, in the folder list, location information of a folder, and when a corresponding file list exists, a pointer to the file list, or when no file list exists, a blank pointer.

3. The apparatus according to claim 1, wherein said window display means displays, at a predetermined position, a total print count based on data files designated as print targets.

4. The apparatus according to claim 1, wherein said window display means displays, in a switchable manner, a window formed from the folder view display area and the file view display area, a window for designating a size and type of a print medium, and a window for designating a layout.

5. The apparatus according to claim 1, further comprising switching means for switching folders in a forward direction or a backward direction, wherein when said switching means designates switching, said update means acquires location positions of folders stored in the folder list in the forward direction or the backward direction, and designates said window display means to update the display to selected folders.

6. The apparatus according to claim 1, further comprising deletion means for deleting location information of a desired folder in the folder list.

7. The apparatus according to claim 6, wherein, when a data file in the folder to be deleted is stored as a print target in the predetermined file list, said deletion means deletes the data file from the predetermined file list.

8. A method of controlling a printing control apparatus which prints desired data files stored in a plurality of folders stored in a storage medium, comprising:

a window display step of displaying a window having a folder view display area for displaying a list of folders, and a file view display area for displaying a list of files stored in a selected folder;

a first storage step of, when a folder in the folder view display area is designated by predetermined designation means, setting the designated folder as a selected folder, and storing location information of the selected folder in a predetermined folder list;

a second storage step of, when a data file to be printed in the file view display area is designated by the predetermined designation means, storing information for specifying the designated data file in a predetermined file list;

a printout processing step of, when printing is designated, performing printout processing for a selected data file on the basis of the information stored in the second storage step;

a folder list display step of displaying the folder list stored in the first storage step; and an update step of, when location information of a desired folder in the displayed folder list is designated by the predetermined designation means, setting a folder specified by the location information designated by the designation means as a selected folder, and designating update of display in the window display step.

9. A computer readable storage medium on which is stored computer-executable process steps for controlling a printing control apparatus that prints desired data files stored in a plurality of folders stored in a storage medium, said process steps comprising:

a window display step of displaying a window having a folder view display area for displaying a list of folders, and a file view display area for displaying a list of files stored in a selected folder;

first storage step of, when a folder in the folder view display area is designated by predetermined designation means, setting the designated folder as a selected folder, and storing location information of the selected folder in a predetermined folder list;

a second storage step of, when a data file to be printed in the file view display area is designated by the predetermined designation means, storing information for specifying the designated data file in a predetermined file list;

a printout processing step of, when printing is designated, performing printout processing for a selected data file on the basis of the information stored in said second storage step;

a folder list display step of displaying the folder list stored in said first storage step; and an update step of, when location information of a desired folder in the displayed folder list is designated by the predetermined designation means, setting a folder specified by the location information designated by the designation means as a selected folder, and designating update of display in the window display step.

10. A printing control apparatus which prints desired data files stored in a plurality of folders stored in a storage medium, comprising:

window display means for displaying a window having a folder view display area for displaying a list of folders, and a file view display area for displaying a list of files stored in a selected folder;

first storage means for, when a data file to be printed in the file view display area is designated by predetermined designation means, storing location information of the selected folder containing the designated data file in a predetermined folder list;

second storage means for storing, in a predetermined file list, information for specifying the data file designated as a print target in the file view display area;

printout processing means for, when printing is designated, performing printout processing for a selected data file on the basis of the information stored in said second storage means;

folder list display means for displaying the folder list stored in said first storage means; and update means for, when location information of a desired folder in the displayed folder list is designated by the predetermined designation means, setting a folder specified by the location information designated by the designation means as a selected folder, and designating said window display means to update display.

11. The apparatus according to claim 10, wherein the location information is stored in said first storage means in response to selection of another folder displayed in the folder list display area after selection of the data file to be printed.

12. A method of controlling a printing control apparatus which prints desired data files stored in a plurality of folders stored in a storage medium, comprising:

a window display step of displaying a window having a folder view display area for displaying a list of folders, and a file view display area for displaying a list of files stored in a selected folder;

a first storage step of, when a data file to be printed in the file view display area is designated by predetermined designation means, storing location information of the selected folder containing the designated data file in a predetermined folder list;

a second storage step of storing, in a predetermined file list, information for specifying the data file designated as a print target in the file view display area;

a printout processing step of, when printing is designated, performing printout processing for a selected data file on the basis of the information stored in the second storage step;

a folder list display step of displaying the folder list stored in the first storage step; and an update step of, when location information of a desired folder in the displayed folder list is designated by the predetermined designation means, setting a folder specified by the location information designated by the designation means as a selected folder, and designating update of display in the window display step.

13. The method according to claim 12, wherein the location information is stored in the first storage step in response to selection of another folder displayed in the folder list display area after selection of the data file to be printed.

14. A computer readable storage medium on which is stored computer-executable process steps for controlling a printing control apparatus that prints desired data files stored in a plurality of folders stored in a storage medium, said process steps comprising:

a window display step of displaying a window having a folder view display area for displaying a list of folders, and a file view display area for displaying a list of files stored in a selected folder;

a first storage step of, when a data file to be printed in the file view display area is designated by predetermined designation means, storing location information of the selected folder containing the designated data file in a predetermined folder list;

a second storage step of storing, in a predetermined file list, information for specifying the data file designated as a print target in the file view display area;

a printout processing step of, when printing is designated, performing printout processing for a selected data file on the basis of the information stored in said second storage step;

a folder list display step of displaying the folder list stored in said first storage step; and an update step of, when location information of a desired folder in the displayed folder list is designated by the predetermined designation means, setting a folder specified by the location information designated by the designation means as a selected folder, and designating update of display in the window display step.

15. An information processing apparatus which executes predetermined processing at once for desired data files stored in a plurality of folders stored in a storage medium, comprising:

window display means for displaying a window having a folder view display area for displaying a list of folders, and a file view display area for displaying a list of files stored in a selected folder;

update means for, when a folder in the folder view display area is designated by predetermined designation means, setting the designated folder as a selected folder, and updating the file view display area of the window;

storage means for, when a data file to be processed in the file view display area is designated by the predetermined designation means, storing, in association with each other, information for specifying the designated data file and location information of a folder which stores the data file; and processing means for, when processing start designation is input, sequentially processing selected data files on the basis of the information stored in said storage means, wherein said window display means displays a folder which stores a data file to be processed and a folder which does not store a data file to be processed, in different forms in the folder view display area on the basis of folder location information stored in said storage means.

16. The apparatus according to claim 15, wherein the data file includes an image data file, said processing means performs output processing to a printing apparatus, a thumbnail image of the image data file, a print count, and a symbol for designating increment/decrement of the print count are displayed in the file view display area, and said storage means stores a file name of a data file having a print count of not less than "1" in association with location information of a folder containing the data file.

17. The apparatus according to claim 15, wherein said window display means displays, at a predetermined position, a total print count of data files designated as print targets.

18. The apparatus according to claim 16, wherein said window display means displays, in a switchable manner, a window formed from the folder view display area and the file view display area, a window for designating a size and type of a print medium, and a window for designating a layout.

19. A method of controlling an information processing apparatus which executes predetermined processing at once for desired data files stored in a plurality of folders stored in a storage medium, comprising:
- a window display step of displaying a window having a folder view display area for displaying a list of folders, and a file view display area for displaying a list of files stored in a selected folder;
- an update step of, when a folder in the folder view display area is designated by predetermined designation means, setting the designated folder as a selected folder, and updating the file view display area of the window;
- a storage step of, when a data file to be processed in the file view display area is designated by the predetermined designation means, storing, in predetermined storage means in association with each other, information for specifying the designated data file and location information of a folder which stores the data file; and
- a processing step of, when processing start designation is input, sequentially processing selected data files on the basis of the information stored in the storage means,
- wherein in the window display step, a folder which stores a data file to be processed and a folder which does not store a data file to be processed are displayed in different forms in the folder view display area on the basis of folder location information stored in the storage means.

20. A computer readable storage medium on which is stored computer-executable process steps for controlling an information processing apparatus that executes predetermined processing at once for desired data files stored in a plurality of folders stored in a storage medium, said process steps comprising:
- a window display step of displaying a window having a folder view display area for displaying a list of folders, and a file view display area for displaying a list of files stored in a selected folder;
- an update step of, when a folder in the folder view display area is designated by predetermined designation means, setting the designated folder as a selected folder, and updating the file view display area of the window;
- a storage step of, when a data file to be processed in the file view display area is designated by the predetermined designation means, storing, in association with each other, information for specifying the designated data file and location information of a folder which stores the data file; and
- a processing step of, when processing start designation is input, sequentially processing selected data files on the basis of the information stored in said storage step,
- wherein said window display step functions to display a folder which stores a data file to be processed and a folder which does not store a data file to be processed, in different forms in the folder view display area on the basis of folder location information stored in said storage step.

21. An information processing apparatus which prints desired data files stored in a plurality of folders stored in a storage medium, comprising:
- window display means for displaying a window having a selected folder view display area for displaying a list of selected folders in accordance with a log of access to the selected folders, and a file view display area for displaying a list of files stored in the selected folders; and
- storage means for, when a data file to be processed in the selected folder is designated by predetermined designation means, storing information for specifying the designated data file,
- wherein said window display means displays, among folders displayed in the selected folder view display area, a folder which stores a data file to be processed and a folder which does not store a data file to be processed, in different forms on the basis of contents stored in said storage means.

22. A method of controlling an information processing apparatus which prints desired data files stored in a plurality of folders stored in a storage medium, comprising:
- a window display step of displaying a window having a selected folder view display area for displaying a list of selected folders in accordance with a log of access to the selected folders, and a file view display area for displaying a list of files stored in the selected folders; and
- a storage step of, when a data file to be processed in the selected folder is designated by predetermined designation means, storing information for specifying the designated data file,
- wherein in the window display step, among folders displayed in the selected folder view display area, a folder which stores a data file to be processed and a folder which does not store a data file to be processed are displayed in different forms on the basis of contents stored in the storage step.

23. A computer readable storage medium on which is stored computer-executable process steps for controlling an information processing apparatus that prints desired data files stored in a plurality of folders stored in a storage medium, said process steps comprising:
- a window display step of displaying a window having a selected folder view display area for displaying a list of selected folders in accordance with a log of access to the selected folders, and a file view display area for displaying a list of files stored in the selected folders; and
- a storage step of, when a data file to be processed in the selected folder is designated by predetermined designation means, storing information for specifying the designated data file,
- wherein said window display step has a function of displaying, among folders displayed in the selected folder view display area, a folder which stores a data file to be processed and a folder which does not store a data file to be processed, in different forms on the basis of contents stored in said storage step.

* * * * *